United States Patent
He et al.

(10) Patent No.: US 10,887,621 B2
(45) Date of Patent: Jan. 5, 2021

(54) 360-DEGREE VIDEO CODING USING GEOMETRY PROJECTION

(71) Applicant: VID SCALE, INC., Wilmington, DE (US)

(72) Inventors: Yuwen He, San Diego, CA (US); Yan Ye, San Diego, CA (US); Philippe Hanhart, San Diego, CA (US); Xiaoyu Xiu, San Diego, CA (US)

(73) Assignee: VID SCALE, Inc., Wilmington, DE (US)

( * ) Notice: Subject to any disclaimer, the term of this patent is extended or adjusted under 35 U.S.C. 154(b) by 0 days.

(21) Appl. No.: 16/315,447

(22) PCT Filed: Jul. 7, 2017

(86) PCT No.: PCT/US2017/041021
§ 371 (c)(1),
(2) Date: Jan. 4, 2019

(87) PCT Pub. No.: WO2018/009746
PCT Pub. Date: Jan. 11, 2018

(65) Prior Publication Data
US 2019/0215532 A1 Jul. 11, 2019

Related U.S. Application Data

(60) Provisional application No. 62/360,112, filed on Jul. 8, 2016, provisional application No. 62/404,017, filed (Continued)

(51) Int. Cl.
*H04N 19/597* (2014.01)
*H04N 19/172* (2014.01)
(Continued)

(52) U.S. Cl.
CPC ........... *H04N 19/597* (2014.11); *G06T 17/10* (2013.01); *G06T 17/30* (2013.01); *H04N 13/117* (2018.05);
(Continued)

(58) Field of Classification Search
CPC .. H04N 19/597; H04N 19/105; H04N 19/172; H04N 19/132; H04N 19/593; H04N 19/103; H04N 19/159
See application file for complete search history.

(56) References Cited

U.S. PATENT DOCUMENTS

2004/0247173 A1* 12/2004 Nielsen ................ H04N 5/2628
382/154
2006/0034529 A1  2/2006 Park et al.
(Continued)

FOREIGN PATENT DOCUMENTS

EP          1064817 A1    1/2001
WO   WO 2000/08889 A1    2/2000

OTHER PUBLICATIONS

"VR Coaster", Available at http://www.vrcoaster.com/, 2014, 7 pages.
(Continued)

*Primary Examiner* — Obafemi O Sosanya
(74) *Attorney, Agent, or Firm* — Condo Roccia Koptiw LLP

(57) ABSTRACT

Processing video data may include capturing the video data with multiple cameras and stitching the video data together to obtain a 360-degree video. A frame-packed picture may be provided based on the captured and stitched video data. A current sample location may be identified in the frame-packed picture. Whether a neighboring sample location is located outside of a content boundary of the frame-packed picture may be determined. When the neighboring sample
(Continued)

location is located outside of the content boundary, a padding sample location may be derived based on at least one circular characteristic of the 360-degree video content and the projection geometry. The 360-degree video content may be processed based on the padding sample location.

20 Claims, 55 Drawing Sheets

Related U.S. Application Data on Oct. 4, 2016, provisional application No. 62/463,242, filed on Feb. 24, 2017, provisional application No. 62/500,605, filed on May 3, 2017.

(51) Int. Cl.
| | |
|---|---|
| *H04N 19/105* | (2014.01) |
| *H04N 19/132* | (2014.01) |
| *H04N 13/194* | (2018.01) |
| *H04N 13/383* | (2018.01) |
| *G06T 17/30* | (2006.01) |
| *H04N 13/117* | (2018.01) |
| *G06T 17/10* | (2006.01) |
| *H04N 13/161* | (2018.01) |
| *H04N 13/344* | (2018.01) |
| *H04N 19/563* | (2014.01) |
| *H04N 19/593* | (2014.01) |
| *H04N 5/232* | (2006.01) |

(52) U.S. Cl.
CPC ......... *H04N 13/161* (2018.05); *H04N 13/194* (2018.05); *H04N 13/344* (2018.05); *H04N 13/383* (2018.05); *H04N 19/105* (2014.11); *H04N 19/132* (2014.11); *H04N 19/172* (2014.11); *H04N 19/563* (2014.11); *H04N 19/593* (2014.11); *H04N 5/23238* (2013.01)

(56) References Cited

U.S. PATENT DOCUMENTS

| | | | |
|---|---|---|---|
| 2006/0034530 A1 | 2/2006 | Park | |
| 2014/0133758 A1* | 5/2014 | Kienzle | G06K 9/4614 382/195 |
| 2016/0112704 A1* | 4/2016 | Grange | H04N 19/176 375/240.12 |

OTHER PUBLICATIONS

Abbas, Adeel, "GoPro Test Sequences for Virtual Reality Video Coding", JVET-C0021, 3rd Meeting: Geneva, CH, May 26-31, 2016, 10 pages.

Bang, et al., "Description of 360 3D Video Application Exploration Experiments on Divergent Multi-View Video", ISO/IEC JTC1/SC29/WG11 MPEG2015/ M16129, Feb. 2016, 5 pages.

Budagavi, et al., "360 Degrees Video Coding Using Region Adaptive Smoothing", IEEE International Conference on Image Processing (ICIP), 2015, 5 pages.

Choi et al., "Test Sequence Formats for Virtual Reality Video Coding", Samsung Electronics Co., Ltd., JVET-C0050, 3rd Meeting: Geneva, CH, May 26-Jun. 1, 2016, 6 pages.

Choi, Byeongdoo, "Technologies under Consideration for Omnidirectional Media Application Format", ISO/IEC JTC1/SC29/WG11 N15946, San Diego, CA, US, Feb. 2016, 16 pages.

Facebook, "Facebook 360 Video", Available at https://facebook360.fb.com/, retrieved Jan. 4, 2019, 5 pages.

Facebook, "Next-Generation Video Encoding Techniques for 360 Video and VR", Available at https://code.facebook.com/posts/1126354007399553/next-generation-video-encoding-techniques-for-360-video-and-vr/, retrieved Jan. 4, 2019, 5 pages.

Github, "Facebook's Equirectangular to Cube Map Tool on GitHub", Available at https://github.com/facebook/transform?files=1, retrieved on Nov. 9, 2018, 3 pages.

Google, "Google Cardboard", Available at https://google.com/get/cardboard/, retrieved on Nov. 9, 2018, 4 pages.

Habe et al., "Report of EEI on Omni-Directional Video", MPEG2003/ M9480, Pattaya, Mar. 2003, 13 pages.

Hanhart et al., "AHG8: Reference Samples Derivation Using Geometry Padding for Intra Coding", InterDigital Communication, Inc., JVET-D0092, 4th Meeting: Chengdu, CN, Oct. 15-21, 2016, 6 pages.

He et al., "AHG8: Geometry Padding for 360 Video Coding", InterDigital Communications, Inc., JVET-00075, 4th Meeting: Chengdu, CN, Oct. 15-21, 2016, 10 pages.

HTC, "HTC Vive", Available at https://www.htcvive.com/us/, 2011, 3 pages.

Licea-Kane et al., "ARB Sseamless Cube Map", The Khronos Group, Inc., Jul. 2009, 3 pages.

Norkin et al., "Call for Test Materials for Future Video Coding Standardization", Document: JVET-B1002, 2nd Meeting: San Diego, USA, Feb. 20-26, 2016, 4 pages.

Oculus, "Oculus Rift", Available at https://www.oculus.com/en-us/rift/, retrieved on Nov. 9, 2018, 7 pages.

ISO/IEC, "Requirements for OMAF", ISO/IEC MPEG N16143, San Diego, US, Feb. 2016, 2 pages.

Ridge et al., "Nokia Test Sequences for Virtual Reality Video Coding", Nokia Technologies, JVET-C0064, 3rd Meeting: Geneva, CH, May 26-Jun. 1, 2016, 2 pages.

Sullivan et al., "Meeting Notes of the 3rd Meeting of the Joint Video Exploration Team (JVET)", 3rd Meeting: Geneva, CH, JVET-C1000, May 26-Jun. 1, 2016, 73 pages.

TNO, "5G and Future Media Consumption", ISO/IEC MPEG m37604, San Diego, US, Feb. 2016, 10 pages.

Youtube, "YouTube 360 Video Channel", Available at https://www.youtube.com/channel/UCzughhs6NVVbgTzMuM09VVKDQ, retrieved on Jan. 4, 2019, 4 pages.

Yu et al., "A Framework to Evaluate Omnidirectional Video Coding Schemes", IEEE International Symposium on Mixed and Augmented Reality, Sep. 29-Oct. 3, 2015, 16 pages.

Yu et al., "Content Adaptive Representations of Omnidirectional Videos for Cinematic Virtual Reality", Proceedings of the 3rd International Workshop on Immersive Media Experiences, Brisbane, Australia, Oct. 30, 2015, 6 pages.

Carbotte, Kevin, "Google Looks to Solve VR Video Quality Issues with Equi-Angular Cubemaps (EAC)", Tom's Hardware, Available at <https://www.tomshardware.com/news/google-equi-angulra-cubemap-projection-technology,33917.html>, Mar. 15, 2017, pp. 1-8.

Coban et al., "AHG8: Adjusted Cubemap Projection for 360-Degree Video", JVET-F0025, Qualcomm Inc., Joint Video Exploration Team (JVET) of ITU-T SG 16 WP 3 and ISO/IEC JTC 1/SC 29/WG 11, 6th Meeting: Hobart, AU, Mar. 31-Apr. 7, 2017, pp. 1-6.

Ho et al., "Unicube for Dynamic Environment Mapping", IEEE Transactions on Visualization and Computer Graphics, vol. 17, No. 1, Jan. 2011, pp. 51-63.

Shih et al., "AHG8: Face-based Padding Scheme for Cube Projection", JVET-E0057, MediaTek Inc., Joint Video Exploration Team (JVET) of ITU-T SG 16 WP 3 and ISO/IEC JTC1/SC 29/WG 11, 5th Meeting: Geneva, CH, Jan. 12-20, 2017, pp. 1-5.

\* cited by examiner

FIG. 8

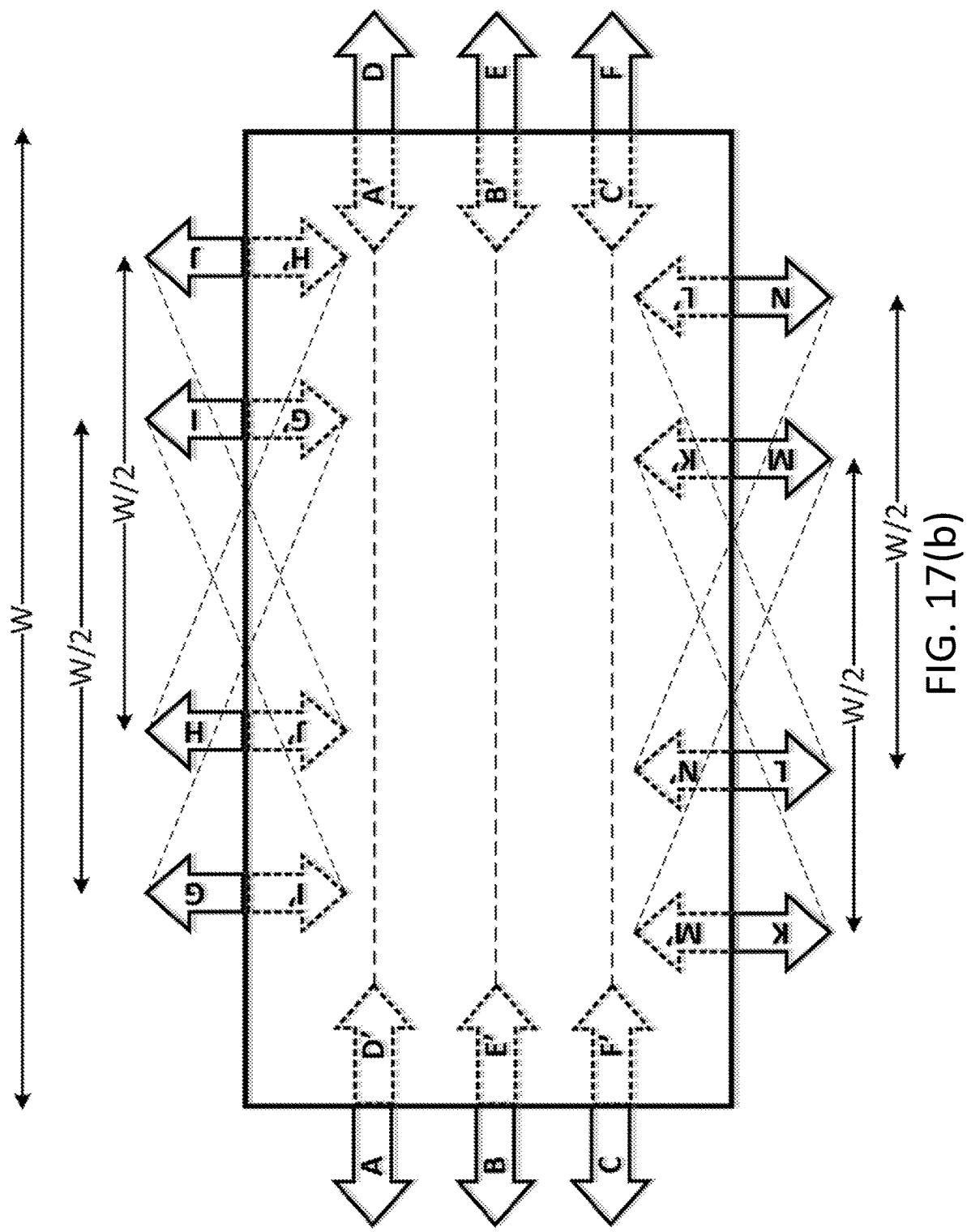

360-DEGREE VIDEO CODING USING GEOMETRY PROJECTION

CROSS-REFERENCE TO RELATED APPLICATIONS

This application is the National Stage Entry under 35 U.S.C. § 371 of Patent Cooperation Treaty Application No. PCT/US2017/041021, filed Jul. 7, 2017, which claims the benefit of U.S. Provisional Application Ser. No. 62/360,112 filed Jul. 8, 2016, U.S. Provisional Application Ser. No. 62/404,017 filed Oct. 4, 2016, U.S. Provisional Application Ser. No. 62/463,242 filed Feb. 24, 2017, and U.S. Provisional Application Ser. No. 62/500,605 filed May 3, 2017, the contents of which are incorporated by reference herein, and this application claims benefit of the filing date of these priority applications.

BACKGROUND

Virtual reality (VR) is being applied in many application areas including, but not limited to, healthcare, education, social networking, industry design/training, game, movie, shopping, entertainment, and/or the like. VR may enhance the viewer's experience, for example, by creating a virtual environment surrounding the viewer and generating a true sense of "being there" for the viewer. A VR system may support interactions through posture, gesture, eye gaze, voice, etc. The system may provide haptic feedback to the user such that the user may interact with objects in the VR environment in a natural way.

SUMMARY

Processing video data may include capturing the video data with multiple cameras and stitching the video data together to obtain a 360-degree video. As used herein, 360-degree videos may include spherical videos, omnidirectional videos, virtual reality (VR) videos, panorama videos, immersive videos (e.g., light field videos that may include 6 degree of freedom), point cloud videos, and/or the like. Geometry padding may be applied during 360-degree video encoding and/or decoding.

A 360-degree video content may be coded. A frame picture may be provided based on the captured video data with one or more cameras and stitching the captured video data. A current sample location may be identified in a frame-packed picture. The frame-packed picture may include one or more faces associated with the first projection geometry. The current sample location may be associated with a first projection geometry. The first projection geometry may include, for example, at least one of an equirectangular projection, equal-area projection, cubemap projection, octahedron projection, cylinder projection, or the like. The projection geometry described herein for coding the 360-degree video content are used as an exemplary manner, and those skilled in the art would appreciate that other projection formats may be used interchangeably.

Whether a neighboring sample location is located outside of a content boundary of the frame-packed picture may be determined. The content boundary may include a frame-packed picture boundary, face boundary, and/or the like. If the neighboring sample location is located outside of the content boundary of the frame-packed picture, a padding sample location may be derived based on one or more circular characteristics of the 360-degree video content and the first projection geometry. A 3D position of the neighboring sample location may be calculated. The neighboring sample location may be calculated in association with the face that contains the current sample location. A second face that contains the padding sample location may be determined based on the 3D position of the neighboring sample location. The second face may be different than the first face that contains the current sample location. A geometry projection may be applied with the 3D position of the neighboring sample location to derive a 2D planar position in the second face. A 2D planar position of the neighboring sample location in the second face may be derived as the padding sample location based on the geometry projection of the 3D position of the neighboring sample location.

If the neighboring sample location is located inside of the content boundary of the frame-packed picture, deriving the padding sample location may be skipped. The 360-degree video content may be processed using the neighboring sample location (e.g., that is located inside of the content boundary).

An intermediate projection may be used to derive the padding sample location. For example, a coordinate in the first projection geometry may be converted into an intermediate coordinate associated with a second projection geometry. The first projection geometry may be in a unicube projection, and the second projection geometry may be in a cubemap projection. The 3D position of the neighboring sample location may be calculated in the intermediate coordinate, and the 2D planar position of the neighboring sample location in the second face may be identified in the intermediate coordinate. The identified 2D planar position of the neighboring sample location associated with the second projection geometry may be converted back to the coordinate associated with the first projection geometry.

The 360-degree video content may be processed based on the derived padding sample location. For example, a padding sample value may be derived at the padding sample location. The padding sample value at the padding sample location may be derived using an interpolation filter. For example, a bilinear, bicubic, Lanczos, spline interpolation filter, discrete cosine transform based interpolation filter, and/or the like may be used. For example, inter predicting, intra predicting, deblocking, loop filtering, sample adaptive offsetting, adaptive loop filtering, and/or the like may be performed to derive the padding sample value. When the current sample location is located on the content boundary, a deblocking filter based on the padding sample location may be applied.

In accordance with the circular characteristics of the 360-degree video content, when the current sample location is located near a rightmost content boundary of the frame-packed picture and the determined neighboring sample location is located outside of the frame-packed picture beyond the right content boundary, the padding sample location may be located near a leftmost content boundary of the frame-packed picture that is circularly connected to the rightmost content boundary of the frame-packed picture. When the current sample location is located near the leftmost content boundary of the frame-packed picture and the determined neighboring sample location is located outside of the frame-packed picture beyond the left content boundary, the padding sample location may be located near the rightmost content boundary of the frame-packed picture that is circularly connected to the leftmost content boundary of the frame-packed picture. When the current sample location is located near a first area of a topmost content boundary of the frame-packed picture and the determined neighboring sample location is located outside of the frame-packed picture beyond the first area of the topmost content boundary, the padding sample location may be located near a second area of the topmost content boundary that is located in a circularly opposite side of the first area of the topmost content boundary. When the current sample location is located near a first area of a bottommost content boundary of the frame-packed picture and the determined neighboring sample location is located outside of the frame-packed picture beyond the first area of the bottommost content boundary, the padding sample location may be located near a second area of the bottommost content boundary that is located in a circularly opposite side of the first area of the bottommost content boundary.

For coding a 360-degree video content, a current block may be predicted based on a derived or mapped reference block. Whether an initial reference block associated with the current block is located outside of a content boundary of the frame-packed picture may be determined. If the initial reference block is outside of the content boundary, a mapped reference block may be derived based on one or more circular characteristic of the 360-degree video content and the first projection geometry. A 3D position of a location associated with the initial reference block may be identified. The location associated with the initial reference block may be calculated in associated with the face that contains the current block. A second face that contains the mapped reference block may be identified based on the 3D position of the location associated with the initial reference block. The first face may be different than the second face. A geometry projection may be applied based on the 3D position of the location associated with the initial reference block. A 2D planar position of the initial reference block in the second face may be derived for the mapped reference block based on the geometry projection.

If the initial reference block is inside of the content boundary, deriving the mapped reference block may be skipped. The current block may be predicted based on the initial reference block (e.g., that is located inside of the content boundary).

An intermediate projection may be used to derive the mapped reference block. For example, a coordinate in the first projection geometry may be converted into an intermediate coordinate associated with a second projection geometry. The first projection geometry may be in a unicube projection, and the second projection geometry may be in a cubemap projection. The 3D position of the location associated with the initial reference block location may be calculated in the intermediate coordinate. The 2D planar position of the initial reference block in the second face for deriving the mapped reference block may be identified in the intermediate coordinate. The identified 2D planar position of the initial reference block associated with the second projection geometry may be converted back to the coordinate associated with the first projection geometry.

When the current block is located near a rightmost content boundary of the frame-packed picture and the determined initial reference block is located outside of the frame-packed picture beyond the right content boundary, the mapped reference block may be located near a leftmost content boundary of the frame-packed picture that is circularly connected to the rightmost content boundary of the frame-packed picture. When the current block is located near the leftmost content boundary of the frame-packed picture and the determined initial reference block is located outside of the frame-packed picture beyond the left content boundary, the mapped reference block may be located near the rightmost content boundary of the frame-packed picture that is circularly connected to the leftmost content boundary of the frame-packed picture. When the current block is located near a first area of a topmost content boundary of the frame-packed picture and the determined initial reference block is located outside of the frame-packed picture beyond the first area of the topmost content boundary, the mapped reference block may be located near a second area of the topmost content boundary that is located in a circularly opposite side of the first area of the topmost content boundary. When the current block is located near a first area of a bottommost content boundary of the frame-packed picture and the determined initial reference block is located outside of the frame-packed picture beyond the first area of the bottommost content boundary, the mapped reference block may be located near at a second area of the bottommost content boundary that is located in a circularly opposite side of the first area the bottommost content boundary.

The sample values associated with the mapped reference block may be derived using an interpolation filter. For example, a bilinear, bicubic, Lanczos, spline interpolation filter, discrete cosine transform based interpolation filter, and/or the like may be used.

One or more attributes associated with the mapped reference block may be derived for predicting the current block. For example, the attribute(s) may include an intra mode, inter mode, merge mode, motion information and/or the like of a mapped block position. The current block may be predicted based on the attribute(s). The sample values in the mapped reference block may be derived for processing the 360-degree video content. For example, inter predicting, intra predicting, deblocking, loop filtering, sample adaptive offsetting, adaptive loop filtering, and/or the like may be used to derive the plurality of sample values in the mapped reference block for video processing.

The mapped reference block may be derived by unfolding a 3D geometry associated with the first projection geometry. When the initial reference block is not on a diagonal position to the content boundary, the current block may be predicted by replicating a nearest available block that is located perpendicularly or diagonally to the content boundary.

The current block may be predicted by determining a valid padded region of a face based on a size of the face. Whether the initial reference block is located in the valid padded region may be determined. When the initial reference block is located outside of the valid padded region, the current block may be predicted based on a nearest available block that is located in the valid padded region. If the initial reference block is located inside of the valid padded region, the current block may be predicted based on the mapped reference block.

An initial reference block may be partially located outside of the valid padded region. For example, the initial reference block may include a first sub-block located within the valid padded region and a second sub-block located outside of the valid padded region. The samples of the second sub-block located outside of the valid padded region may be padded using their respective neighboring sample values located in the valid padded region. The current block may be predicted based on the samples in the first sub-block and the padded samples in the second sub-block.

A range of a valid padded region may be determined based on at least a position and/or size of a face associated with the first projection geometry. Whether the initial reference block is at least partially located outside of the valid padded region may be determined. When the initial reference block is at least partially located outside of the valid padded region, the initial reference block may be excluded from predicting the current block.

BRIEF DESCRIPTION OF THE DRAWINGS

A more detailed understanding of the embodiments disclosed herein may be had from the following description, given by way of example in conjunction with the accompanying drawings.

FIG. 8 illustrates an example of using reference samples in HEVC intra prediction.

FIG. 17(b) is another illustration of example padding for a picture projected with equirectangular projection.

DETAILED DESCRIPTION

Figure 1A:
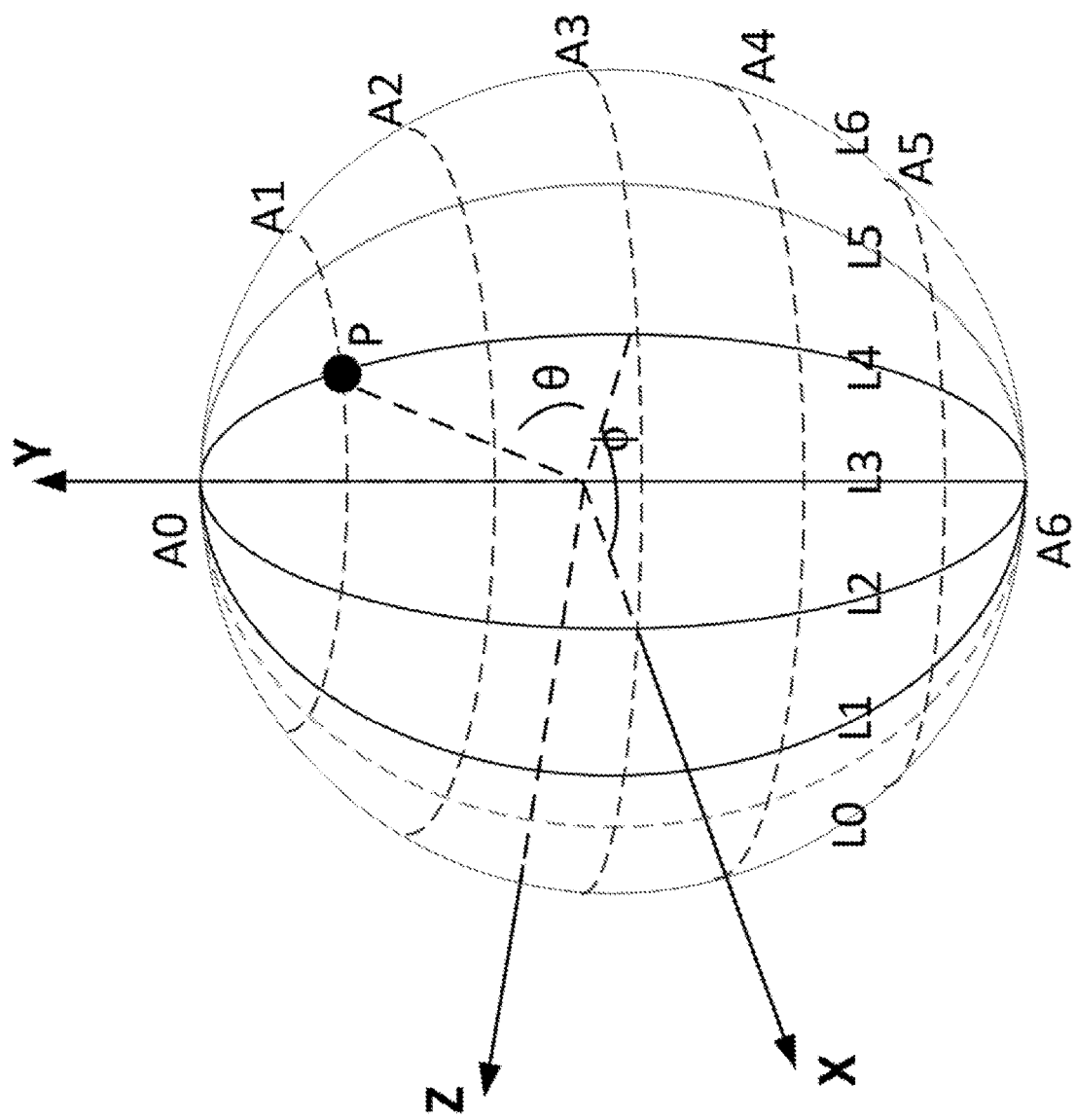
FIG. 1(a) illustrates an example sphere sampling along a longitude direction and a latitude direction in an equirectangular projection (ERP).

A detailed description of illustrative embodiments will now be described with reference to the various Figures. Although this description provides a detailed example of possible implementations, it should be noted that the details are intended to be exemplary and in no way limit the scope of the application.

VR systems may use one or more 360-degree videos. The 360-degree videos may be viewed from 360-degree angles in the horizontal direction and from 180-degree angles in the vertical direction. VR systems and 360-degree videos may be used for media consumption beyond Ultra High Definition (UHD) services. Free view TV (FTV) may test the performance of solutions. For example, FTV may test the performance of a 360-degree video (e.g., or an omnidirectional video) based system and/or a multi-view based system.

VR systems may include a processing chain. The processing chain may include capturing, processing, display, and/or applications. With respect to capturing, a VR system may use one or more cameras to capture scenes from different divergent views (e.g., 6 to 12 views). The views may be stitched together and may form a 360-degree video (e.g., in high resolution such as 4K or 8K). The client and/or user side of a VR system may include a computation platform, a head mounted display (HMD), and/or a head tracking sensor. The computation platform may receive, decode (e.g., 360-degree videos), and/or generate a viewport for display. Two pictures (e.g., one for each eye) may be rendered for the viewport. The two pictures may be displayed in the HMD for stereo viewing. Lens may be used to magnify the images displayed in the HMD. For example, lenses may be used to magnify the images displayed in the HMD for better viewing. The head tracking sensor may keep track (e.g., constantly keep track) of the viewer's head orientation. Orientation information may be fed to the VR system to display the viewport picture for that orientation. A VR system may provide a specialized touch device. For example, a specialized touch device may allow a viewer to interact with objects in the virtual world. A VR system may be driven by a workstation with a graphic processing unit (GPU) support. A VR system may use a mobile device (e.g., a smartphone) as a computation platform, as a HMD display and/or as a head tracking sensor. Spatial HMD resolution may be, for example, 2160×1200. Refresh rate may be, for example, 90 Hz. Field of view (FOV) may be, for example, about 110 degree. Sampling rate for a head tracking sensor may be, for example, 1000 Hz, to capture fast movements. A VR system may comprise lens and a cardboard, and may be driven by a smartphone. A VR system may be used for gaming. One or more 360-degree video streaming services may be provided.

A VR system may be capable of providing interactivity and/or haptic feedback. A HMD that is big may not be convenient for a person to wear. A resolution of 2160×1200 for stereoscopic views (e.g., as provided by certain HMDs) may not be sufficient, and may cause dizziness and discomfort for some users. Resolution increase may be desirable. VR experience may be enhanced by combining the visual effects of a VR system with force feedback of the real world. A VR roller coaster application may be an example of combining the visual effects of a VR system with force feedback of the real world.

Figure 1B:
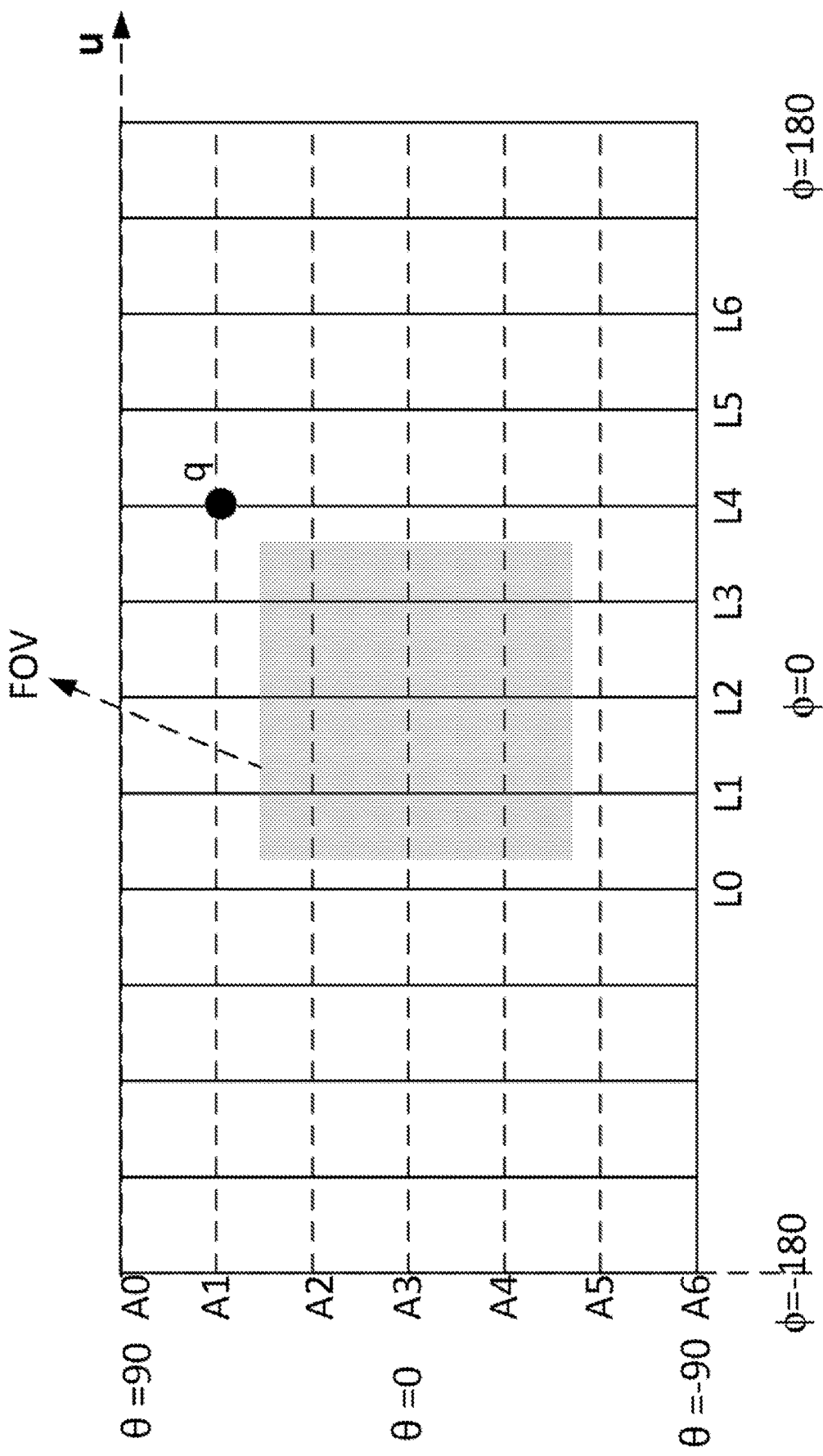
FIG. 1(b) illustrates an example 2D planar in ERP.

360-degree videos may be compressed and/or delivered, for example, using Dynamic Adaptive Streaming over HTTP (DASH)-based video streaming techniques. 360-degree video content may be represented with a sphere geometry structure. For example, synchronized multiple views may be captured by multiple cameras and may be stitched on a sphere. The synchronized multiple views may be stitched on the sphere as an integral structure. The sphere information may be projected onto a 2D planar surface via a geometry conversion process. For example, the sphere information may be projected onto a 2D planar surface via a geometry conversion process by using an equirectangular projection (ERP). FIG. 1(a) shows an example sphere sampling in longitudes ($\phi$) and latitudes ($\theta$). FIG. 1(b) shows an example sphere being projected onto a 2D plane using ERP. The longitude $\phi$ in the range $[-\pi, \pi]$ may be referred to as yaw, and the latitude $\theta$ in the range $[-\pi/2, \pi/2]$ may be referred to as pitch in aviation. $\pi$ may be the ratio of a circle's circumference to its diameter. (x, y, z) may represent a point's coordinates in a 3D space. (ue, ve) may represent a point's coordinates in a 2D plane after ERP. ERP may be represented mathematically, for example, as shown in Equations (1) and/or (2).

$$ue=(\phi/(2*\pi)+0.5)*W \qquad (1)$$

$$ve=(0.5-\theta/\pi)*H \qquad (2)$$

W and H may be the width and height of the 2D planar picture. As shown in FIG. 1(a), the point P, the cross point between longitude L4 and latitude A1 on the sphere, may be mapped to a unique point q in FIG. 1(b) in the 2D plane using Equations (1) and/or (2). Point q in the 2D plane shown in FIG. 1(b) may be projected back to point P on the sphere shown in FIG. 1(a), for example via inverse projection. The field of view (FOV) in FIG. 1(b) shows an example that the FOV in a sphere is mapped to 2D plane with a viewing angle along the X axis at about 110 degree.

Figure 1C:
FIG. 1(c) illustrates an example picture produced using ERP.

One or more 360-degree videos may be mapped to 2D videos. For example, 360-degree videos may be mapped to 2D videos using ERP. The 360-degree videos may be encoded with a video codec such as H.264 or high efficiency video coding (HEVC), and may be delivered to a client. At the client side, the videos may be decoded (e.g., in equirectangular format) and rendered based on the user's viewport, for example by projecting and displaying the portion belonging to FOV in the equirectangular pictures onto a HMD. The characteristics of an equirectangular 2D picture may be different from a 2D picture (e.g., a rectilinear video picture). FIG. 1(c) shows an example equirectangular picture. The top portion of the picture may correspond to the North Pole, and the bottom portion may correspond to the South Pole. As shown in FIG. 1(c), the top and/or the bottom portions may be stretched. For example, the top and/or the bottom portions may be stretched compared to the middle portion of the picture corresponding to the Equator. The stretching in the top and/or bottom portions may indicate that equirectangular sampling in the 2D spatial domain may be uneven. The motion field in a 2D equirectangular picture may be complicated. For example, the motion field in a 2D equirectangular picture in the temporal direction may be complicated.

Certain video codecs, (e.g., MPEG-2, H.264, and/or HEVC) that use a translational model to describe a motion field, may not be able to represent the shape-varying movements in an equirectangular-projected 2D planar picture. With ERP, areas closer to the poles may be less interesting to a viewer and/or content providers. For example, areas closer to the poles may be less interesting to a viewer and/or content providers compared to the areas closer to the Equator, and the viewer may not focus on the top and bottom portions for a long duration. The top and bottom portions may be stretched (e.g., because of the warping effects) to become a large portion of the 2D plane after ERP. Video compression for the stretched portions may take a large number of bits. Certain processing techniques may be applied to equirectangular picture coding. For example, pre-processing such as smoothing may be applied to the pole areas to reduce the bit costs for coding those areas.

Figure 2A:
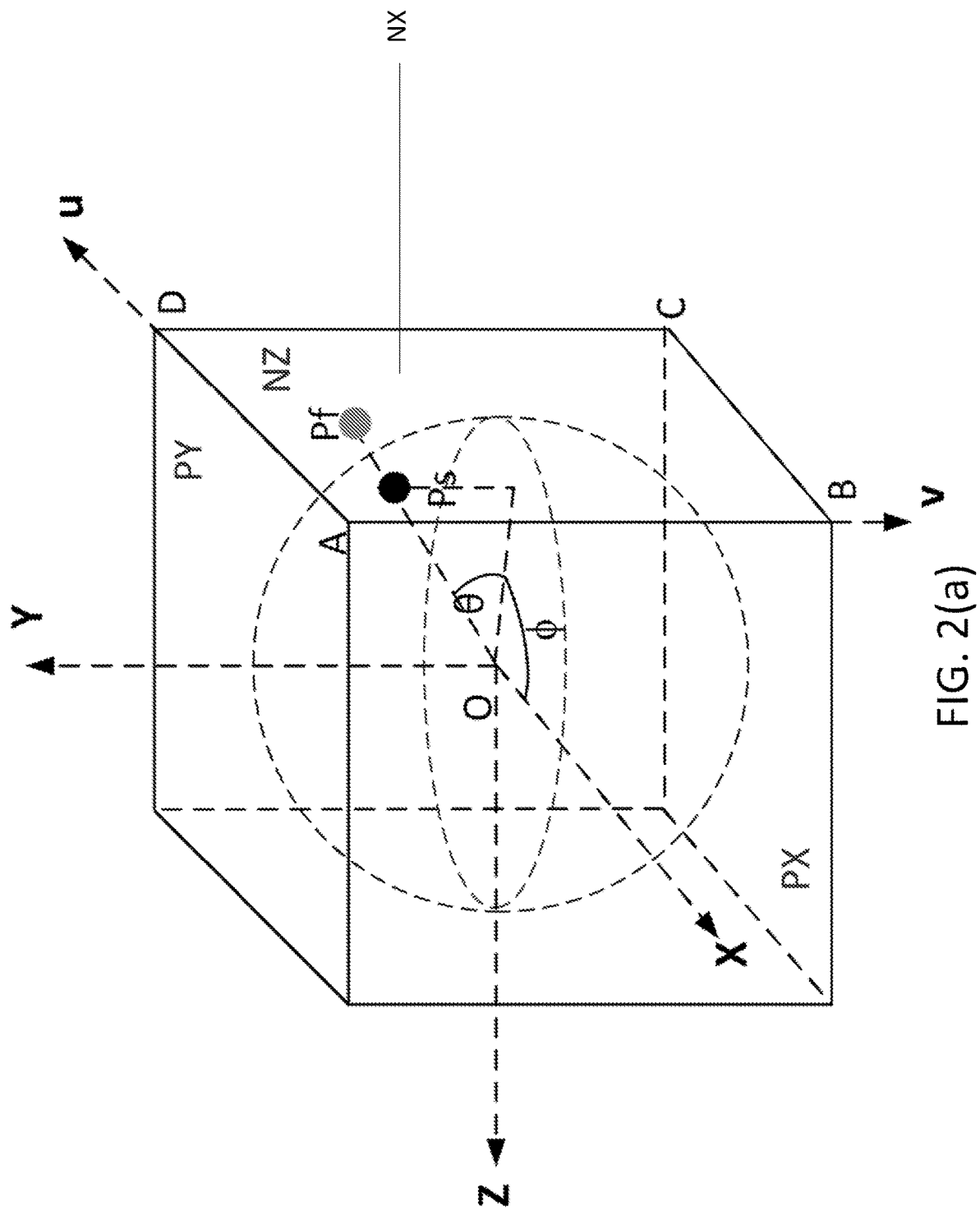
FIG. 2(a) illustrates an example 3D geometry structure in a cubemap projection (CMP).
Figure 2B:
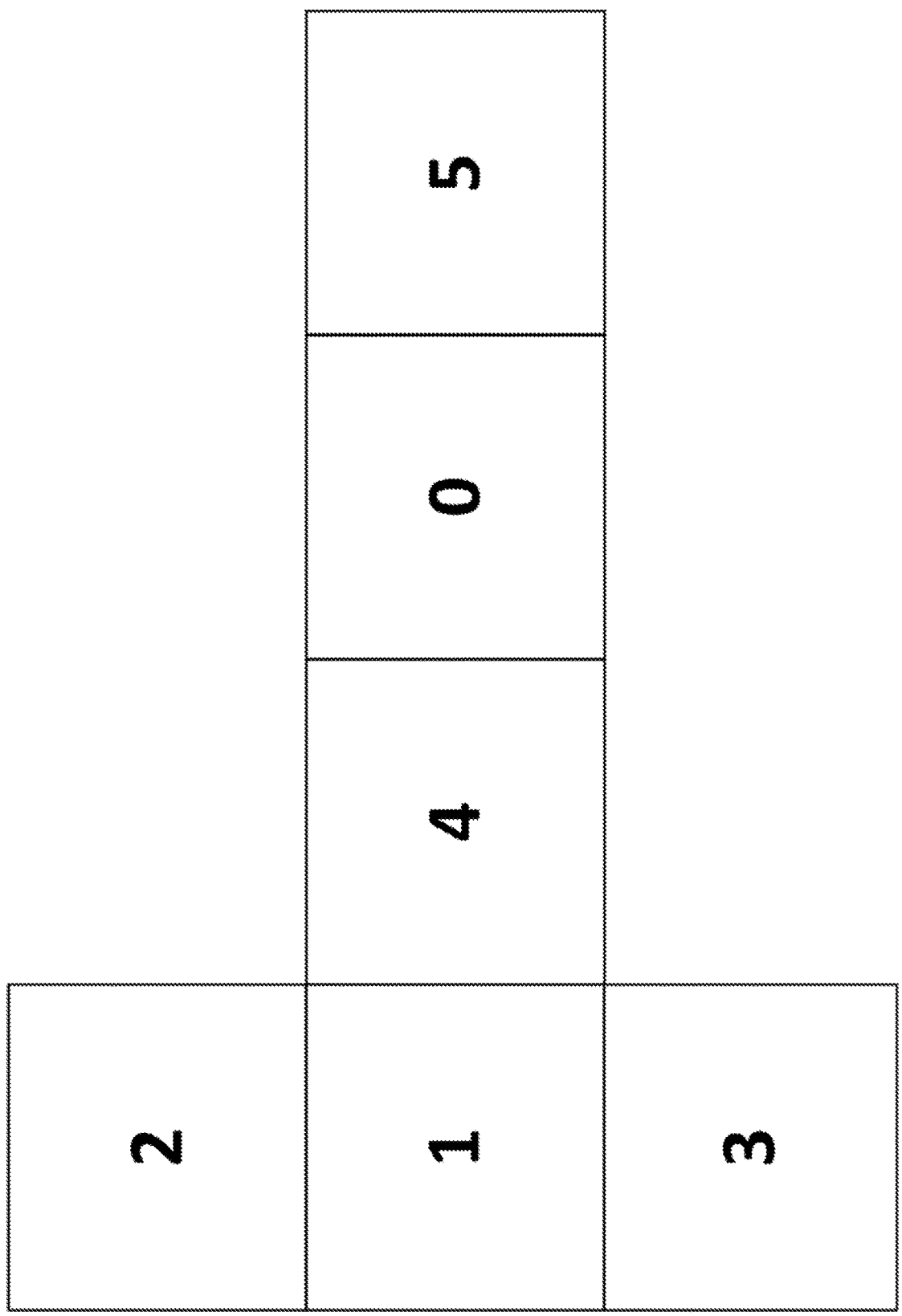
FIG. 2(b) illustrates an example 2D planar with 4×3 frame packing and six faces.
Figure 2C:
FIG. 2(c) illustrates an example picture produced using cubemap projection.

One or more different geometric projections may be used to represent 360-degree videos including, but not limited to, cubemap, equal-area, cylinder, pyramid, octahedron, and/or the like. Cubemap may utilize six faces. A face in a cubemap may be a planar square. FIG. 2(a) shows example cubemap projection (CMP). The cubemap may include six faces. For example, the cubemap may include six square faces. Supposing that the radius of the tangent sphere shown is one, the lateral length of a face (e.g., square face) of the cubemap may be two. FIG. 2(b) shows an example packing for placing six faces into rectangular areas, which may be used for encoding and delivery. FIG. 2(c) shows an example picture produced using CMP. The gray parts 201 and 203 without a picture may represent one or more padded regions to fill in the rectangular picture. For a face in the CMP, the picture may look the same as a 2D picture. The boundary of a face may not be continuous. For example, a straight line crossing two neighboring faces may be curved at the boundary of those two faces. Motions at the face boundary may be discontinuous.

Figure 3A:
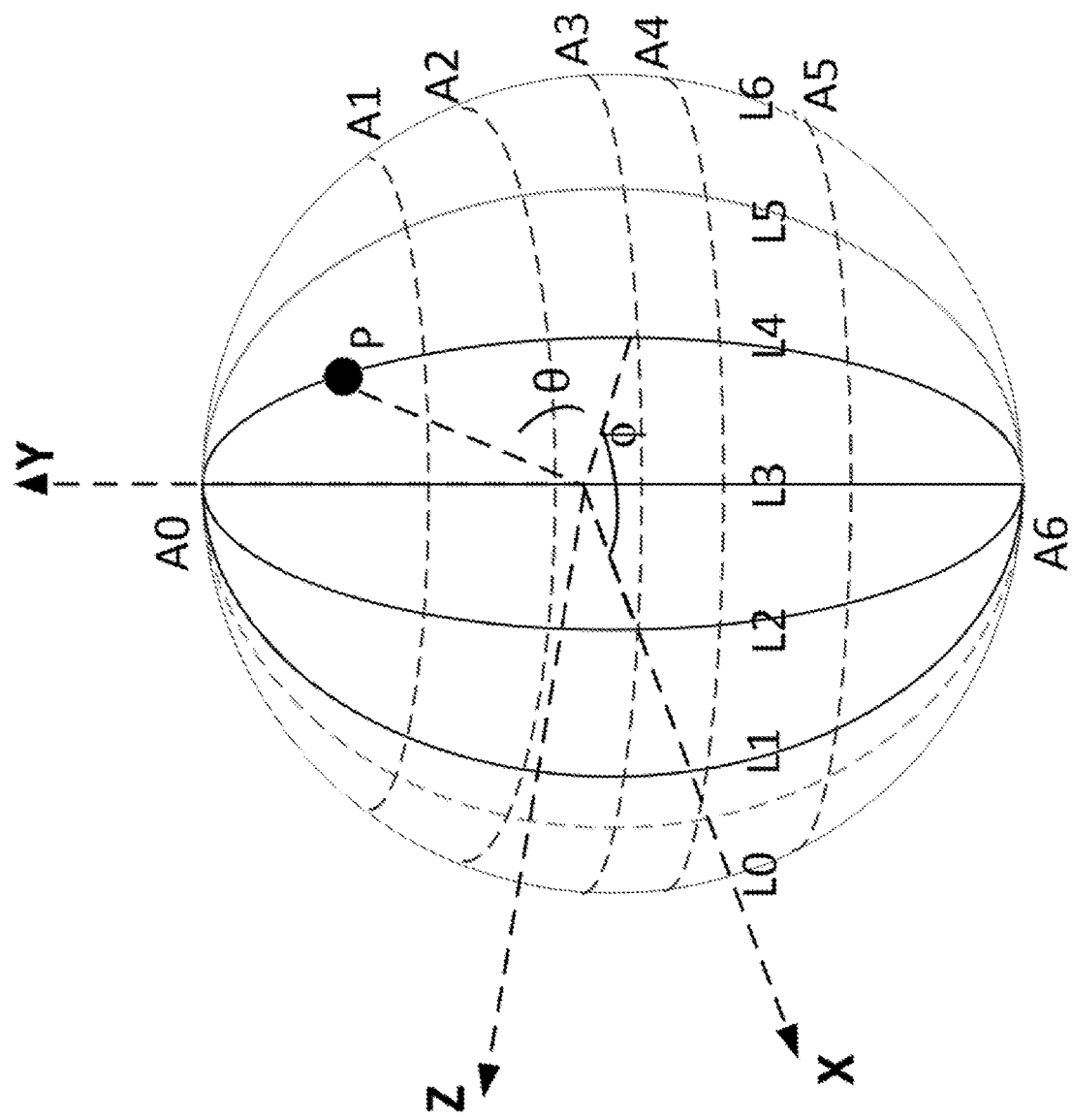
FIG. 3(a) illustrates an example sphere sampling in an equal-area projection (EAP).
Figure 3B:
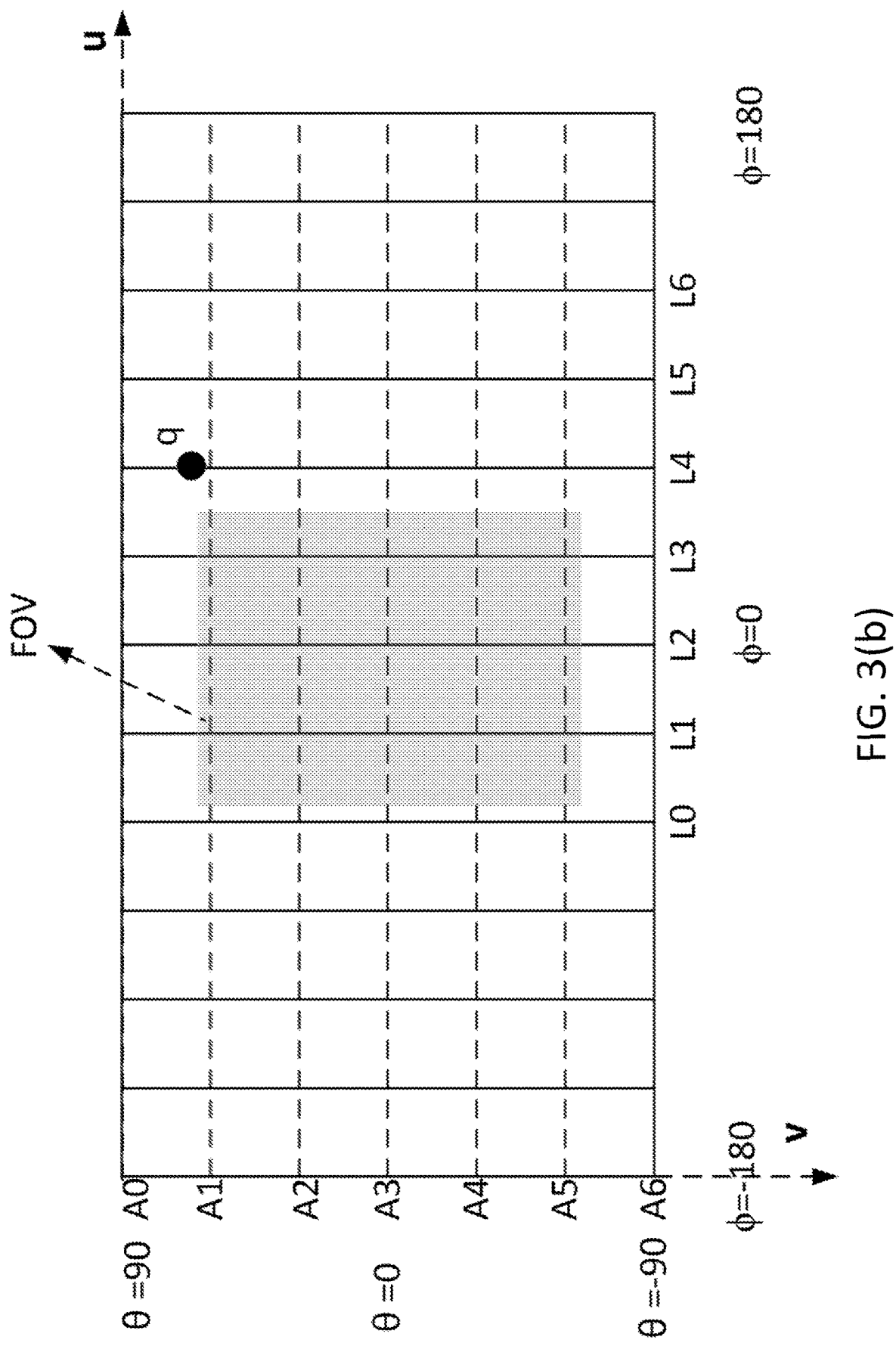
FIG. 3(b) illustrates an example 2D planar in EAP.
Figure 3C:
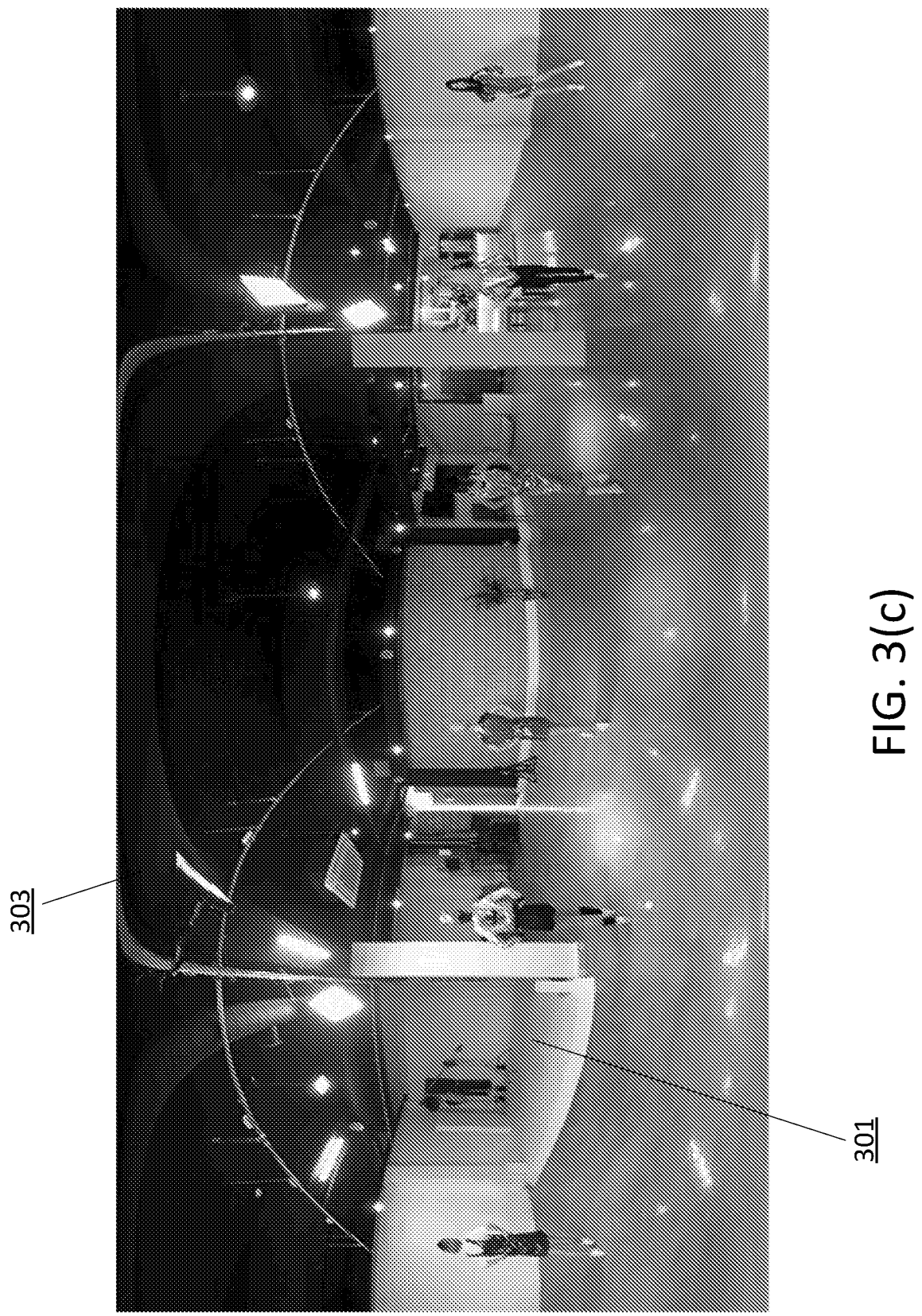
FIG. 3(c) illustrates an example picture produced using EAP.

FIG. 3(a) shows an example geometry structure of equal-area projection (EAP). Vertical sampling on the sphere of equal-area projection may not be based on even intervals of a pitch. Projection on the Y axis of a sampled latitude (e.g., each sampled latitude) may be evenly distributed so that the sample on the sphere may occupy the same area. Sampling in the vertical direction may become sparse for regions close to the pole regions. More samples may be used around the equator, as shown in FIG. 3(a). A user may view the regions near the equator more frequently than the regions near the poles. FIG. 3(b) shows an example 2D planer in EAP. FIG. 3(c) shows an example picture with EAP. As shown in FIG. 3(c), regions around the equator (e.g., 301) may be scaled up while regions around the Pole may be squeezed (e.g., 303).

Figure 4A:
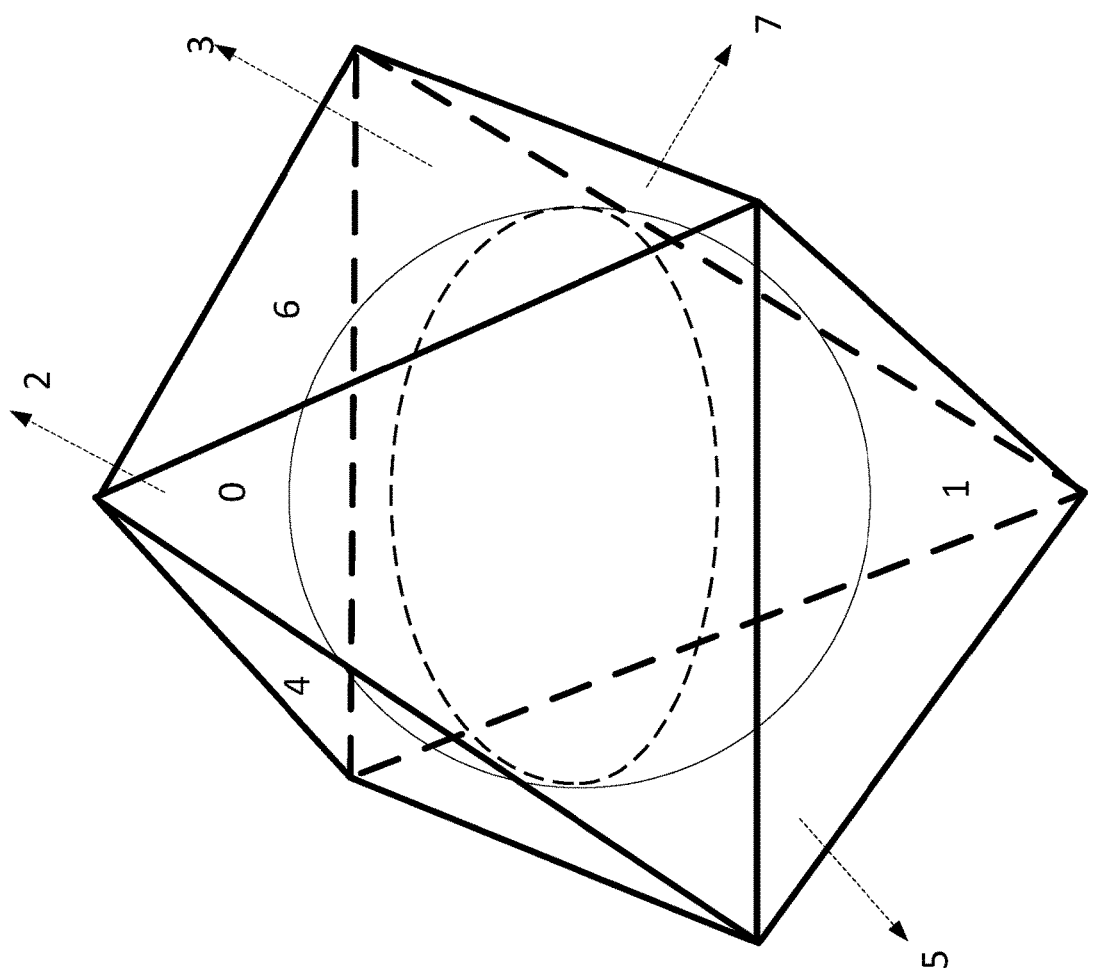
FIG. 4(a) illustrates an example 3D geometry structure in octahedron projection.
Figure 4B:
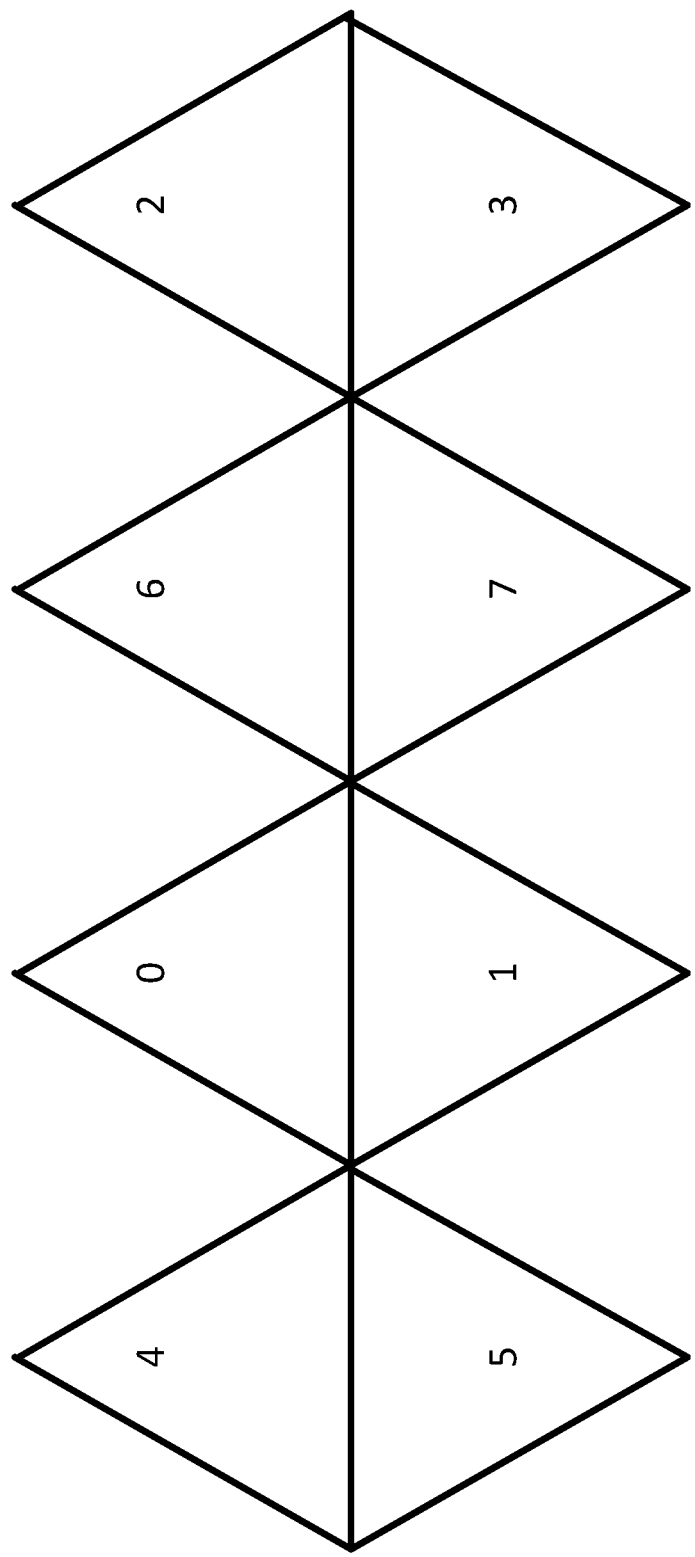
FIG. 4(b) illustrates example 2D planar frame packing in octahedron projection.
Figure 4C:
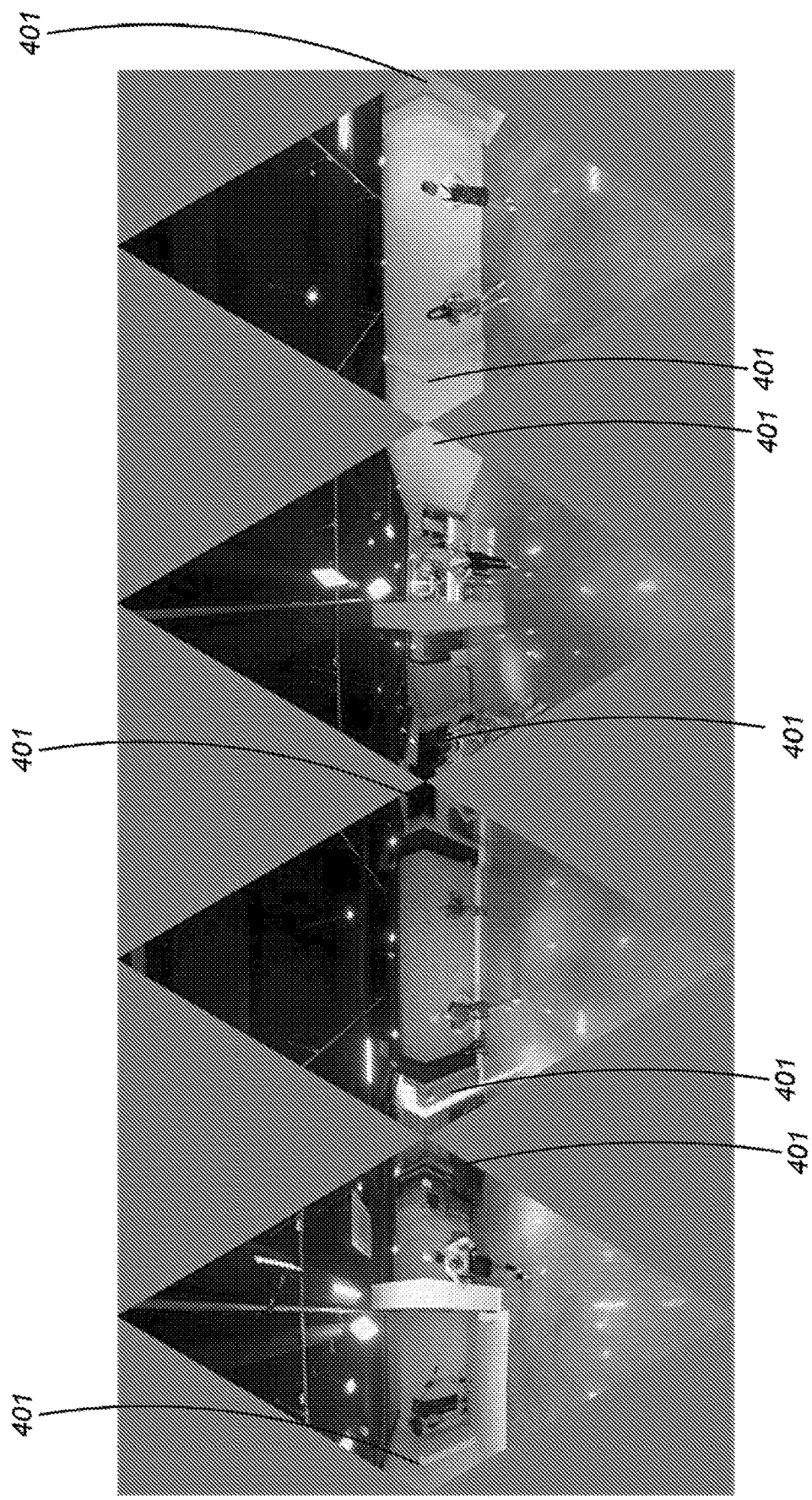
FIG. 4(c) illustrates an example picture produced using octahedron projection.

FIG. 4(a) shows an example geometry structure of octahedron projection. An octahedron may comprise eight equal-lateral triangle faces. If the radius of the tangent sphere is one, the lateral length of each triangle may be $\sqrt{6}$. FIG. 4(b) shows an example packing for arranging eight triangles into a rectangular area. FIG. 4(c) shows an example picture with octahedron projection. Warping distortions may be observed at the corners of shared boundaries of two neighboring triangles (e.g., 401).

The coding efficiency of different geometry projection may be compared. For example, a latitude based peak signal-to-noise ratio (L-PSNR) may be used for the comparison. One or more (e.g., two) factors may be considered: even sampling on the sphere and/or a viewer's viewing behavior. A specific number of samples that are evenly distributed on the sphere may be defined. The weight of a sample may be defined based on its latitude. Distortions may be measured with weighted mean square error (MSE) by considering the evenly distributed samples. The weight may be derived by tracking the viewing angles of a viewer. For example, the weight may be derived by tracking the viewing angles of a viewer using training sequences.

A larger weight may be given for a sample if it is viewed more frequently. For example, a larger weight may be given to samples around the equator than to samples near to the poles since interesting content may be located around the equator. By using evenly distributed samples on the sphere, the performances of different projections may be compared. These sphere samples may be pre-defined and may not be projected to integer sampling positions when different projections are applied. If an interpolation filter-based resampling is applied, additional interpolation errors may be introduced. If nearest neighboring sampling is applied, evenly sampling may not be guaranteed.

Equirectangular format may be supported with one or more 360-degree cameras and stitching. During the encoding of a 360-degree video with cubemap geometry, equirectangular format may be converted to cubemap format. There may be a relationship between equirectangular and cubemap. In FIG. 2(a), a face may be referred with each of the three axes going from the center of the sphere to the center of the face. P may stand for positive, and N may stand for negative, as shown in FIG. 2(a). PX may represent the direction along positive x axis from the center of the sphere, and NX may represent the reverse direction of PX. Similar notation may be used for PY, NY, PZ, and/or NZ. Six faces (e.g., PX, NX, PY, NY, PZ, and/or NZ) may correspond to the front, back, top, bottom, left, and/or right faces, respectively. The faces may be indexed from 0 to 5. For example, the faces may be indexed as following: PX (0), NX (1), PY (2), NY (3), PZ (4), and/or NZ (5). Ps (X_s, Y_s, Z_s) may be a point on the sphere with a radius of 1. The point, Ps, may be represented in yaw $\phi$ and pitch $\theta$ as follows:

$$X\_s = \cos(\theta)\cos(\phi) \quad (3)$$

$$Y\_s = \sin(\theta) \quad (4)$$

$$Z\_s = -\cos(\theta)\sin(\phi) \quad (5)$$

A point Pf may be the point on the cube when a line is extended from the sphere center to Ps. Pf may be on face NZ. The coordinates of Pf, (X_f, Y_f, Z_f), may be calculated as follows:

$$X\_f = X\_s/|Z\_s| \quad (6)$$

$$Y\_f = Y\_s/|Z\_s| \quad (7)$$

$$Z\_f = -1 \quad (8)$$

where |x| may be the absolute value of variable x. The coordinates of Pf, (uc, vc), in the 2D plane of face NZ may be calculated as follows:

$$uc = W^*(1-X\_f)/2 \quad (9)$$

$$vc = H^*(1-Y\_f)/2 \quad (10)$$

Using one or more Equations (3) to (10), a relationship may be derived between the coordinates (uc, vc) in cubemap on a particular face and the coordinates ($\phi$, $\theta$) on the sphere. The relationship between equirectangular point (ue, ve) and the point ($\phi$, $\theta$) on the sphere may be known from Equations (1) and/or (2). There may be a relationship between equirectangular geometry and cubemap geometry.

The geometry mapping from cubemap to equirectangular may be expressed as follows. Given the point (uc, vc) on one face on a cubemap, the output (ue, ve) on the equirectangular plane may be calculated as one or more of the following. The coordinates of 3D point P_f on the face with (uc, vc) may be calculated according to the relationship in Equations (9) and/or (10). The coordinates of 3D point P_s on the sphere with P_f may be calculated according to the relationship in Equations (6), (7), and/or (8). The ($\phi$, $\theta$) on the sphere with P_s may be calculated according to the relationship in Equations (3), (4), and/or (5). The coordinates of the point (ue, ve) on the equirectangular picture from ($\phi$, $\theta$) may be calculated according to the relationship in Equations (1) and/or (2).

In order to represent a 360-degree video in a 2D picture using cubemap, the six faces of the cubemap may be packed into a rectangular area. This may be referred to as frame packing. The frame-packed pictures may be treated (e.g., coded) as a 2D picture. Different frame packing configurations may be used (e.g., 3×2 and/or 4×3). In a 3×2 configuration, the six cubemap faces may be packed into 2 rows, with 3 faces in one row. In a 4×3 configuration, the 4 faces (e.g., PX, NZ, NX, and PZ) may be packed into one row (e.g., the center row), and the other two faces (e.g., PY and NY) may be separately packed into two different rows (e.g. the top and bottom rows). FIG. 2(c) shows an example of 4×3 frame packing that corresponds to the equirectangular picture in FIG. 1(c).

A 360-degree video in equirectangular format may be converted into cubemap format. For example, the 360-degree video in equirectangular format may be converted into cubemap format using the 360-degree video in equirectangular format as an input. For a sample position (uc, vc) in cubemap format, the corresponding coordinates (ue, ve) in equirectangular format may be calculated. If the calculated coordinates (ue, ve) in equirectangular are not at an integer sample position, an interpolation filter may be used. For example, an interpolation filter may be used to obtain a sample value at this fractional position using samples from the neighboring integer positions.

The cubemap format may be a representation format of a 360-degree video. The samples on the sphere may be unevenly sampled by the cubemap format. For example, the samples on the sphere may be unevenly sampled by the cubemap format with a higher sampling rate near face boundaries and/or a lower sampling rate near face centers. The samples on the sphere may be unevenly sampled by the cubemap format due to the limitation of the rectilinear projection. Certain spherical sampling characteristics may exist in the cubemap format. For example, a higher sampling rate at face boundaries and/or a lower sampling rate at face centers spherical sampling characteristics may exist in the cubemap format. The cubemap projection may enlarge the region around the boundaries of a face and/or may shrink the region around the center of a face.

Motion models may include a translational motion model, affine motion model, and/or the like. The cubemap projection may reduce the regularity of the resulting motion field in a projection face.

A unicube map projection format may be provided. The sampling grid of the cubemap may be turned into a uniform sampling grid on the sphere. A mapping may be used to modify the coordinate of samples on a 2D planar face before the actual cube faces are generated.

Figure 24A:
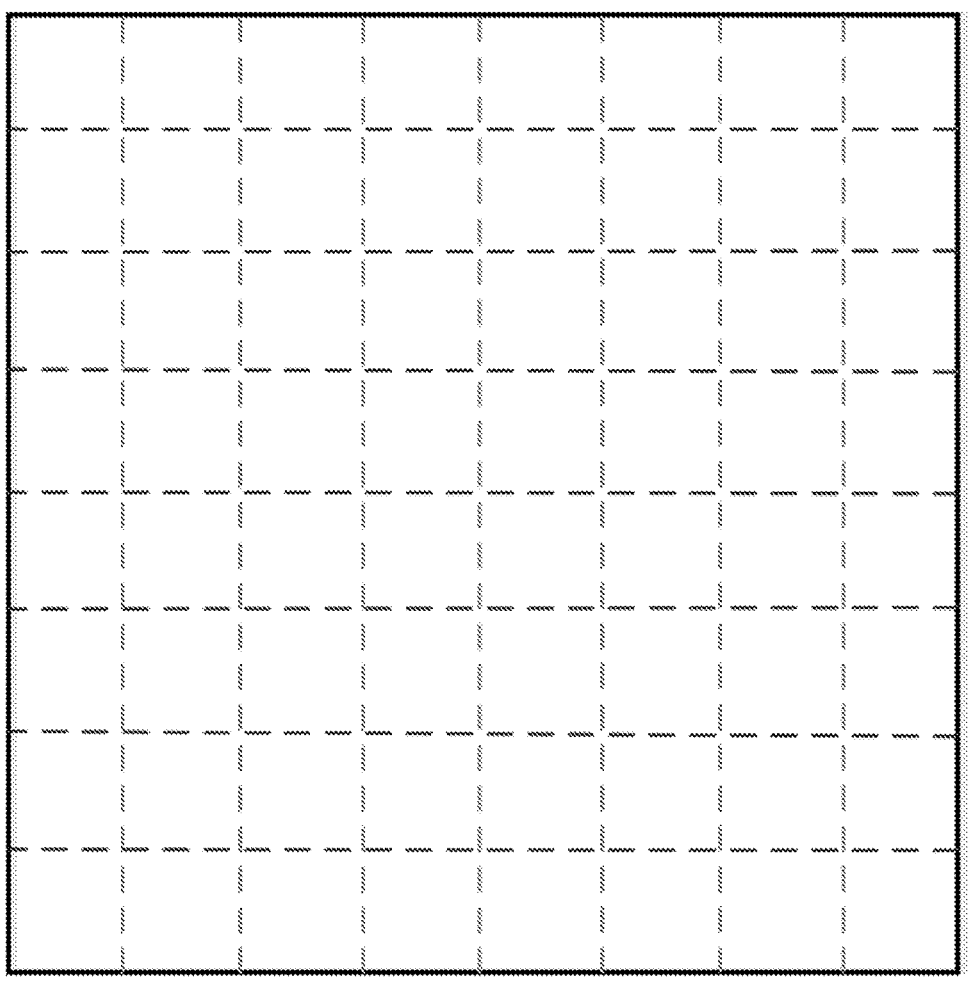
FIG. 24(a) shows an example illustration of the uniform sampling of a cube face for cubemap.
Figure 24B:
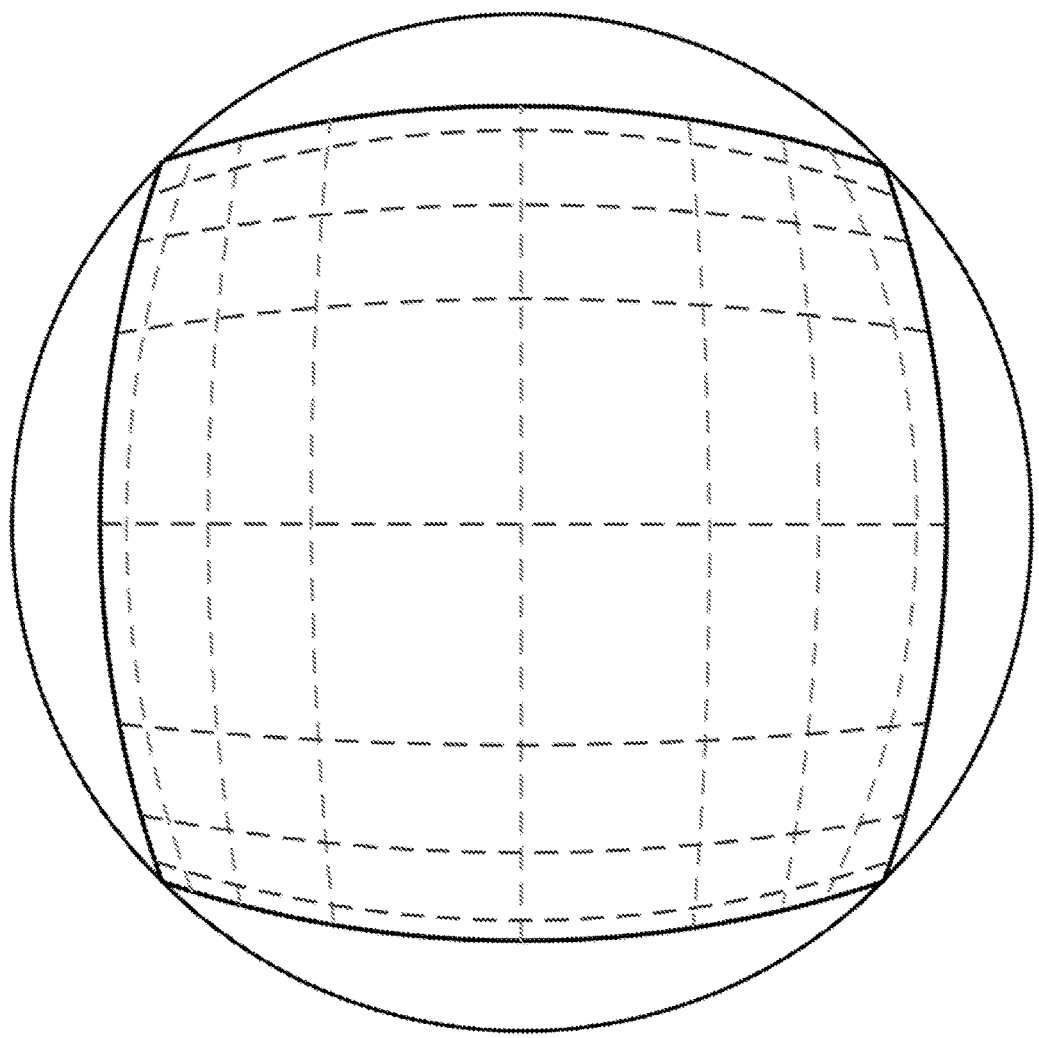
FIG. 24(b) shows an example illustration of the non-uniform spherical sampling for cubemap.
Figure 24C:
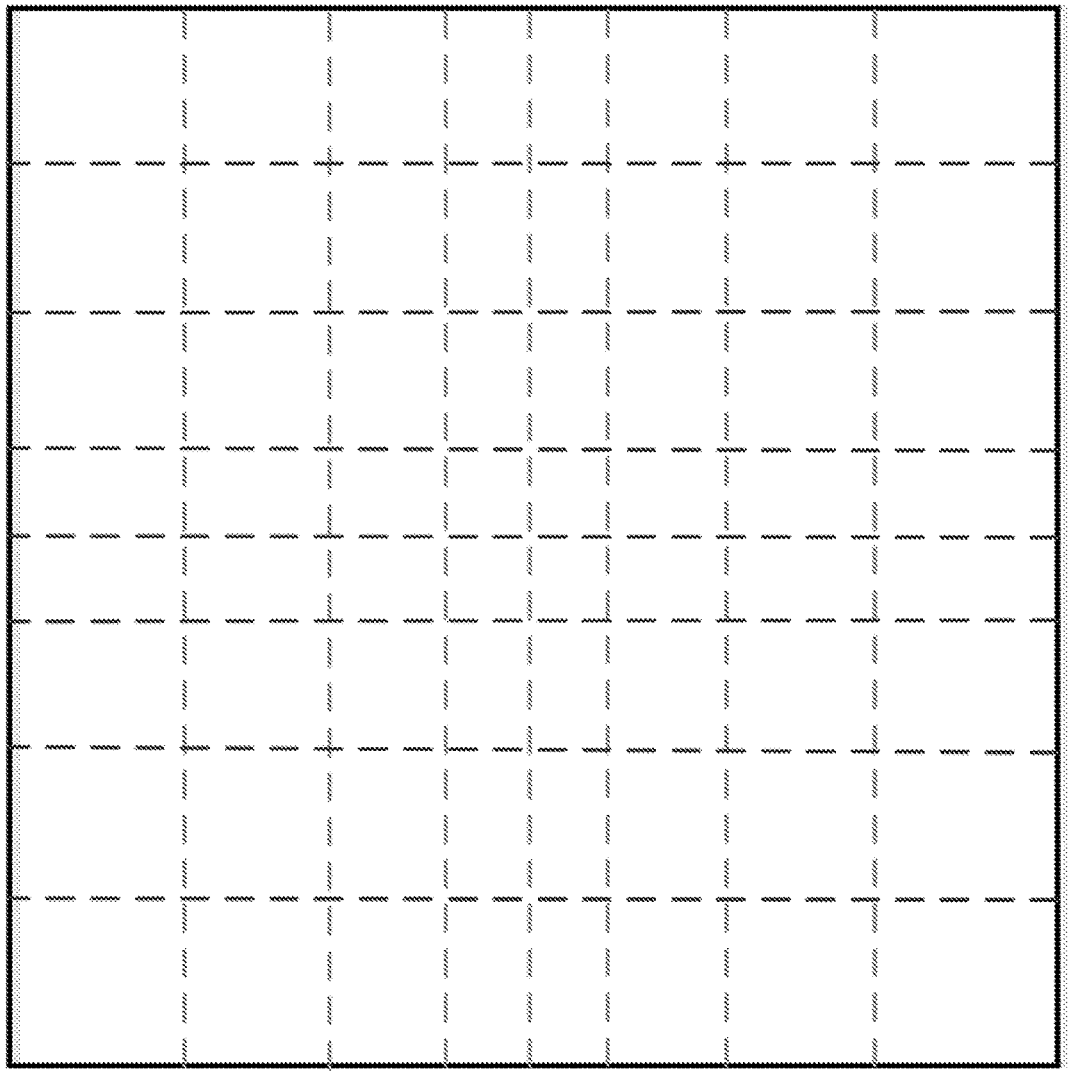
FIG. 24(c) shows an example illustration of the non-uniform sampling of a cube face for unicube.
Figure 24D:
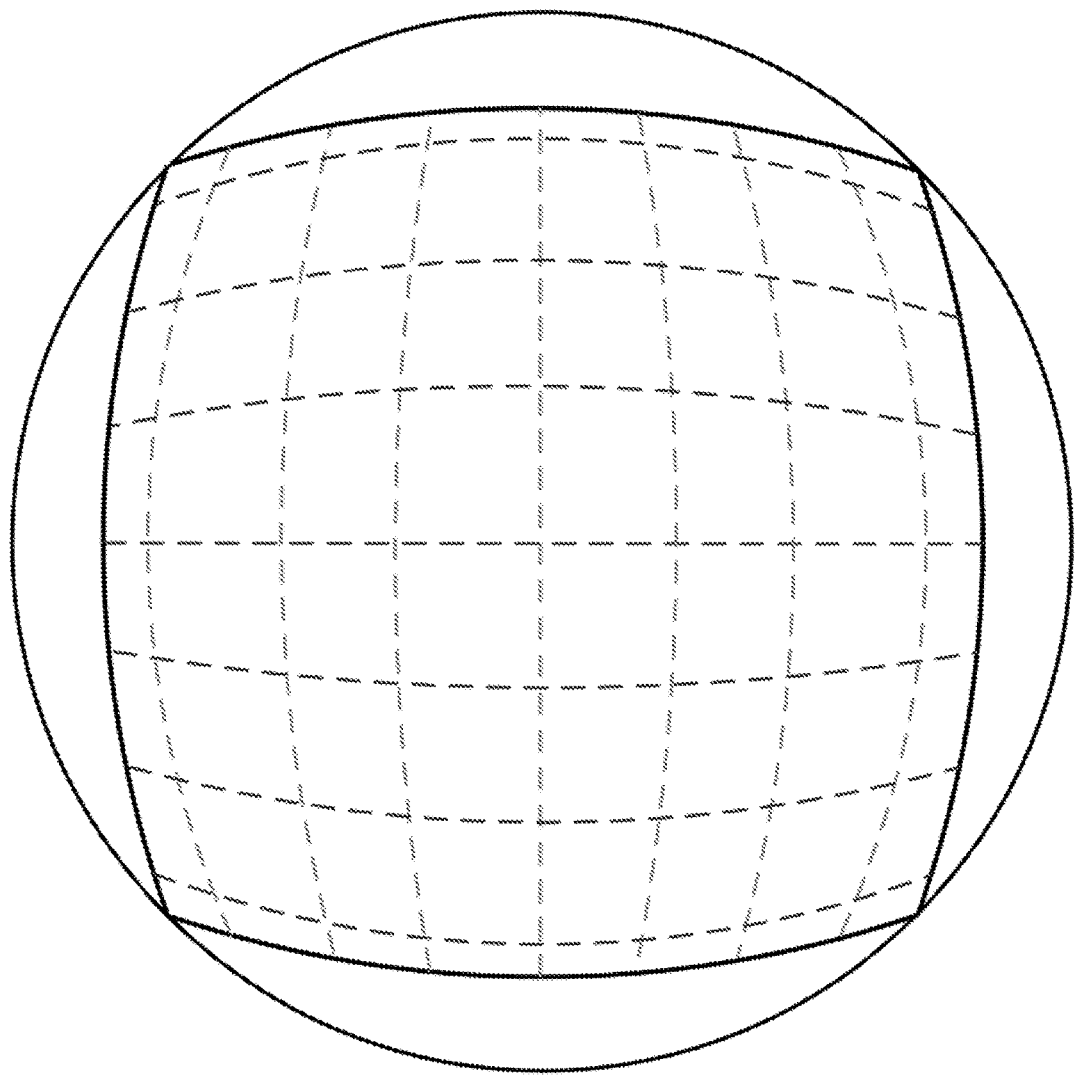
FIG. 24(d) shows an example illustration of the uniform spherical sampling for unicube.

FIGS. 24(a)-(d) illustrates examples of the planar and spherical sampling patterns between cubemap and unicube. For example, FIG. 24(a) illustrates an example uniform sampling of a cube face for cubemap. As shown in FIG. 24(a), the sampling grid of a cubemap face may include two sets of parallel lines: one line in a horizontal direction and other line in a vertical direction. A set of parallel partitioning lines may be separated with a uniform interval. When the cubemap face is projected onto the sphere, the sampling grid may be distorted. For example, the straight lines in the planar face may become curves, as shown in FIG. 24(b). FIG. 24(b) illustrates an example non-uniform spherical sampling for cubemap. Sampling grids on the sphere may become non-uniform. For example, sampling grids on the sphere may become non-uniform because rectilinear projection may not be a distance-reserved projection, as shown in FIG. 24(b). To maintain a similar sampling structure as cubemap, a face in unicube format may be sampled based on one or more (e.g., two) sets of parallel lines. The parallel lines in a set may be distributed non-uniformly such that the corresponding sampling grid on the sphere may be uniform. FIG. 24 (c) illustrates an example non-uniform sampling of a cube face for unicube. For example, the parallel lines in a set may be distributed non-uniformly as shown in FIG. 24(c). FIG. 24(d) illustrates an example uniform spherical sampling for unicube. The corresponding sampling grid on the sphere may be uniform as shown in FIG. 24(d).

Figure 25:
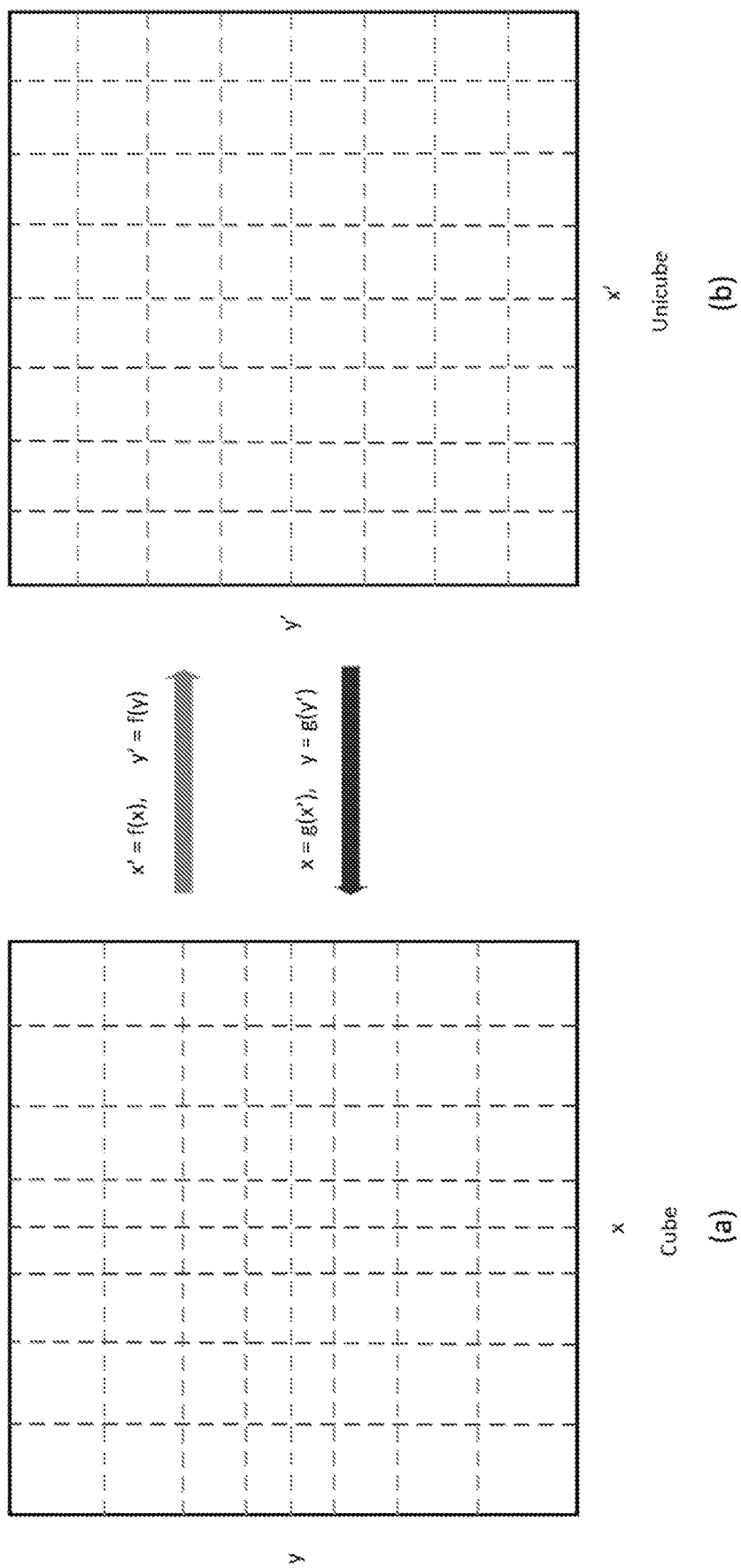
FIG. 25(a) illustrates an example mapping from the non-uniform partition grid of a cube face to the uniform partition grid of a unicube face.
FIG. 25(b) illustrates an example mapping from the uniform partition grid of a unicube face to the non-uniform partition grid of a cube face.
Figure 26A:
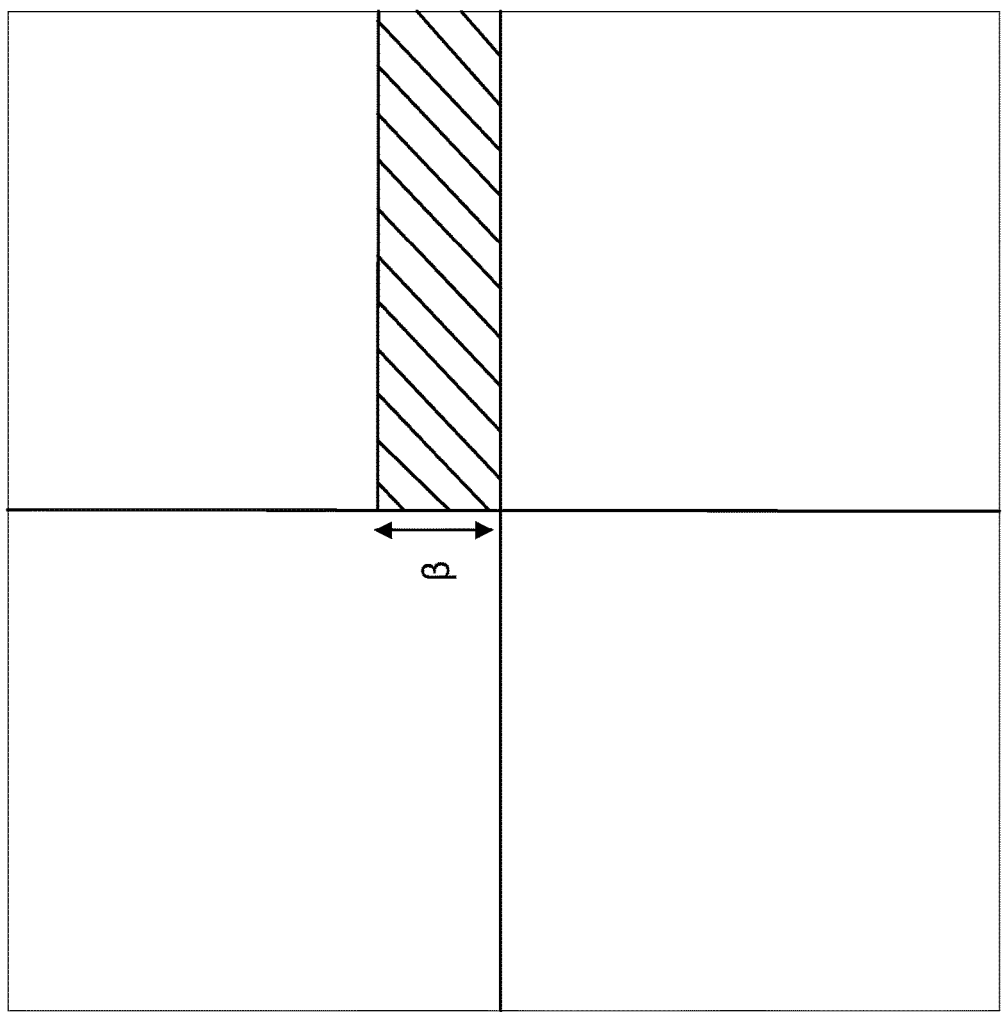
FIG. 26(a) illustrates an example non-uniform partition on the cube face.
Figure 26B:
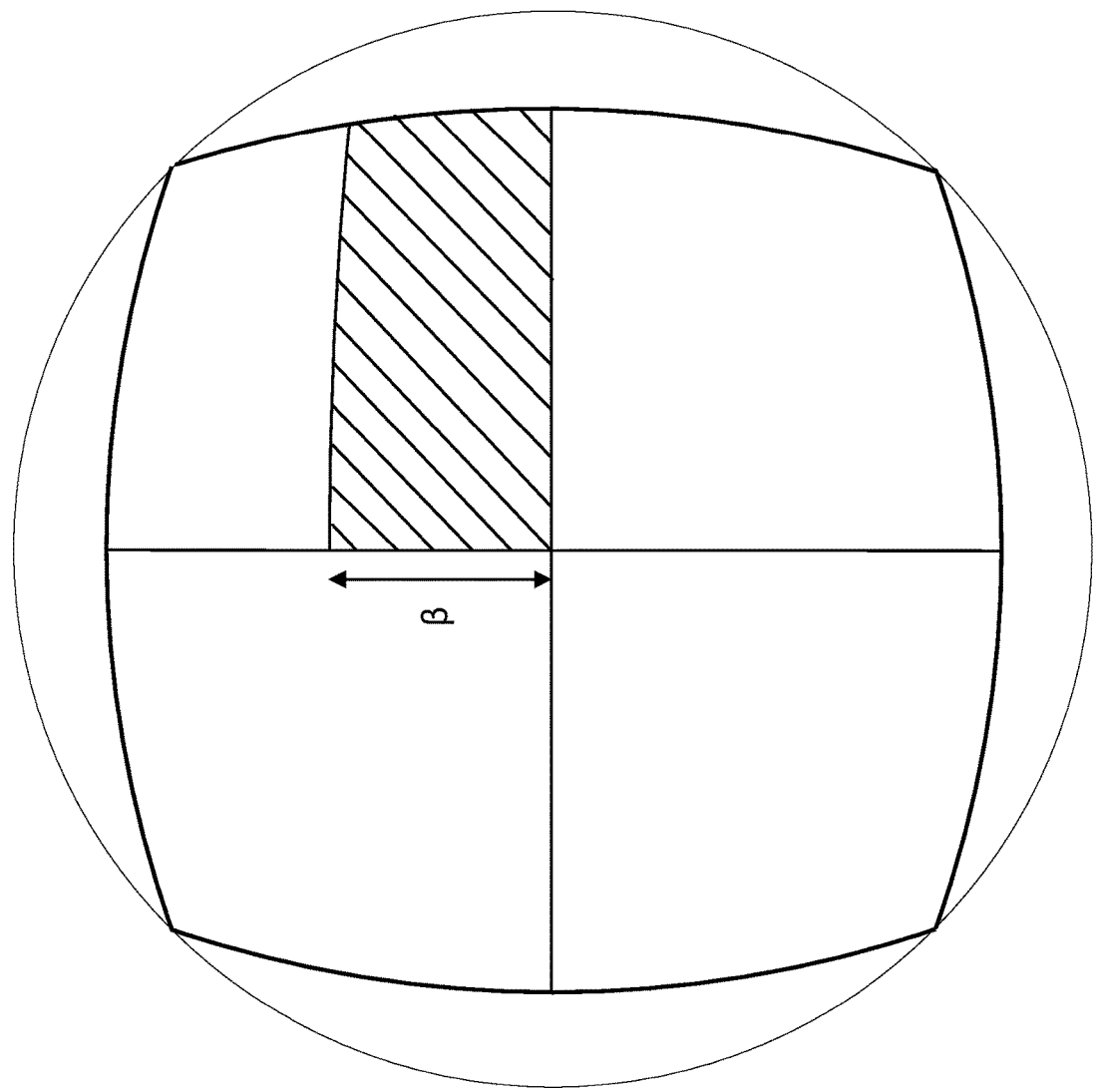
FIG. 26(b) illustrates an example uniform partition on the sphere.
Figure 26C:
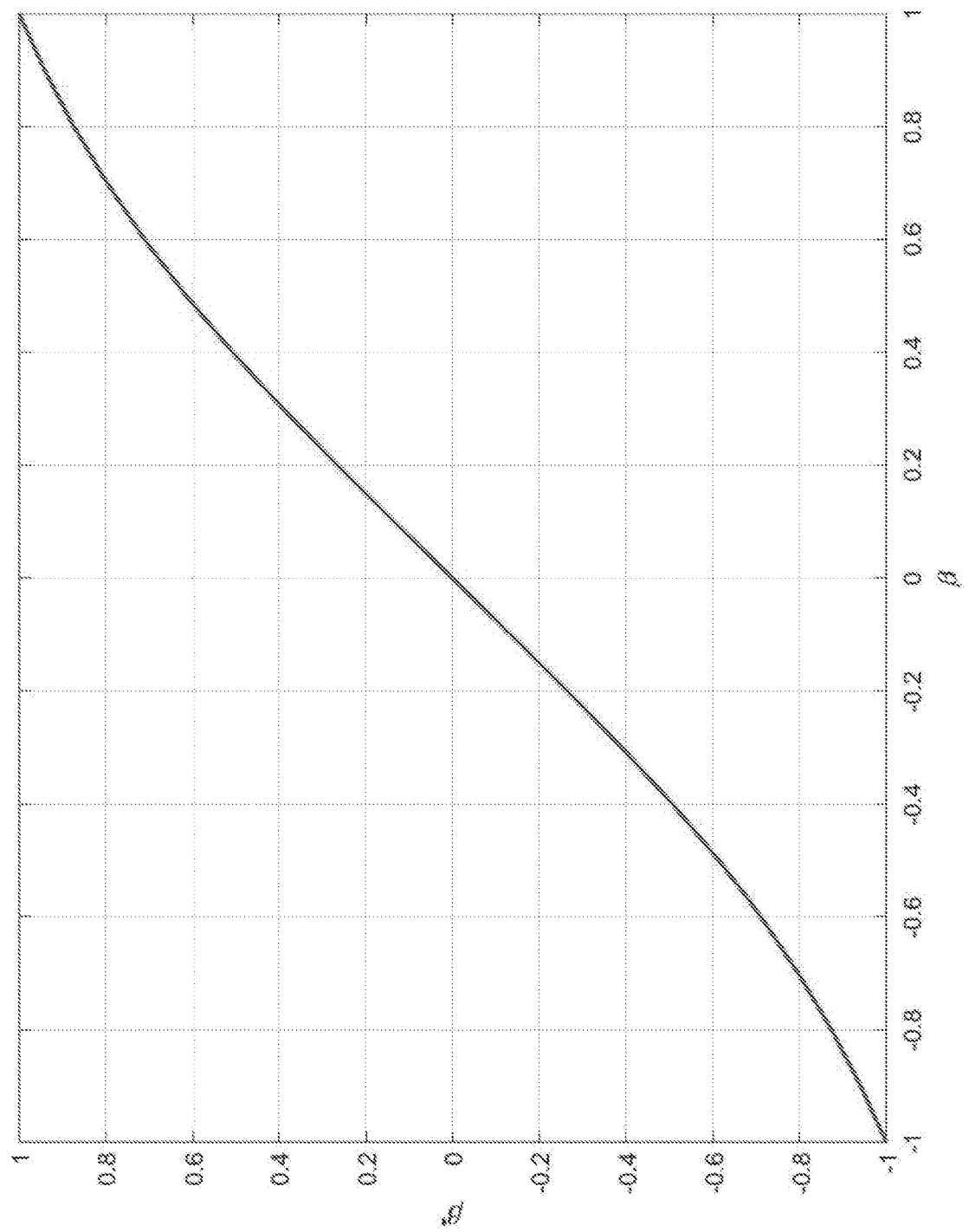
FIG. 26(c) illustrates an example mapping between the coordinate of cube face β and the coordinate of unicube face β'.

The non-uniform partition on the cube face, as shown in the example of FIG. 24(c), may be associated with a varying distance between neighboring samples. A mapping may be used to transform the non-uniform planar sampling grid into a uniform planar sampling grid. FIG. 25 shows an example mapping between cube face and unicube face. For example, FIG. 25(a) illustrates an example mapping from the non-uniform partition grid of a cube face to the uniform partition grid of a unicube face. FIG. 25(b) illustrates an example mapping from the uniform partition grid of a unicube face to the non-uniform partition grid of a cube face. If the horizontal and vertical transforms are separable, the mapping from (x, y) to (x', y') may include one or more (e.g., two) separate transforms, e.g., x'=f(x) and y'=f(y), where a transform may be applied on x and y. For example, the transform may be applied on x and y independently. The inverse transform may be computed, which may map (x', y') to (x, y), e.g., x=g(x') and y=g(y'). The two transforms of x and y may be identical. If the two transform functions of x and y are identical, the derivation of the transform functions of y may be performed. For example, if $\beta \in [-1, 1]$ is the y coordinate of the pattern area on the cube, FIG. 26 shows an example of calculating the mapping functions between the coordinates of cube face and the coordinates of unicube face. FIG. 26(a) illustrates an example mapping function of unicube using one non-uniform partition on the cube face. FIG. 26(b) illustrates an example mapping function of unicube using the corresponding uniform partition on the sphere. FIG. 26(c) illustrates mapping function between the coordinates of cube face (and the coordinate of unicube face $\beta'$. The mapping function $\beta'=f(\beta)$ may target at converting $\beta$ to $\beta'$ with equal rectilinear structure partitioning on the sphere (e.g., as shown in FIG. 24(b)), and $f(\beta)$ may be proportional to the area of the spherical region corresponding to $\beta$. For example, as shown in FIG. 26(b), the value of $f(\beta)$ may be equal to the ratio between the area of the pattern spherical region and the quarter of the sphere. For example, the mapping function $f(\beta)$ may be calculated as:

$$\beta' = f(\beta) = \frac{6}{\pi}\sin^{-1}\left(\frac{\beta}{\sqrt{2\beta^2+2}}\right) \qquad (11)$$

$$\beta = g(\beta') = \frac{\sin(\frac{\pi}{6}\beta')}{\sqrt{\frac{1}{2} - \sin^2(\frac{\pi}{6}\beta')}} \quad (12)$$

where β"∈[−1, 1]. FIG. 26(c) illustrates the corresponding mapping relationship between β and β'.

Cubemap-like projection formats may provide one or more spherical sampling features by adjusting the coordinates of the cubemap. For example, the coordinates of the cubemap may be adjusted by using one or more mapping functions. An adjusted cubemap projection (ACP) may provide for a spherical sampling uniformity. The coordinates in the cube domain may be adjusted based on one or more of the following mapping functions:

$$\beta' = f(\beta) = \text{sgn}(\beta) \cdot (-0.36 \cdot \beta^2 + 1.36 \cdot |\beta|) \quad (13)$$

$$\beta = g(\beta') = \text{sgn}(\beta') \cdot \frac{0.34 - \sqrt{0.34^2 - 0.09 \cdot |x|}}{0.18} \quad (14)$$

where sgn(•) may return the sign of the input.

An equi-angular cubemap (EAC) projection may be performed by converting the coordinates between the cube domain and the EAC domain. For example, the coordinates between the cube domain and the EAC domain may be converted based on the tangent of the angle of a spherical sample on the cubemap sampling grid. The mapping functions for the EAC projection may be calculated as:

$$\beta' = f(\beta) = \frac{4}{\pi}\tan^{-1}(\beta) \quad (15)$$

$$\beta = g(\beta') = \tan(\frac{\pi}{4}\beta') \quad (16)$$

Figure 31:
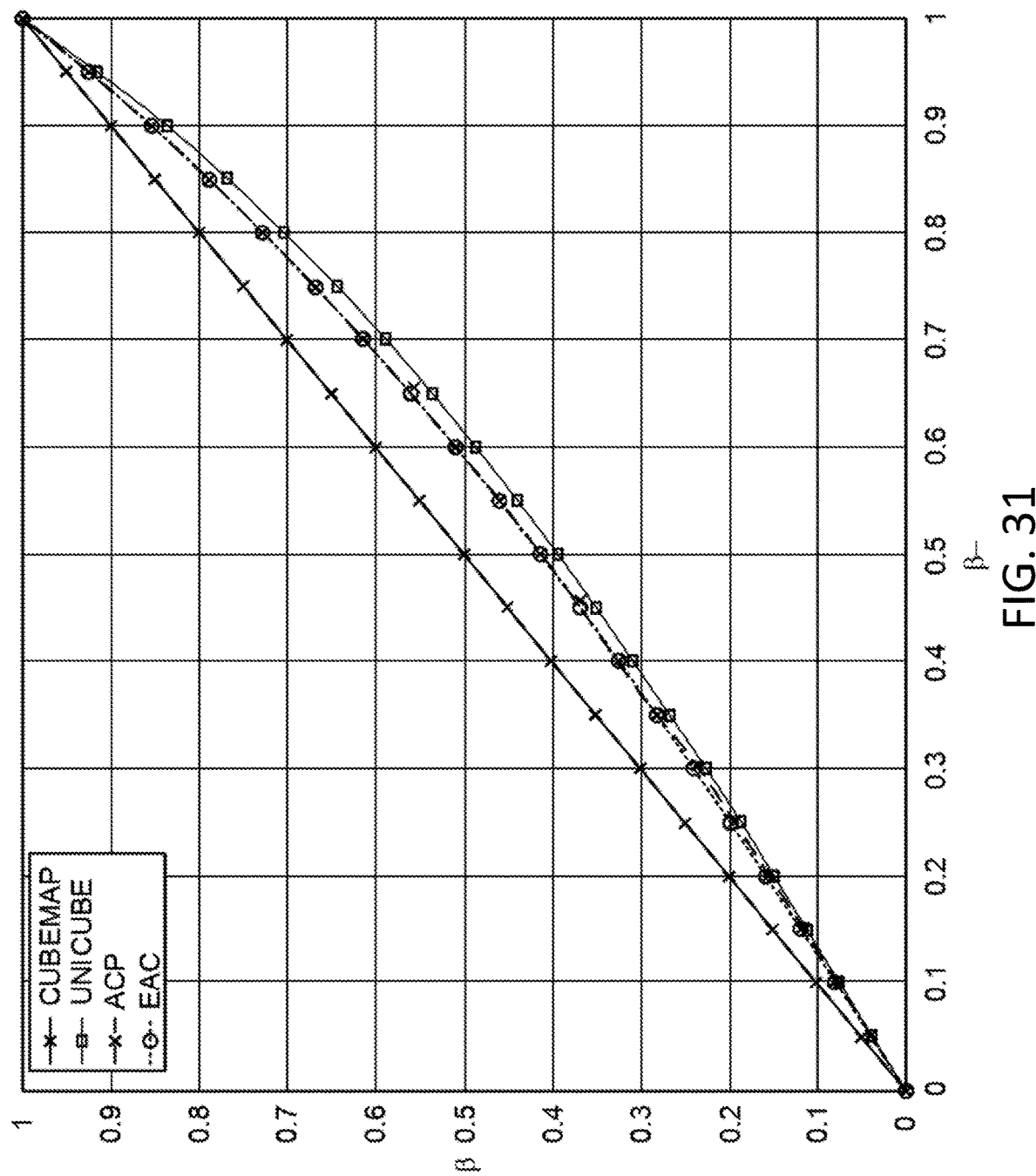
FIG. 31 illustrates an example comparison of the mapping functions of cubemap, unicube, ACP and EAC.

FIG. 31 illustrates an example comparison of the mapping functions g(β') for the cubemap, unicube, ACP and EAC.

Figure 5:
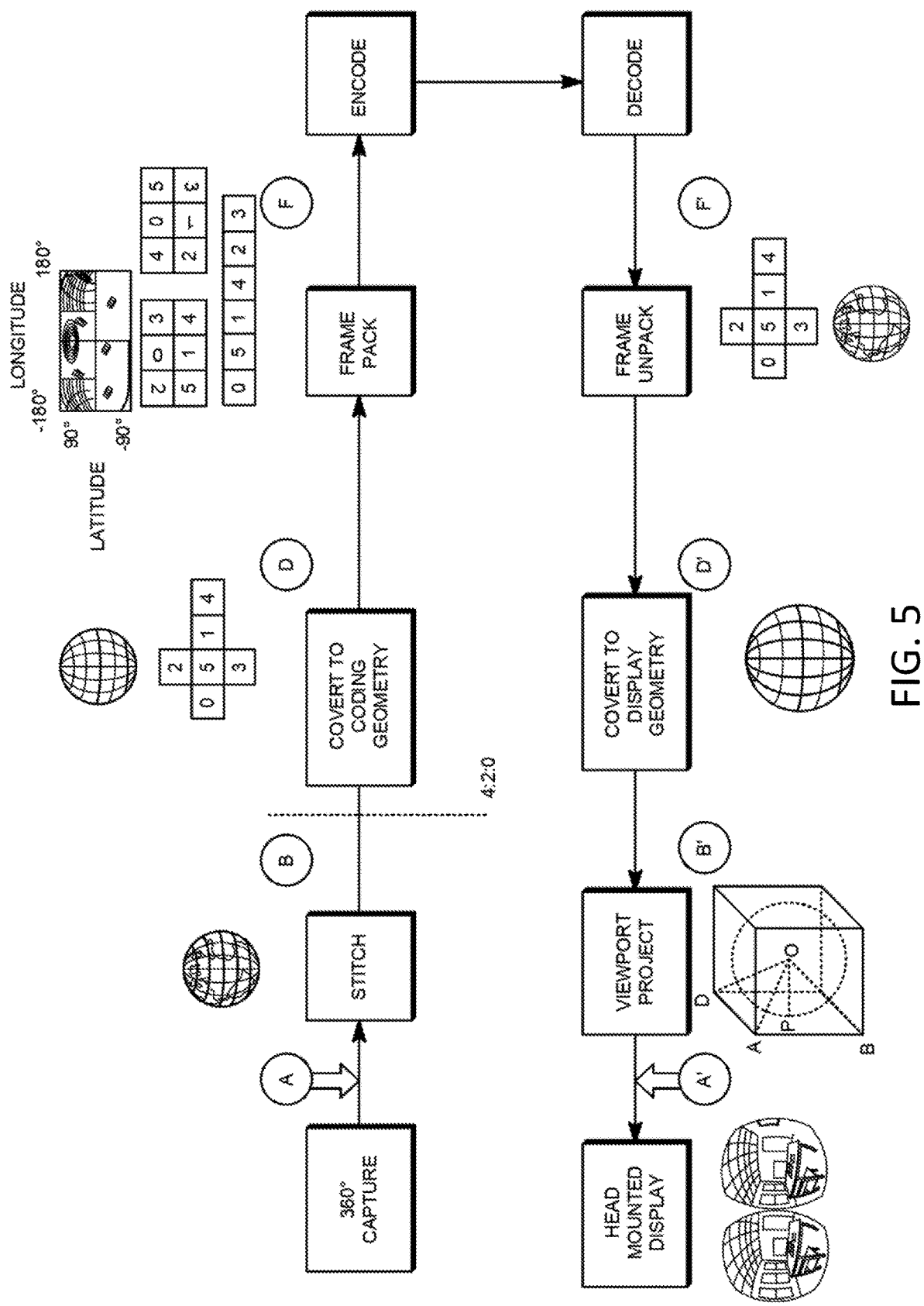
FIG. 5 illustrates an example 360-degree video processing.

FIG. 5 illustrates an example work flow for 360-degree video processing. A 360-degree video capture may be captured using one or more cameras. For example, one or more cameras may be used to capture a 360-degree video covering a spherical space. The videos may be stitched together. For example, the videos may be stitched together using an equirectangular geometry structure. The equirectangular geometry structure may be converted to other geometry structure, such as a cubemap geometry, for encoding (e.g., encoding with video codecs). The coded video may be delivered to the client, for example via dynamic streaming and/or broadcasting. The video may be decoded, for example, at the receiver. The decompressed frame may be unpacked to a display such as a display geometry. For example, the display geometry may be in an equirectangular geometry. The geometry may be used for rendering. For example, the geometry may be used for rendering via viewport projection according to a user's viewing angle.

Chroma components may be subsampled to a smaller resolution than that of a luma component. Chroma subsampling may reduce the amount of video data used for encoding and may save bandwidth and/or computing power and may do so without affecting (e.g., significantly affecting) video quality. With a 4:2:0 chroma format, both of the chroma components may be subsampled to be ¼ of the luma resolution. For example, the chroma components may be subsampled ½ horizontally and ½ vertically of the luma resolution. After chroma subsampling, the chroma sampling grid may be different from the luma sampling grid. In FIG. 5, throughout the processing flow, the 360-degree video being processed at one or more stages may be in a chroma format where the chroma components have been subsampled.

Figure 6:
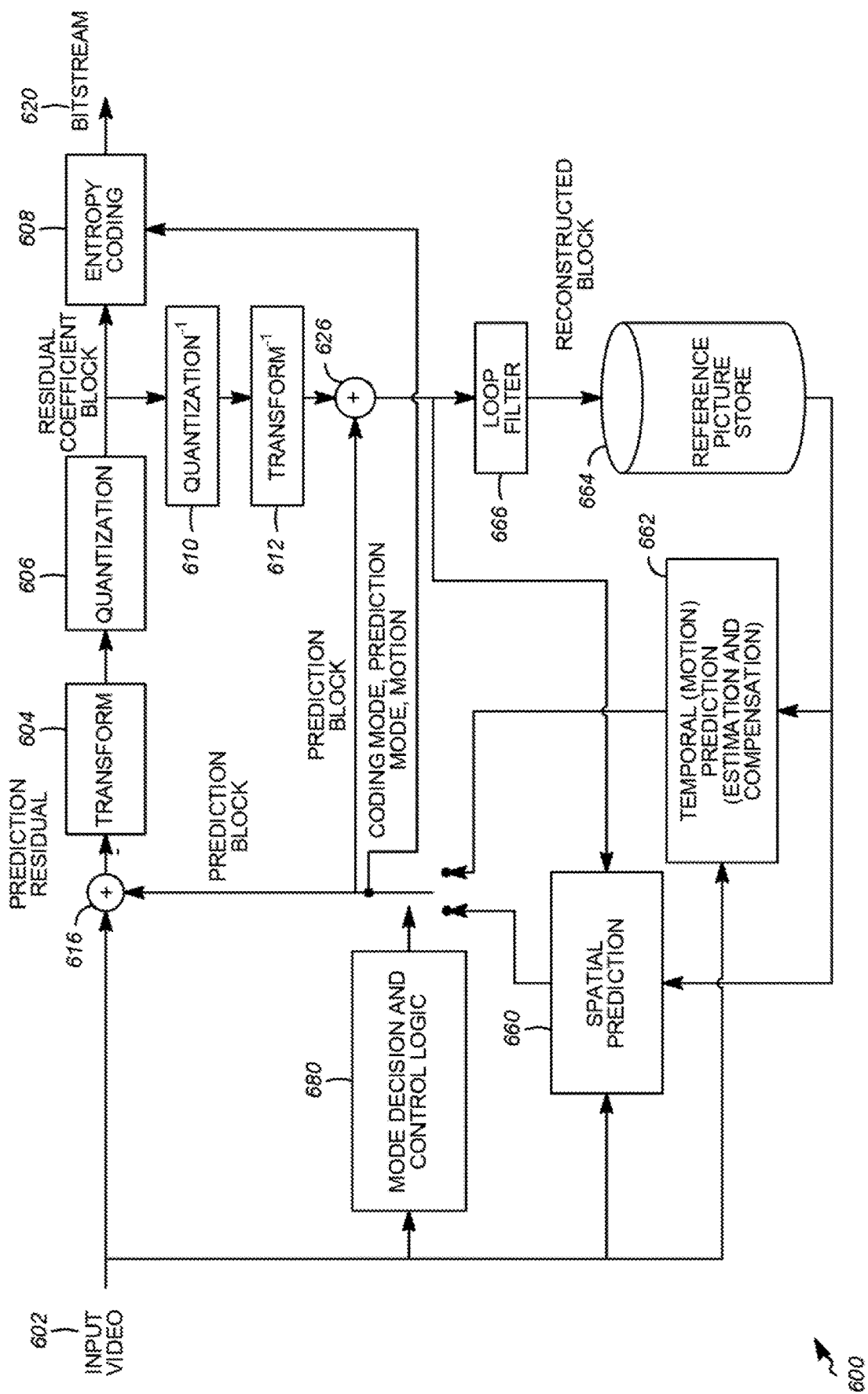
FIG. 6 illustrates a block diagram of an example block-based encoder.

FIG. 6 shows a block diagram of an example block-based hybrid video encoding system 600. The input video signal 602 may be processed block by block. Extended block sizes (e.g., referred to as a coding unit or CU) may be used (e.g., in HEVC) to compress high resolution (e.g., 1080p and/or beyond) video signals. A CU may have up to 64×64 pixels (e.g., in HEVC). A CU may be partitioned into prediction units or PUs, for which separate predictions may be applied. For an input video block (e.g., a macroblock (MB) or CU), spatial prediction 660 or temporal prediction 662 may be performed. Spatial prediction (e.g., or intra prediction) may use pixels from already coded neighboring blocks in the same video picture and/or slice to predict a current video block. Spatial prediction may reduce spatial redundancy inherent in the video signal. Temporal prediction (e.g., referred to as inter prediction or motion compensated prediction) may use pixels from already coded video pictures to predict a current video block. Temporal prediction may reduce temporal redundancy inherent in the video signal. A temporal prediction signal for a given video block may be signaled by a motion vector that indicates the amount and/or direction of motion between the current block and its reference block. If multiple reference pictures are supported (e.g., in H.264/AVC or HEVC), the reference picture index of a video block may be signaled to a decoder. The reference index may be used to identify from which reference picture in a reference picture store 664 the temporal prediction signal may come.

After spatial and/or temporal prediction, a mode decision 680 in the encoder may select a prediction mode, for example based on a rate-distortion optimization. The prediction block may be subtracted from the current video block at 616. Prediction residuals may be de-correlated using a transform module 604 and a quantization module 606 to achieve a target bit-rate. The quantized residual coefficients may be inverse quantized at 610 and inverse transformed at 612 to form reconstructed residuals. The reconstructed residuals may be added back to the prediction block at 626 to form a reconstructed video block. An in-loop filter such as a de-blocking filter and/or an adaptive loop filter may be applied to the reconstructed video block at 666 before it is put in the reference picture store 664. Reference pictures in the reference picture store 664 may be used to code future video blocks. An output video bit-stream 620 may be formed. Coding mode (e.g., inter or intra), prediction mode information, motion information, and/or quantized residual coefficients may be sent to an entropy coding unit 608 to be compressed and packed to form the bit-stream 620.

Figure 7:
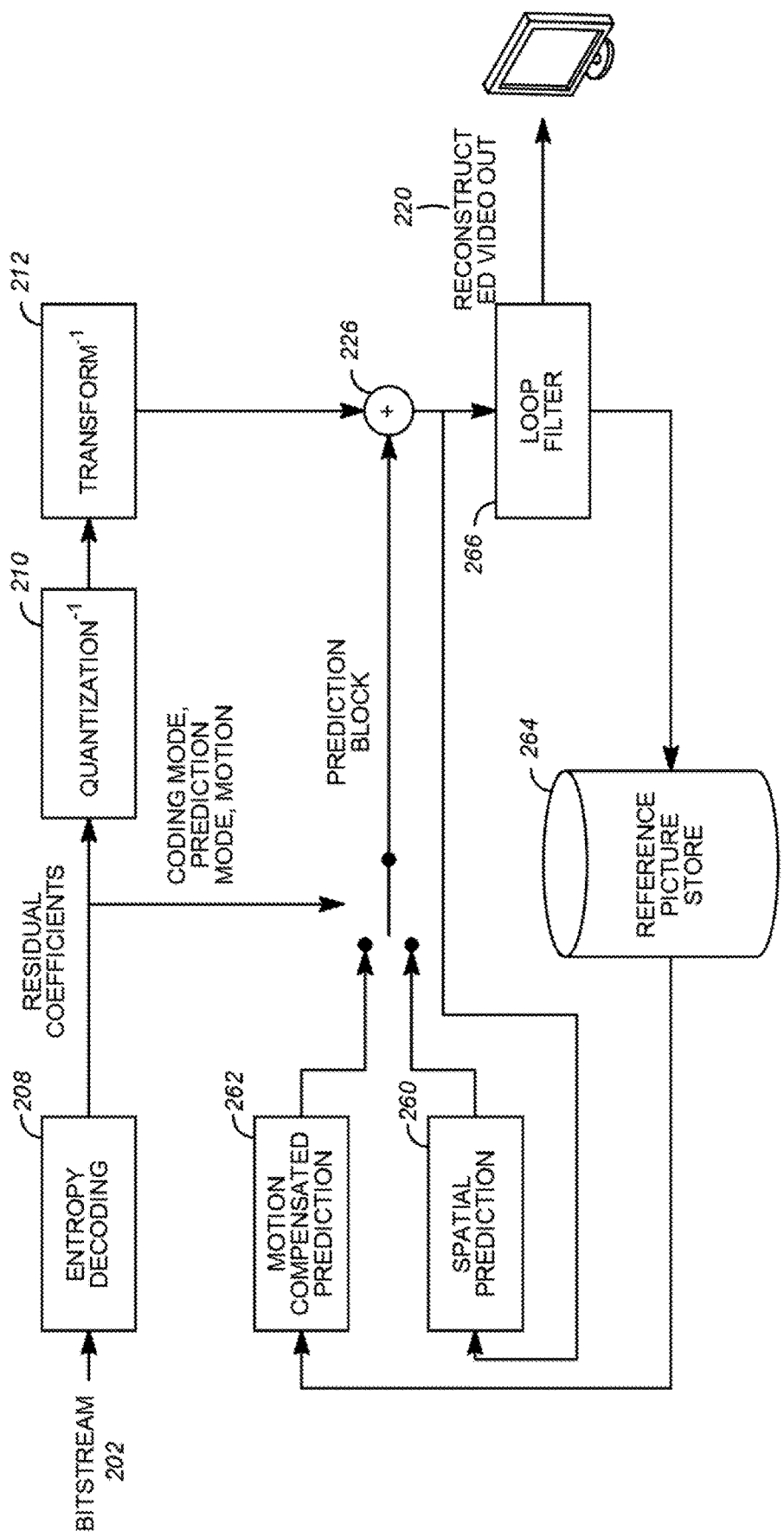
FIG. 7 illustrates a block diagram of an example block-based decoder.

FIG. 7 shows a general block diagram of an example block-based video decoder. A video bit-stream 202 may be received, unpacked, and/or entropy decoded at an entropy decoding unit 208. Coding mode and/or prediction information may be sent to a spatial prediction unit 260 (e.g., if intra coded) and/or to a temporal prediction unit 262 (e.g., if inter coded). A prediction block may be formed the spatial prediction unit 260 and/or temporal prediction unit 262. Residual transform coefficients may be sent to an inverse quantization unit 210 and an inverse transform unit 212 to reconstruct a residual block. The prediction block and residual block may be added at 226. The reconstructed block may go through in-loop filtering 266 and may be stored in a reference picture store 264. Reconstructed videos in the reference picture store 264 may be used to drive a display device and/or to predict future video blocks.

Figure 8:
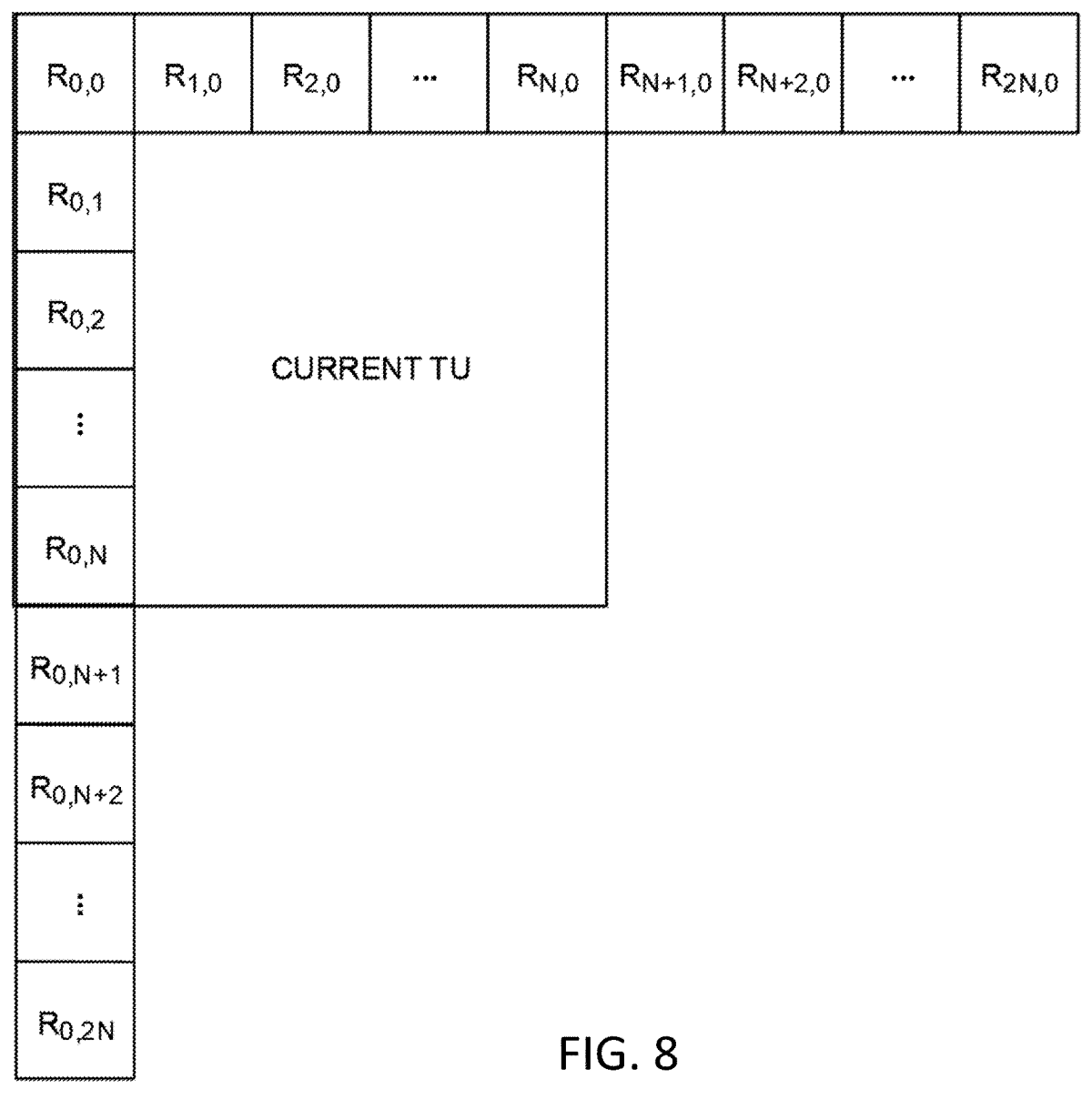

Video codecs such as H.264 and/or HEVC may be used to code 2D planar rectilinear videos. Video coding may exploit spatial and/or temporal correlations to remove information redundancies. One or more prediction techniques such as intra prediction and/or inter prediction may be applied during video coding. Intra prediction may predict a sample value with its neighboring reconstructed samples. FIG. 8 shows example reference samples that may be used to intra-predict a current transform unit (TU). The reference samples may include reconstructed samples located above and/or to the left of the current TU.

Figure 9:
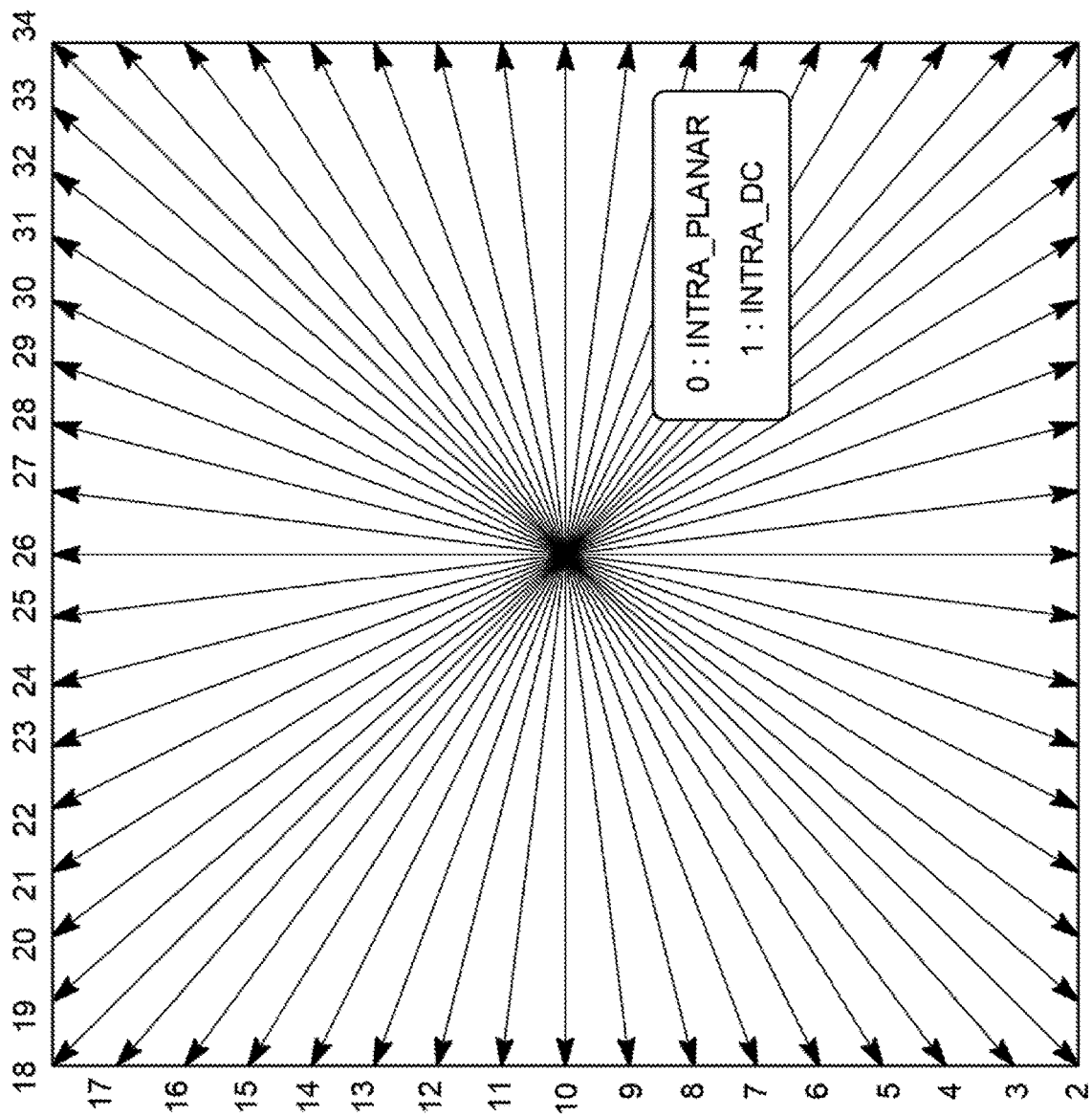
FIG. 9 illustrates example indications of intra prediction directions in HEVC.

There may be multiple intra prediction modes to choose from. FIG. 9 illustrates an example indication of intra prediction directions in HEVC. For example, HEVC may specify 35 intra prediction modes that include planar (0), DC (1), and/or angular predictions (2-34), as shown in FIG. 9. An appropriate intra prediction mode may be selected. For example, an appropriate intra prediction mode may be selected at the encoder side. Predictions generated by multiple candidate intra prediction modes may be compared. The candidate intra prediction mode that produces the smallest distortion between prediction samples and original samples may be selected. The selected intra prediction mode may be coded into a bitstream.

Figure 10:
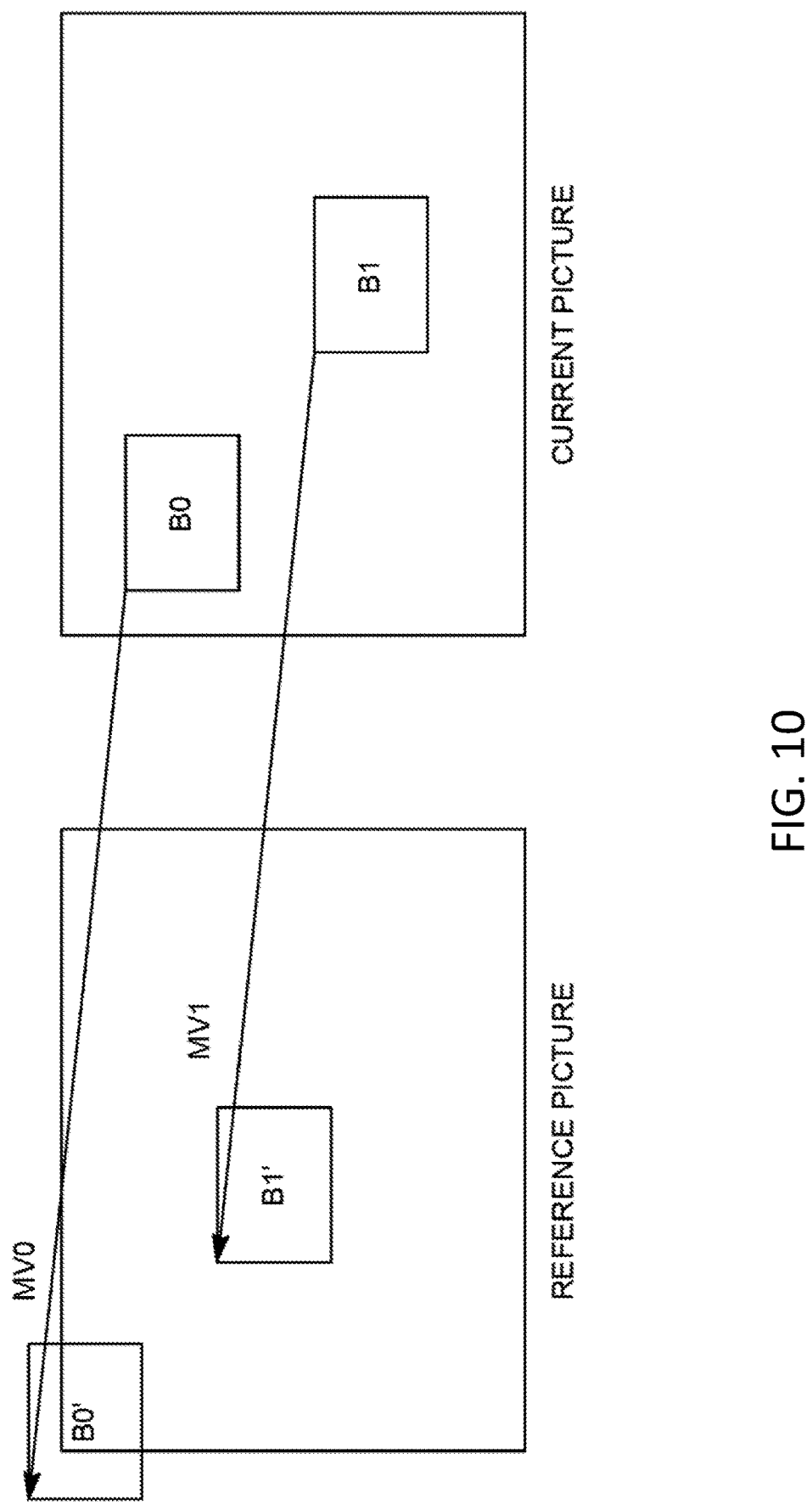
FIG. 10 illustrates example inter prediction with one motion vector.
Figure 11:
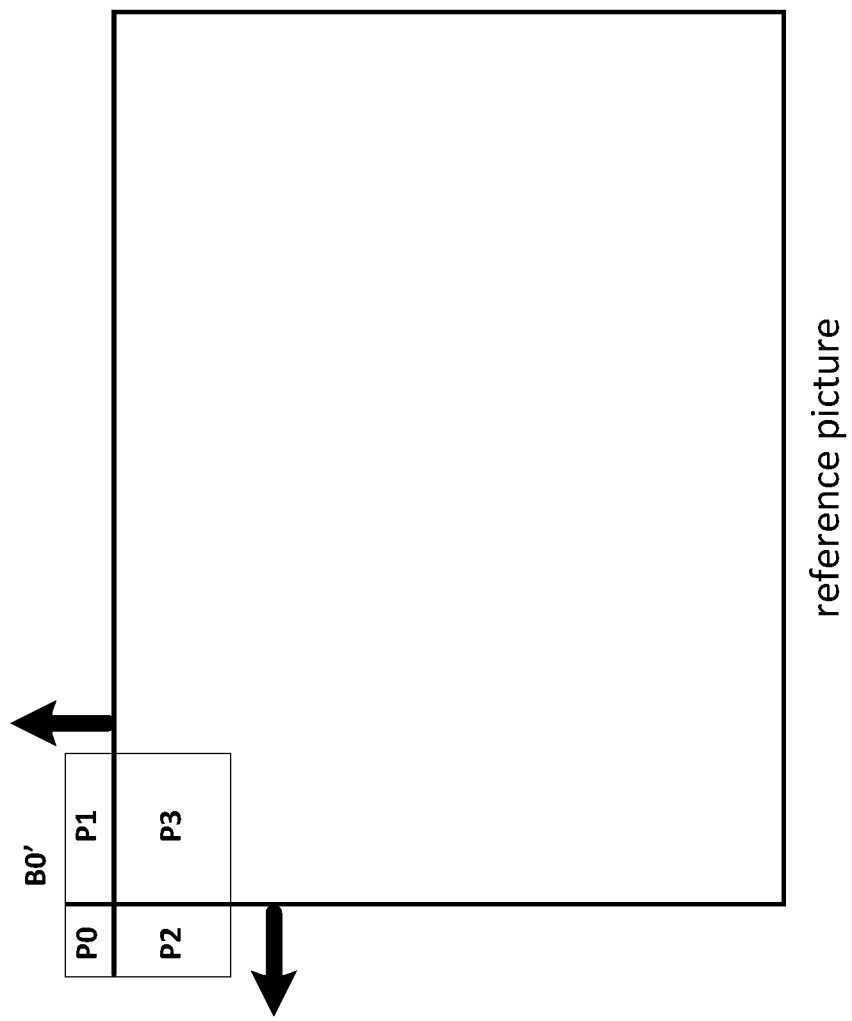
FIG. 11 illustrates padding for reference samples outside a picture boundary in HEVC/H.264.

Angular predictions may be used to predict directional textures. FIG. 10 shows an example inter prediction with one motion vector (MV). Blocks B0' and B1' in a reference picture may be respective reference blocks for blocks B0 and B1 of a current picture. Reference block B0' may be partially outside the boundary of the reference picture. A padding process may be used to fill unknown samples outside picture boundaries. FIG. 11 shows an example padding for reference samples outside the picture boundary. For example, the padding examples for block B0' may have four parts P0, P1, P2, and P3. Parts P0, P1, and P2 may be outside the picture boundary and may be filled, for example, via a padding process. For example, part P0 may be filled with a top-left sample of the reference picture. Part P1 may be filled with vertical padding using a top-most row of the reference picture. Part P2 may be filled with horizontal padding using a left-most column of the picture.

Motion vector prediction and/or merge mode may be used for inter coding. In motion vector prediction, a motion vector from neighboring PUs and/or temporal collocated PUs may be used as a predictor of a current MV. The index of the selected MV predictor may be coded and/or signaled to a decoder. The decoder may construct a MV predictor list with multiple entries. The entry with the signaled index may be used to predict the MV of the current PU.

Figure 12:
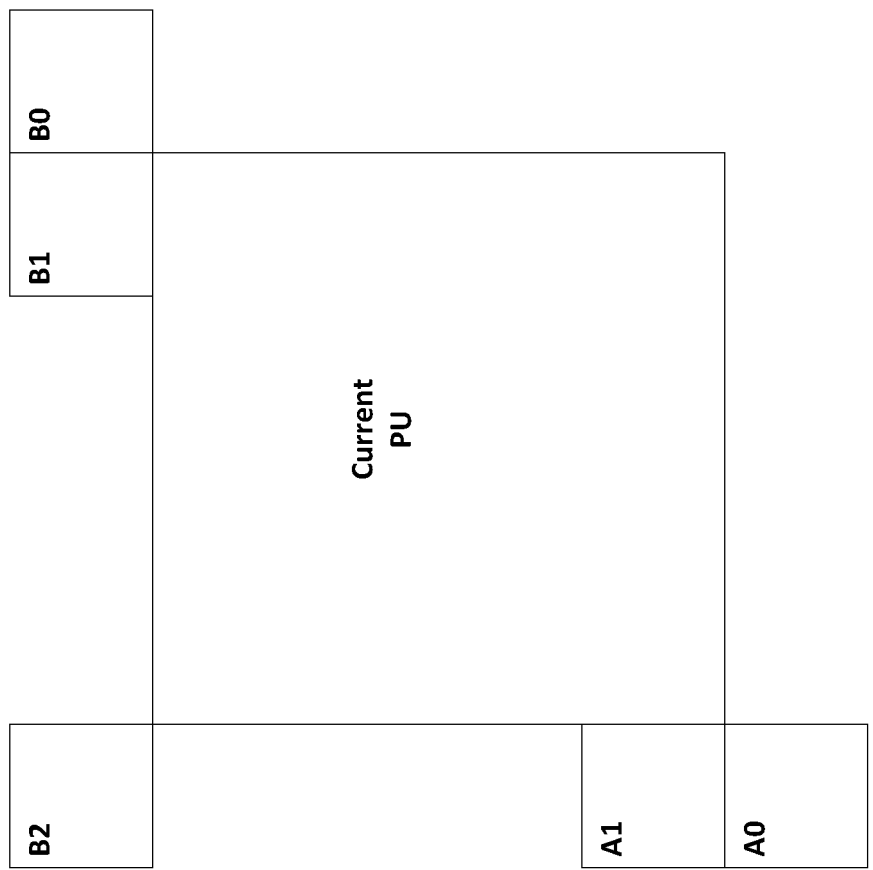
FIG. 12 illustrates how spatial neighbors may be used to derive spatial merge candidates in an HEVC merge process.

With merge mode, MV information for spatial and/or temporal neighboring PUs may be re-used, and motion vector coding for the current PU may be skipped. FIG. 12 illustrates an example spatial neighboring blocks that may be used for merge candidate derivation. For example, bottom left (A0), left (A1), top right (B0), top (B1), and/or top left (B2) may be used for merge candidate derivation. A temporal collocated block may be used as a merge candidate. The index of a selected merge candidate may be coded. A merge candidate list may be constructed at the decoder side. For example, a merge candidate list constructed at the decoder side may be similar to the construction of the MV predictor list at the encoder side. The entry with the signaled merge candidate index may be used as the MV of current PU.

360-degree video coding and 2D planar video coding may be different in various aspects. For example, a 360-degree video may be frame-packed and may contain 360-degree information of the environment surrounding the viewer. As such, the 360-degree video may have one or more intrinsic circular characteristics that a 2D video may not have. Certain codecs such as MPEG-2, H.264, and/or HEVC, which may be suitable for coding 2D videos, may not fully consider the circular characteristic features of 360-degree videos. For example, if pixels in a 360-degree video are outside a picture's boundaries, repetitive padding may be applied.

Frame packing may be used to arrange the one or more faces of a 360-degree video into a rectangular picture for coding. The sample values along a face boundary may not be continuous. The discontinuity may reduce the efficiency of spatial prediction. As shown in FIG. 8, neighboring reconstructed samples may be used to derive reference samples for intra-predicting a current TU. The neighboring reconstructed samples may be located in a different face than the face the current TU belongs to. For example, if the current TU is near or at a boundary of a face in cubemap, the nearest neighboring samples in the corresponding frame-packed 2D picture may be in a neighboring face, and the samples may not be continuous in the frame-packed picture.

Figure 13:
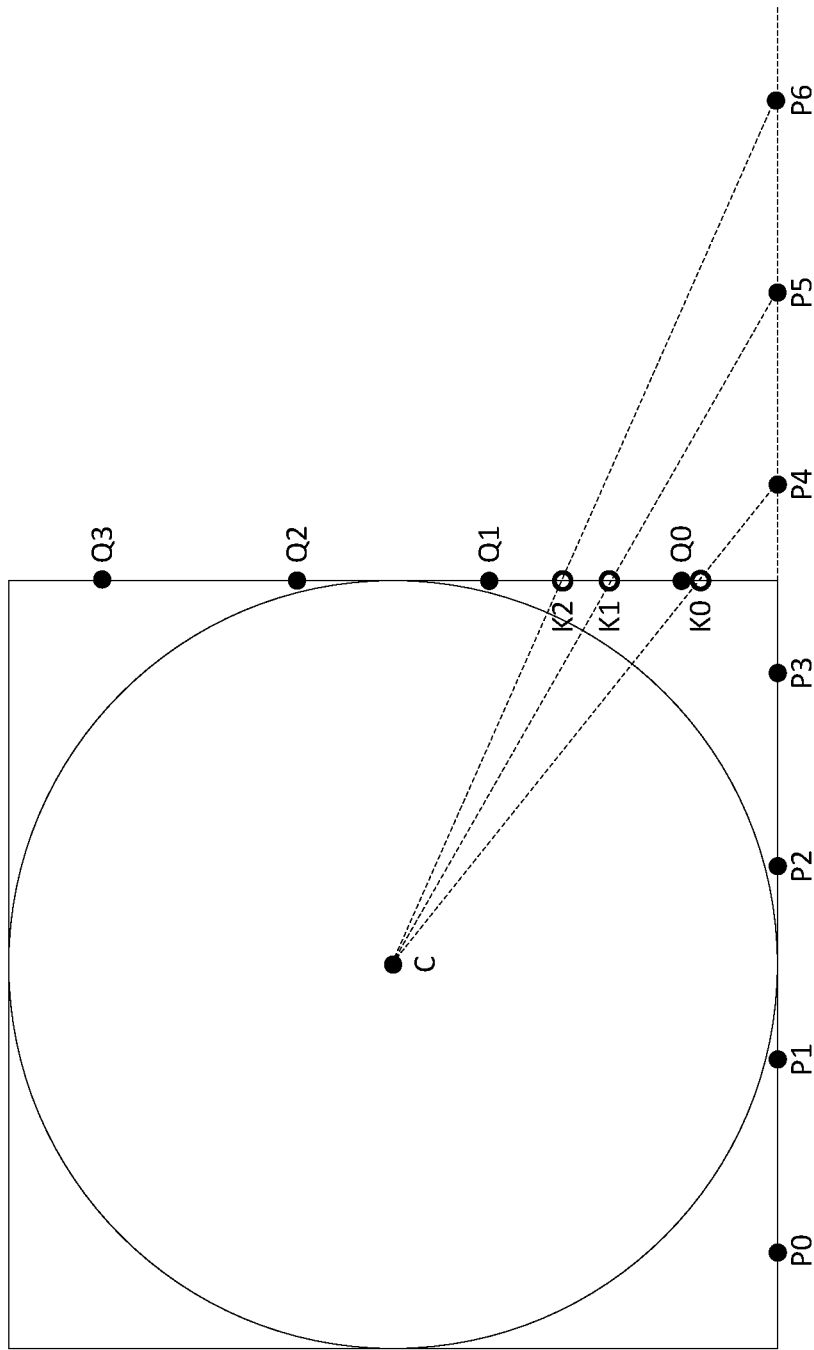
FIG. 13 illustrates discontinuity and geometry padding for a face picture projected using cubemap.

FIG. 13 shows examples of discontinuous samples and padding in a face picture of cubemap. The circle may represent the equator of the sphere. Four laterals/sides of the square may represent four lines on the four side faces of cubemap that the equator is projected to. P may represent a face of the cubemap, and Q may represent an adjacent face of face P. Px (x∈[0,3]) may represent sampling points on a face P. Qx (x∈[0,3]) may represent sampling points on a neighboring face Q. For example, if neighboring samples P4, P5, and P6 are samples outside of the face boundaries and if P4, P5, and P6 are to be padded on face P (e.g., with even sampling intervals), padding samples K0, K1, and K2 may represent the projections of P4, P5, and P6 on face Q from the center of the sphere, respectively. The point location of P4, P5, and P6 may be referred to as neighboring sample locations or initial sample locations associated with the initial reference block. As shown in FIG. 13, K0 and Q0 may not overlap with each other. K1 and Q1, and K2 and Q2 may not overlap. The farther an extended sample is relative to a face boundary, the larger a divergent may be. Padding samples K0, K1, and K2 may be used to fill the samples at P4, P5 and P6, respectively. K0, K1, and K2 may be referred to as reference samples, derived sample locations, padding sample location, or plurality of sample values associated with the mapped reference block located at their respective reference sample locations. As shown in FIG. 13, K0 and Q1 may not overlap with each other, and the same may be true for K1 and Q1, and K2 and Q2. Padding samples K0, K1, and/or K2 may be used to fill the samples at P4, P5, and/or P6.

Figure 16:
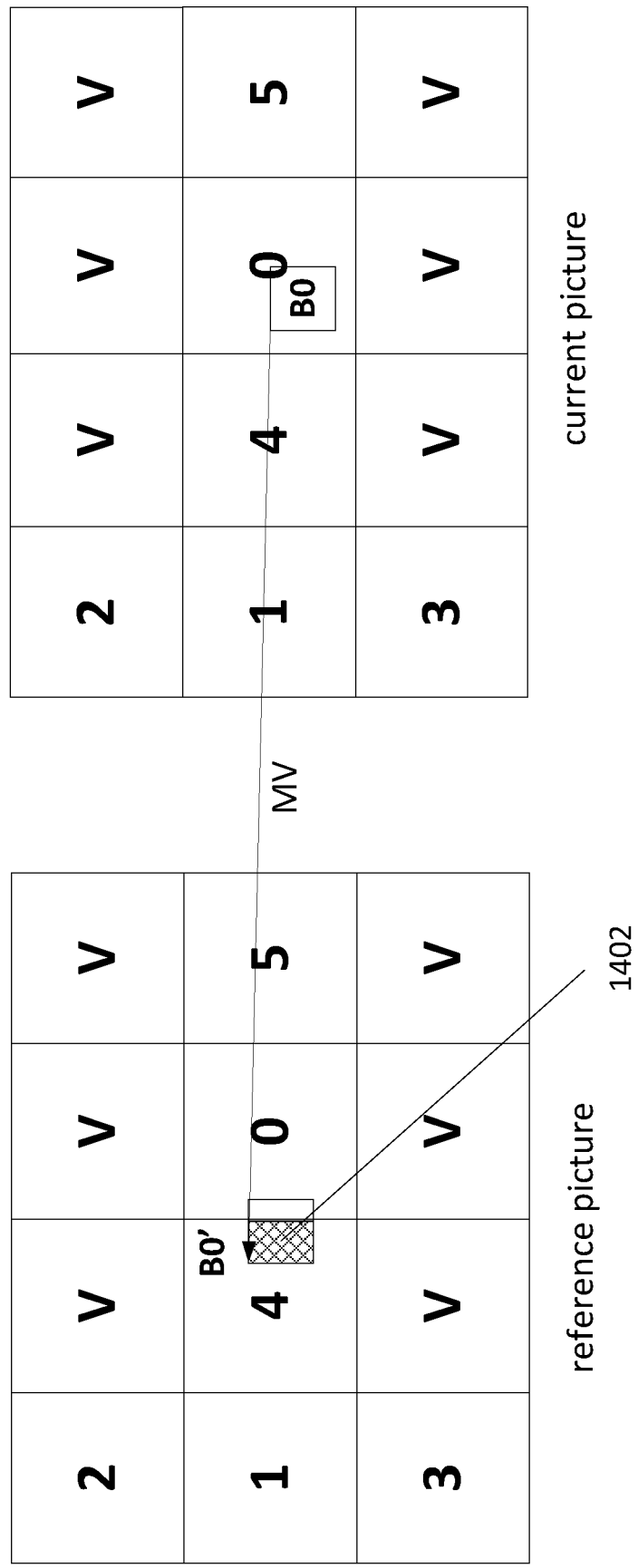
FIG. 16 illustrates an example motion compensated prediction for a cubemap 4×3 frame-packed picture.

Inter motion compensated prediction may have discontinuous samples. For example, if a cubemap 4×3 frame packing (e.g., as shown in FIG. 2(b)) is applied during encoding, the pixels of a reference block outside the face of a current block may be discontinuous. FIG. 16 illustrates an example motion compensated prediction for cubemap 4×3 frame-packed pictures. As shown in FIG. 16, face V may be a virtual face for frame packing. If a current block B0 belongs to face 0 of the current picture, and a temporal reference block B0' pointed by motion vector is located partially outside face 0 of the reference picture, subblock 1402 (e.g., subblock of block B0') on face 4 may have a different texture direction. The current block B0 may be split into two prediction units.

Motion along a face boundary in a frame-packed picture may not be continuous. For example, the current PU in FIG. 12 may at a face boundary. Neighboring blocks A0, A1, B0, B1, and/or B2 may be located in one or more different faces. Motion of the neighboring blocks (e.g., A0, A1, B0, B1, and/or B2) may have one or more different directions than the motion direction of the current block.

360-degree video coding may consider the geometry structure and/or characteristics of the video being coded. For intra and/or inter prediction, if a reference sample is outside a frame-packed picture, a geometry padding may be applied by considering one or more circular characteristics of the picture. A geometry padding may increase prediction efficiency for reference samples outside of a picture. For example, the geometry padding may increase prediction efficiency for reference samples outside of a picture for inter motion compensated prediction. For example, the value of point p in sub-blocks P0, P1, and/or P2 as shown in FIG. 11 may be derived via geometry mapping and/or interpolation, as described herein.

For intra prediction and/or inter prediction, if a reference sample in a frame-packed picture is inside the picture but outside the face that the current block belongs to, the reference sample value may be derived using geometry padding. For example, the geometry padding may be used to deal with the discontinuities. The reference sample position, which may be referred to as neighboring sample location and/or one or more initial sample location associated with the initial reference block, which may be outside the face of the current block, may be mapped from its current face to other face by using, for example, geometry mapping. For example, the reference sample position P4 in FIG. 13 may be mapped to K0, and the sample value at position K0 may be derived from sample values (e.g., Q0, Q1, and/or the like) on a neighboring face. For example, sub-block 1402 in FIG. 16, which may be used for inter prediction, may be derived via geometry padding. For example, sample values on face 4 may not be used (e.g., directly) for inter prediction in FIG. 16.

In motion vector prediction and/or inter merge mode, a spatial neighboring block or a temporal collocated block for temporal motion vector prediction may be outside the face of a current block. For example, the temporal collocated block for temporal motion vector prediction may be defined by HEVC. A neighboring block position may be derived via the geometry mapping process. For example, a sample position may be mapped. Sample value(s) may be derived based on a mapped position.

Figure 17A:
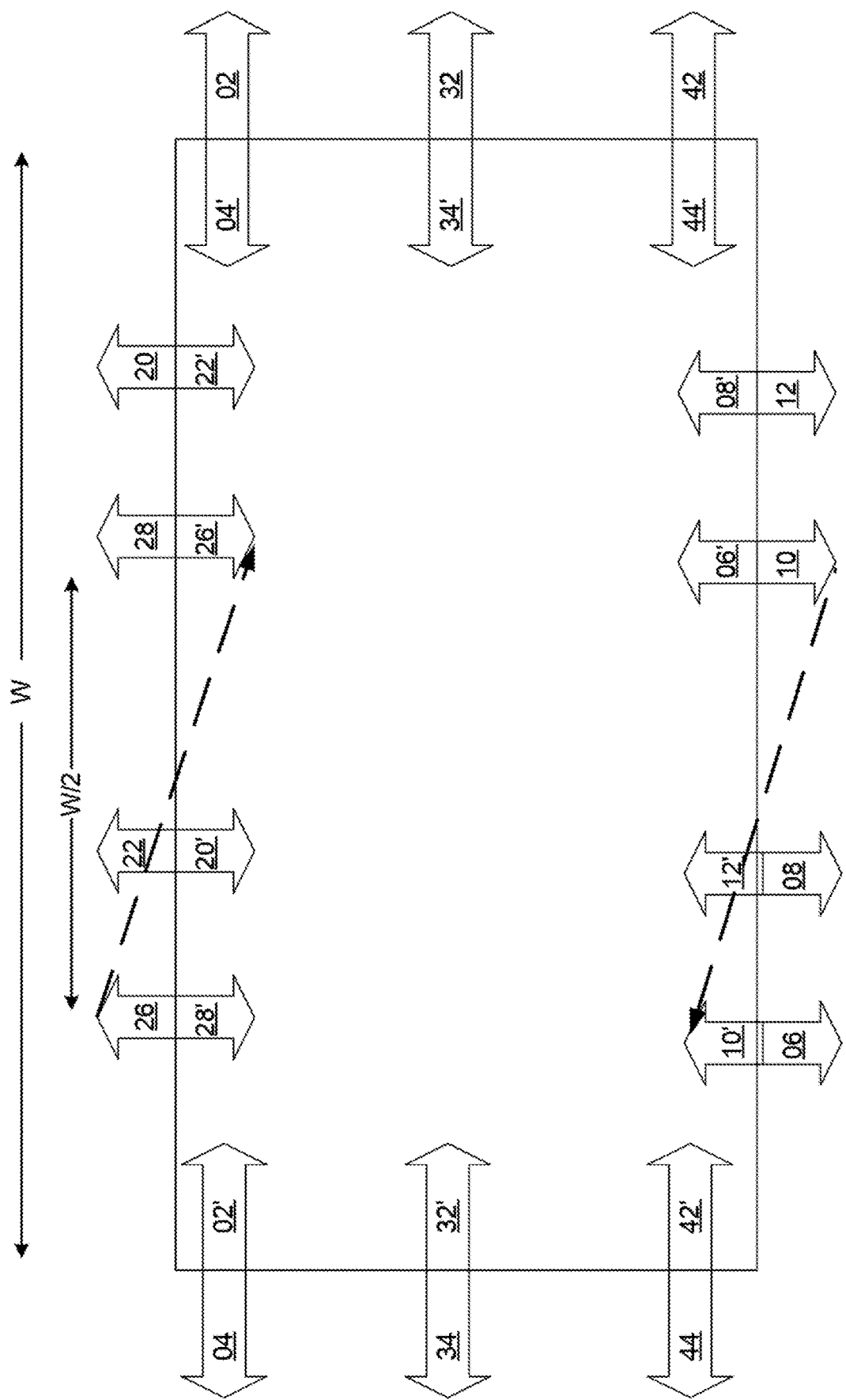
FIG. 17(a) is an illustration of example padding for a picture projected with equirectangular projection to indicate continuity on the sphere.

360-degree videos may be encoded using a hybrid projection technique. For example, a hybrid projection technique may be based on characteristics of the videos and/or the projection techniques. For example, an intra picture may be coded with a projection, while an inter picture may be coded in other projection. For example, an intra picture may be coded with an ERP or an equal-area projection. An inter picture may be coded in cubemap projection, Geometry padding may be applied in 360-degree video coding. FIGS. 17(*a*) and 17(*b*) illustrates an example geometry padding for an equirectangular picture. As shown in FIGS. 17(*a*) and 17(*b*), the right boundary and left boundary may be spherically continuous. For example, the arrows shown in FIG. 17(*a*) may indicate continuity on the sphere.

For example, the arrows with the same reference numerals such as 02 and 02', 32 and 32', 42 and 42', 04 and 04', 34 and 34', and 44 and 44' in FIG. 17(*a*) may indicate the continuity on the sphere in the right and left boundary. The top boundary may represent the North pole of the sphere, and bottom boundary may represent the South pole of the sphere. As described herein, the top boundary and the bottom boundary may not be spherically connected and may be the farthest apart on the sphere. The top boundaries 20 and 20', 22 and 22', 26 and 26', and/or 28 and 28' may indicate spherical continuity in the North pole. The bottom boundaries 06 and 06', 08 and 08', 10 and 10', and/or 12 and 12' may indicate spherical continuity in the South Pole.

Using the spherical characteristics described herein and as shown in FIGS. 17(*a*) and 17(*b*), if a neighboring sample location is beyond the right boundary of the picture (e.g., 02, 32, 42, D, E, and/or F), padding may be performed using a padding sample location by rewinding back to the left boundary of the picture (e.g., 02', 32', 42', D', E', and/or F' respectively). Padding may be performed by rewinding back based on one or more the circular characteristics of the picture. Repeating from the rightmost line within the picture boundary may be performed for padding if the neighboring sample location is within the right boundary of the picture. If the neighboring sample location is beyond the bottom boundary of the picture (e.g., 06, 08, 10, 12, K, L, M, and/or N), padding may follow a longitude line and go to an opposite hemisphere (e.g., 06', 08', 10', 12', K', L', M', and/or N' respectively). The arrows and corresponding alphabetic labels in FIG. 17(*b*) may indicate correspondence between the samples to be padded and padding samples that may be used to pad the neighboring sample location(s). For example, the padding to be filled in at arrow A may be taken along arrow A'. The padding to be filled in at arrow B may be taken along arrow B', and so on.

An initial reference sample point (u, v) may be provided based on a current location in a picture. For example, the point (u, v) may be outside the equirectangular picture. The initial reference sample location (u, v) may be used to derive the padding sample location, (up, vp). The point (up, vp) may be referred to as a padding sample, or one or more sample values associated with the mapped reference block. The derived reference sample location (up, vp) for the equirectangular picture may be calculated as follows.

$$\text{if } u<0 \text{ or } u \geq W \text{ and } 0 \leq v < H, up = u\%W, vp = v \quad (17)$$

$$\text{if } v<0, \text{then } vp = -v-1, up = (u+W/2)\%W \quad (18)$$

$$\text{if } v \geq H, \text{then } vp = 2*H-1-v, up = (u+W/2)\%W \quad (19)$$

where W and H may be width and height of the equirectangular picture. For example, the padding sample location (up, vp) may be calculated based on the location of the point (u, v). For example, if the point (u, v) is beyond the right or left boundary, the padding sample (up, vp) may be calculated based on Equation (17). The padding sample (up, vp) of the point (u, v), that is beyond the right or left boundary, may correspond to the point located near the left or right boundary of the equirectangular picture, respectively. Other padding samples may be calculated based on the position of the point (u, v) that may correspond to Equations (18) and/or (19).

As shown in FIG. 13, the padding for CMP may be provided. Padding may be applied to a point (u, v). The point p(u, v) may be located in a video content in a geometry structure. The point p(u, v) may be a neighboring sample of a current sample. One or more of the following may be used to derive a sample value.

The point p(u, v) may be identified based on a current sample at a current sample location. For example, the current sample at the current sample location may be in a current face location. The current sample may be associated with the padding sample. The point p(u, v) may be located outside of the current face boundary. The point p(u, v) may be located in different face. The point's 3D position Pf(X, Y, Z) may be calculated, depending on the face to which the point p(u, v) belongs. For example, if the point p's face is NZ, Equations (6), (7), and/or (8) may be used to calculate the 3D position (X, Y, Z) of point p. A new face, to which the samples used for padding belongs to, may be determined based on the 3D position (X, Y, Z). The sample may be used for padding, using (X, Y, Z) in the following way:

If($|X|>=|Y|$ and $|X|>=|Z|$ and $X>0$),the new face may be PX;

If($|X|>=|Y|$ and $|X|>=|Z|$ and $X<0$),the new face may be NX;

If($|Y|>=|X|$ and $|Y|>=|Z|$ and $Y>0$),the new face may be PY;

If($|Y|>=|X|$ and $|Y|>=|Z|$ and $Y<0$),the new face may be NY;

If($|Z|>=|X|$ and $|Z|>=|Y|$ and $Z>0$),the new face may be PZ;

If($|Z|>=|X|$ and $|Z|>=|Y|$ and $Z<0$),the new face may be NZ.

The point p's 2D position (u', v') may be calculated using Ps(X', Y', Z'). For example, the point p's 2D position (u', v') may be calculated based on the location of the new face. If the new face is located at NZ, Equations (9) and/or (10) may be used to calculate padding sample location (u', v') with (X', Y'). The sample value at (u', v') may be determined using an interpolation filter and/or based on integer position samples on the new face that (u', v') belongs to.

Padding for a point (u, v) in a geometry structure may include one or more of the following. A current sample at a current sample location that is associated with the padding sample may be determined. The 3D position Pf(X, Y, Z) on the face to be padded may be determined based on the point (u, v). The point (u, v) may represent the point located outside of a picture boundary or a face. The padding sample location may be determined based on the location of the sample to be padded. For example, a 2D planar position (u', v') may be identified by applying a geometry projection of the 3D position of the padding sample to a geometry structure. The padding sample value at the padding sample location, the 2D planar position (u', v'), may be derived. The sample value at the 2D planar position (u', v') may be determined using an interpolation filter and/or based on samples at integer positions. A mapped sample position and/or a padding sample value may be derived.

One or more interpolation filters may be used. For example, one or more interpolation filters may be used when determining a sample value at (u', v') on a new face. For example, bilinear, bicubic, lanczos, spline interpolation filters, and/or discrete cosine transform based interpolation filter (DCT-IF) may be used. A nearest neighbor interpolation may be used. As shown in FIG. 13, if a nearest neighbor interpolation is used, the value of Q0 may be used for padding P4 and/or P5. For example, the value of Q0 may be used for padding P4 and/or P5 as Q0 may be the nearest neighbor to K0 and K1. The value of Q1 may be used for padding P6. For example, the value of Q1 may be used for padding P6 as Q1 may be the nearest neighbor to K2. The approximation may be coarse in FIG. 13. For example, the approximation in FIG. 13 may be coarse because the sampling may be sparse. It may provide an approximation for denser sampling, considering that the cubemap geometry may oversample the sphere near the cube boundaries.

Figure 14:
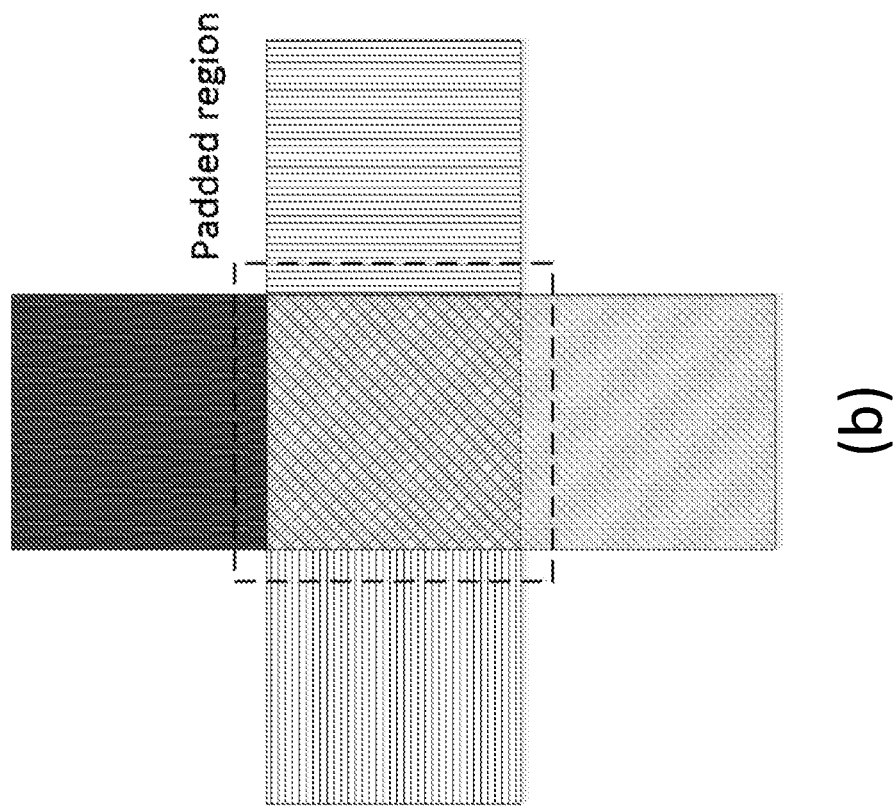
FIG. 14(a) illustrates an example 3D representation of padding for cubemap.
FIG. 14(b) illustrates an example flat representation with unfolded faces around the front face of padding for cubemap.
Figure 14:
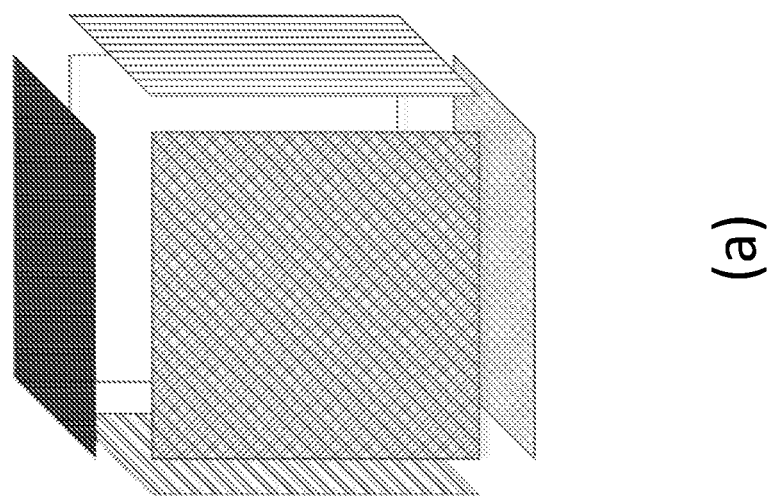
Figure 15:
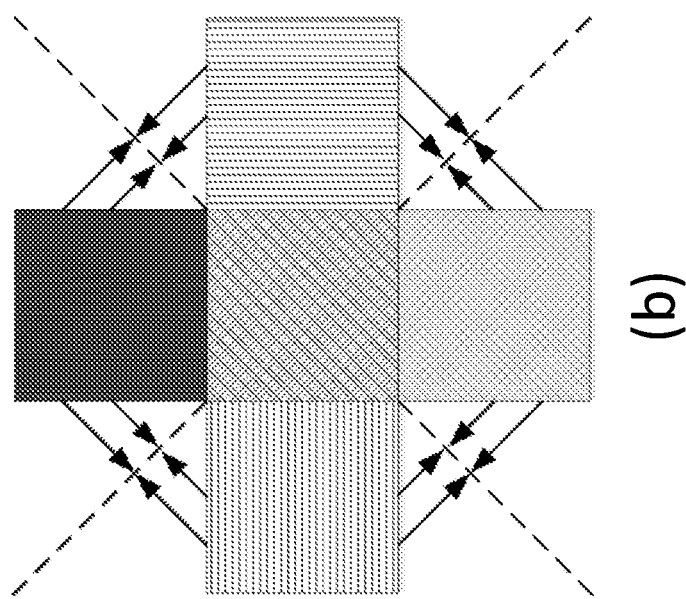
FIG. 15(a) illustrates an example extrapolation of missing samples in corner areas using a nearest neighbor technique.
FIG. 15(b) illustrates an example extrapolation of missing samples in corner areas using a diagonally to the face boundary technique.
Figure 15:
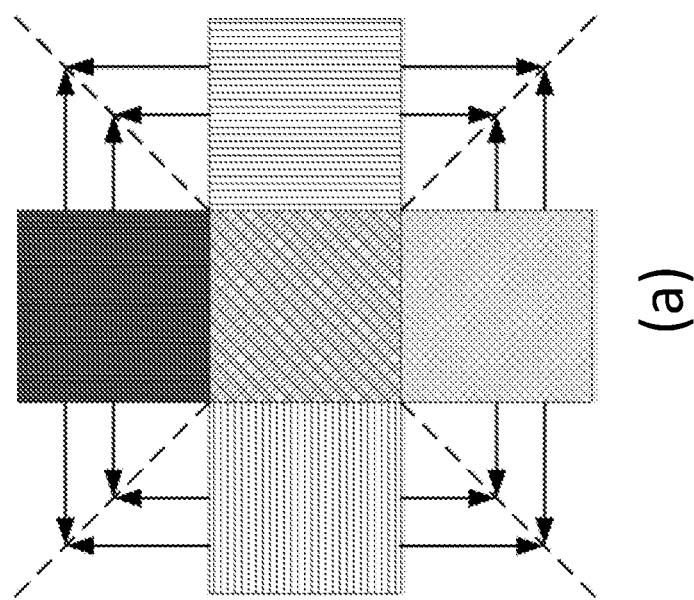

A nearest neighbor interpolation may derive the mapped sample position. For example, the mapped sample position may include one or more of the following. A 3D position Pf(X, Y, Z) may be calculated on a face to be padded based on a point (u, v). A position Ps(X', Y', Z') may be calculated by projecting Pf(X, Y, Z) onto a geometry structure. A 2D planar position (u', v') may be calculated on a new face. For example, a nearest neighbor interpolation may derive the mapped sample position, which may involve non-linear functions. A padding may be used. For example, a face-based padding may be used. With the face-based padding, one or more adjacent faces may be used to fill the surrounding padded region, which may correspond to unfolding the cube. For example, four adjacent faces may be used (e.g., directly used) to fill the surrounding padded region for the face-based padding. FIG. 14 illustrates an example of padding process for a cubemap. FIG. 14(a) illustrates an example 3D representation of padding process for a cubemap. FIG. 14(b) illustrates an example flat representation with unfolded faces around the front face of padding process for a cubemap. As shown in FIG. 14, the padded region surrounded by the dashed lines may be filled with samples from neighboring faces. For example, the padded region surrounded by the dashed lines, shown in FIG. 14, may be directly filled with samples from neighboring faces. As shown in FIG. 13, if the face-based padding is used, the value of Q0, Q1, and/or Q2 may be used for padding P4, P5, and/or P6, respectively. Q2 may belong to the opposite hemisphere with respect to the hemisphere defined by the face containing the P samples, and/or may not be meaningful for padding the face containing the P samples. Face-based padding may not be meaningful for padding by more than half of the face size on a side. If the size of the padded region is small (e.g., a few samples wide), the projection angle may be close to the 45-degree angle linking the cube boundary to its center and/or face-based padding may provide a sufficient approximation. As shown in FIG. 14(b), the four corners of the padded region may be extrapolated. The four corners of the padded region, shown in FIG. 14(b), may have samples not directly available from the neighboring faces. Repetitive padding may be used in one or more corners. For example, repetitive padding may be used in four corners. One or more of the following extrapolations may be used: mirror-reflecting available samples, replicating the nearest available sample (e.g., perpendicularly to the face boundary, as shown in FIG. 15(a)), and/or replicating samples diagonally relative to the face boundary, as shown in FIG. 15(b). For example, the sample value may be derived as:

If $|x|>=|y|$,then $v(x,y)=v(\text{sign}(x)(|x|+|y|),0)$;

If $|x|<|y|$,then $v(x,y)=v(0,\text{sign}(y)(|x|+|y|))$.

For extrapolated samples whose position is equidistant from two existing samples, an average of the two existing samples may be used. For example, as depicted in FIG. 15(a) and FIG. 15(b), extrapolated samples may be equidistant from the two existing samples along the diagonals (e.g., shown as dashed lines), and a weighted sum based on the distance to the available samples may be used. The sample value may be derived. For example, following the example principle shown in FIG. 15(a), sample values may be derived as:

If $|x| \geq |y|$, then $v(x,y) = a*v(x,0) + b*v(0,x)$, $a = (2*|x| - |y|)/(2*|x|)$, $b = |y|/(2*|x|)$;

If $|x| < |y|$, then $v(x,y) = a*v(y,0) + b*v(0,y)$, $a = |x|/(2*|y|)$, $b = (2*|y| - |x|)/(2*|y|)$.

And/or following the example principle shown in FIG. 15(b), the sample value may be derived as:

$v(x,y) = a*v(\text{sign}(x)(|x|+|y|),0) + b*v(0,\text{sign}(y)(|x|+|y|))$, $a = |x|/(|x|+|y|)$, $b = |y|/(|x|+|y|)$.

A process (e.g., a similar process) may be used for the one or more projection geometries that includes one or more faces. For example, projection geometries composed of one or more faces may include, but not limited to octahedron and/or icosahedron.

The geometry padding may be applied in one or more of the following cases. For example, the geometry padding may be performed in an intra prediction. For example, the geometry padding may be performed when neighboring samples are outside a picture boundary. For example, the geometry padding may be performed when the neighboring samples are not within the same face as the current sample being predicted. The geometry padding may be performed in an inter prediction. For example, the geometry padding may be performed when reference samples are outside a reference picture boundary. For example, the geometry padding may be performed when the reference samples are not within the same face as the current sample being predicted. Mapped sample position derivation may include one or more of the following. A 3D position $Pf(X, Y, Z)$ on a face to be padded may be calculated based on a point $(u, v)$. A position $Ps(X', Y', Z')$ may be calculated by projecting $Pf(X, Y, Z)$ onto a geometry structure. A 2D planar position $(u', v')$ on a new face may be calculated. The mapped sample position derivation may be used for deriving a spatial neighboring block that may be outside a picture boundary. The mapped sample position derivation may be used for deriving a spatial neighboring block that may not be within the same face as the block being predicted. An attribute of a mapping block position may be used as a predictor for a block (e.g., the current block). For example, an attribute of a mapping block position may include one or more of the following: intra mode, inter mode, merge mode, motion information (that may include motion vector(s) and/or reference picture index (es)), and/or the like. Mapping block position used as a predictor for a block may include one or more of the following: derived using the techniques such as calculating p $(u, v)$'s 3D position $Pf(X, Y, Z)$; calculating $Ps(X', Y', Z')$; and/or calculating 2D position $(u', v')$. For example, for motion vector prediction and/or motion vector derivation of inter merge mode, the motion vector of the mapping block position derived as described herein may be used as a motion vector predictor and/or as the motion vector of a merge candidate. The position of the neighboring block may be derived, and/or the attributes from the mapped block may be inferred. The position of the neighboring block may be calculated, for example, as the location p $(u, v)$ closest to the current block considering which one of the neighboring blocks (e.g., left, above, etc.). For example, if $(u_c, v_c)$ is the location of the current block's top left corner, the left neighboring block's location may be calculated using $(u_c-1, v_c)$, and the top neighboring block's location may be calculated using $(u_c, v_c-1)$, etc. The position of the neighboring block may be calculated as the center of the neighboring block. For example, if $(u_c, v_c)$ is the location of the current block's top left corner, the left neighboring block's location may be calculated as the center position of the block containing the position $(u_c-1, v_c)$, and the top neighboring block's location may be calculated as the center position of the block containing $(u_c, v_c-1)$, etc. For example, the position of the neighboring block may be determined by unfolding the 3D geometry. Unfolding the 3D geometry may determine the mapping block position on a neighboring face.

As shown in FIG. 14(b), the mapping position for one or more samples in the four corner regions to be padded may be the nearest corner sample position inside the face when using a repetitive padding. If a position of the neighboring block is on the diagonal (e.g., represented using dashed lines in FIG. 15(a) and/or FIG. 15(b)), the block may be considered as unavailable as its position may be mapped to a cube face boundary, which may not belong to a face. If a position of the neighboring block is not on the diagonal, the neighboring block position may be projected to the nearest available position relative to the face boundary, as shown in FIG. 15(a) and/or FIG. 15(b), respectively. For example, the neighboring block position may be projected to the nearest available position perpendicularly relative to the face boundary, as shown in FIG. 15(a). For example, the neighboring block position may be projected to the nearest available position diagonally relative to the face boundary, as shown in FIG. 15(b). The geometry padding techniques may be applied to one or more filtering processes during video coding. The filtering processes may include, for example, loop filtering, sample adaptive offset (SAO), and/or adaptive loop filtering (ALF), in which neighboring samples may be used. When a neighboring sample is outside a picture boundary or not within the same face as the sample being filtered, geometry padding may be used to derive the neighboring sample value.

Figure 18:
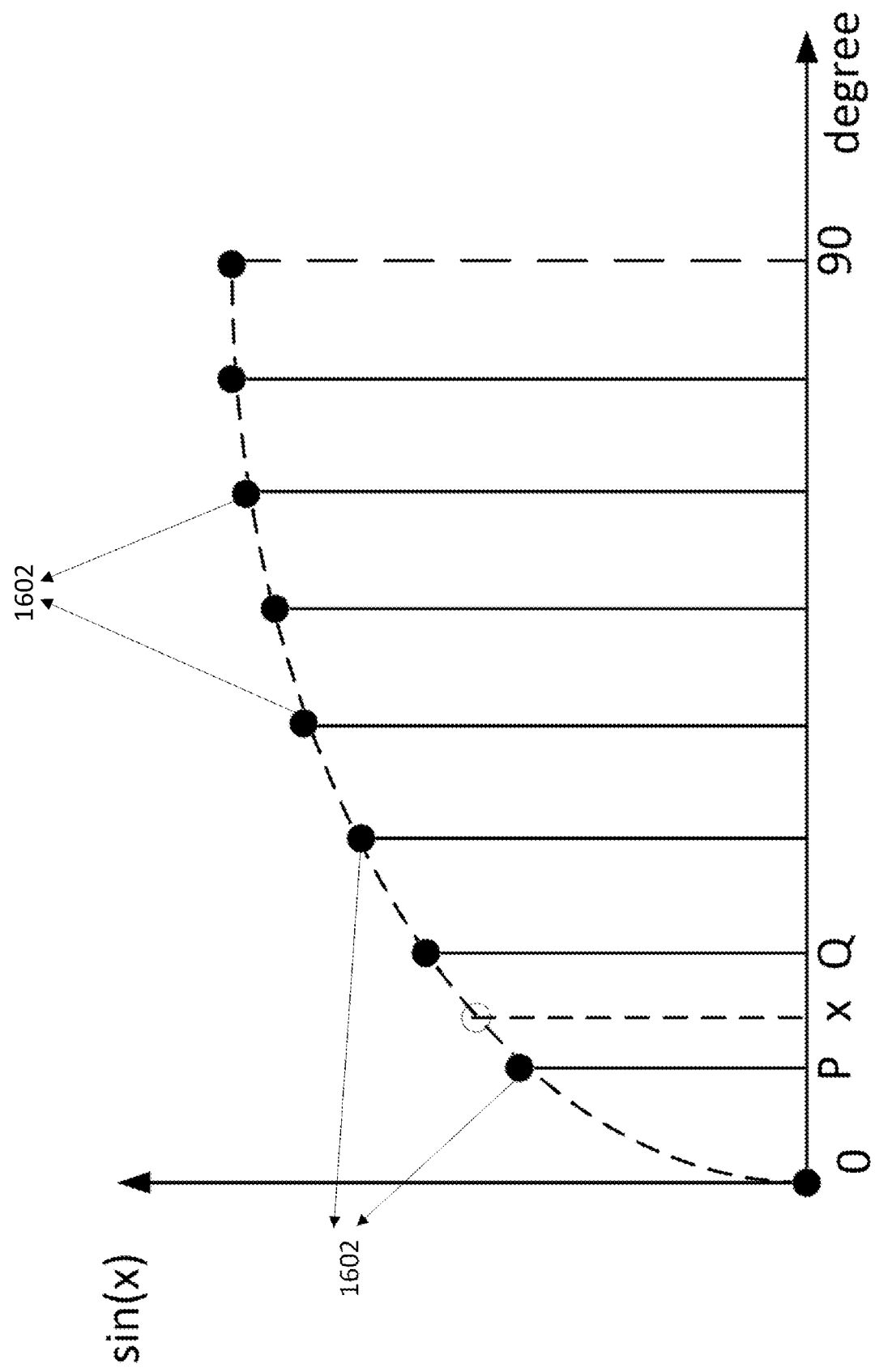
FIG. 18 illustrates how a sine function may be derived using a look-up table.

Equations (3), (4), and/or (5) use sine and/or cosine functions. Hardware implementations of the non-linear functions, such as sine and/or cosine functions in Equations (3), (4), and/or (5), may use a look-up table (LUT) and/or linear interpolation. The LUT may be defined in a range [0, 90] because those are circular functions. Approximation precision may be determined based on application requirements and/or memory size restrictions. FIG. 18 illustrates an example derivation of a sine function using a LUT. $\sin(x)$ may be a sine function of variable x. One or more black solid circles 1602 may define a LUT for the function $\sin(x)$ that is evenly sampled in the range [0, 90]. x may be an input variable whose value may not be defined in the LUT. P and Q may be the first and second nearest neighbors (e.g., or sampling points) of the input x. One or more different interpolations may be applied to derive the value of $\sin(x)$. For example, if the nearest neighbor interpolation is used, $\sin(x)$ may be approximated as $\sin(x)=\sin(P)$. If linear interpolation is used, $\sin(x)$ may be approximated as $\sin(x)=\sin(P)+(\sin(Q)-\sin(P))*(Q-x)/(Q-P)$ The LUT may be defined among a range with an uneven sampling. For example, for $\sin(x)$, more sampling points may be used in the range near to 0 degree and fewer sampling points may be used for the range near to 90 degree (e.g., since the gradient near 0 degree is larger than that of near 90 degree).

Figure 19A:
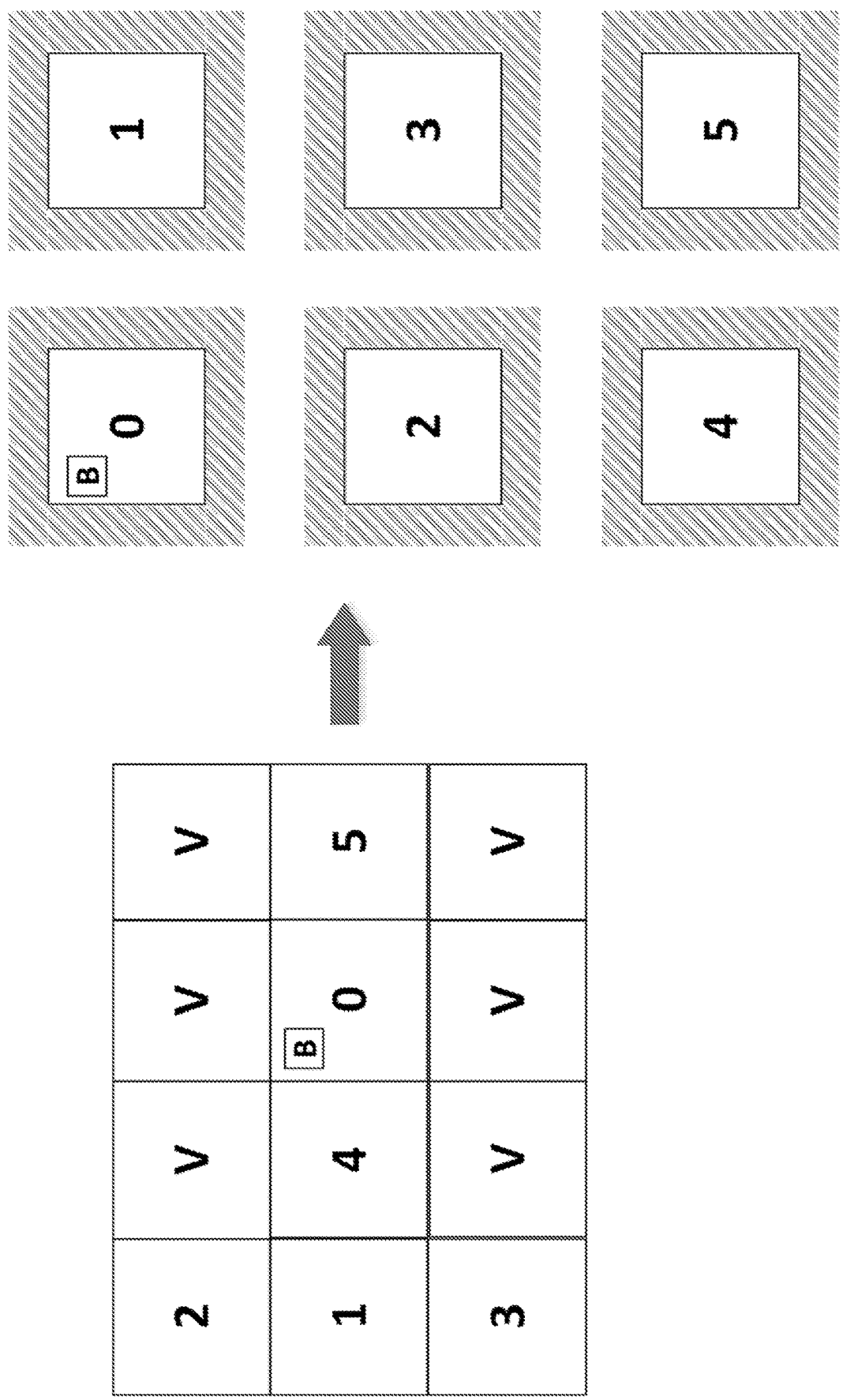
FIG. 19(a) illustrates padded face buffers for motion estimation.

Faces of a frame-packed picture may be padded with a geometry padding and/or stored in a decoded picture buffer. For example, as shown in FIG. 19(a), one or more (e.g., all) faces may be padded with a geometry padding and/or stored in the decoded picture buffer for the motion estimation of future picture coding. Faces may be padded with a geometry padding and/or stored in the decoded picture buffer at the encoder side and/or at the decoder side. Faces may be padded with a geometry padding and/or stored in the decoded picture after the reference picture is reconstructed. One or more faces may be padded with a geometry padding and/or stored in the decoded picture buffer for the motion estimation of future picture coding. The motion estimation process may determine the face and/or the position where the current block may be located according to frame packing information.

Figure 19B:
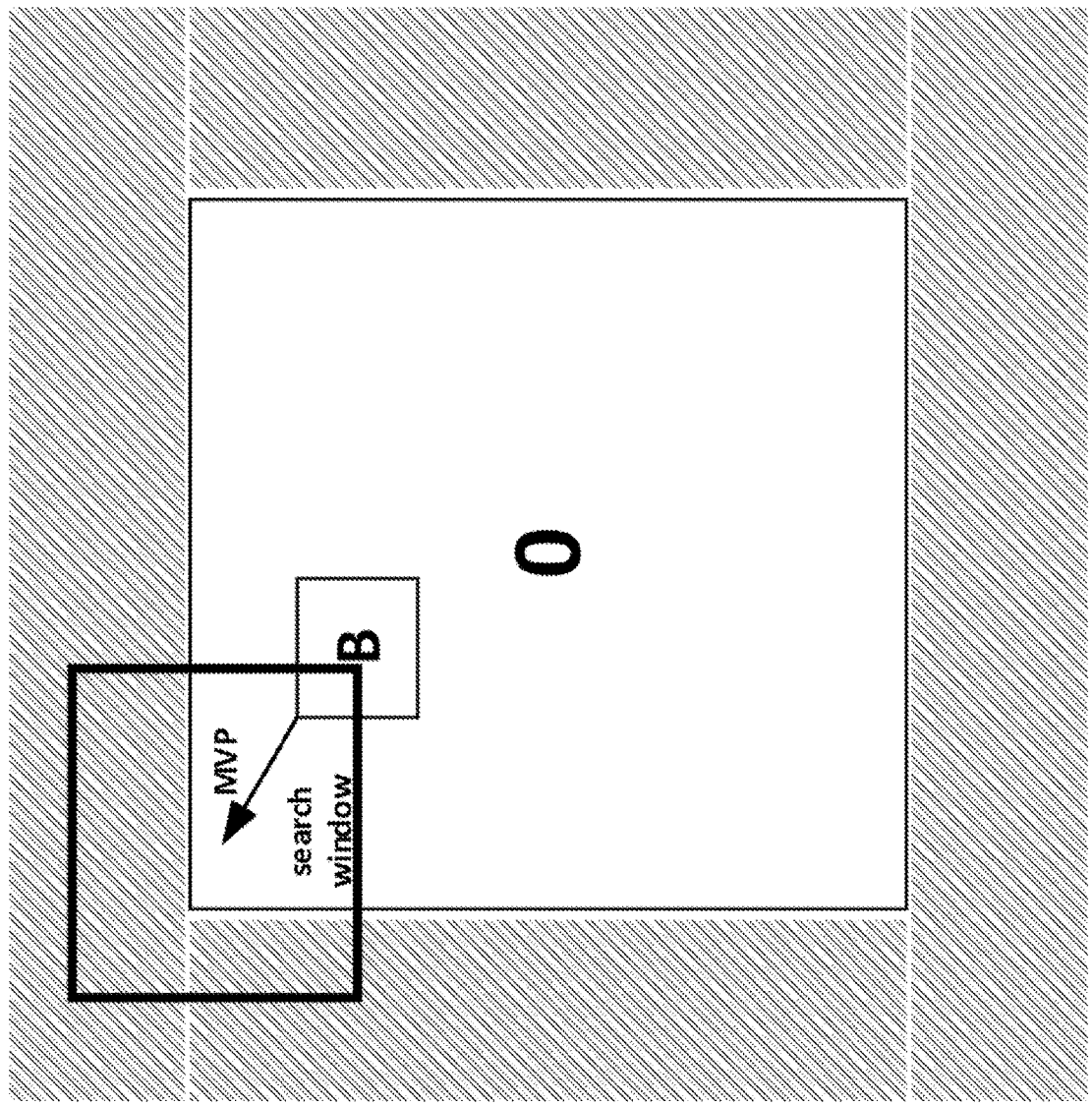
FIG. 19(b) illustrates motion estimation in the padded face buffer.

A block (e.g., the entire block) may be skipped without encoding. For example, if a block (e.g., the entire block) is inside the null face marked as "V" in FIG. 19(a), the block (e.g., the entire block) may be skipped without encoding. If the block (e.g., the entire block) is not inside the null face marked as "V" in FIG. 19(a), a motion estimation process may determine a search window for the block based on the starting position and/or a pre-defined search range. For example, block "B" may be located in face "0," as shown in FIG. 19(a) and FIG. 19(b). The starting position may be the motion vector predictor derived from its spatial and/or temporal neighbor blocks. The search window may be restricted to be within the padded face buffer. For example, the search window may be restricted to be entirely within the padded face buffer. A motion search may be used. For example, a motion search may include full search, fast search, and/or the like. For example, a motion search may be used when the search window is determined.

The size of a padded region may affect performance. For example, the size of padded region may affect performance because the search window may be restricted to be inside the padded face buffer. Geometry padding may be performed to get padded faces for reference pictures. Geometry padding may be performed at the decoder side and/or at the encoder side. The padded face buffer may be used for motion compensation. Geometry padding may generate a predicting block. For example, geometry padding may generate the predicting block on the fly. Generating a predicting block via geometry padding may perform padding block by block. For example, generating a predicting block via geometry padding may perform padding on an as-needed basis.

To decode an inter block, a decoder may determine whether a prediction block (or portions of the prediction block) may be outside the face or inside the face. For example, the decoder may determine whether a prediction block may be outside the current face. The decoder may determine whether portions of the prediction block may be outside the current face. A decoder may be determined whether a prediction block (e.g., or portions of the prediction block) may be outside the current face based on the decoding block's position and/or its motion vector. The decoder may not perform any padding. For example, if the prediction block is inside the face, the decoder may skip padding. The decoder may generate (e.g., may only generate) a specific block (e.g., or portions of the prediction block) using a geometry padding technique. The decoder may not pad face boundaries (e.g., the entire face boundaries). For example, if the prediction block (and/or portions of the prediction block) is outside the face, the decoder may generate that specific block (e.g., and/or portions of the prediction block) using the geometry padding technique.

A lookup table storing corresponding sample position information may be used. The lookup table may store corresponding sample position information for each padded position of each face. One or more restrictions for a size of padded region may be defined. For example, a maximum size and/or restrictions for a size of the padding region may be defined to reduce the requirements for a size of LUT used for geometry padding. One or more restrictions for a size (e.g., the maximum size) of padded region may be defined depending on the picture size, which may be in profile/level definition to reduce the implementation resource requirement. For example, a video with a larger picture size may use a larger padded region size. The padded region size may be signaled at sequence level, such as sequence parameter set (SPS), picture parameter set (PPS), and/or the like.

The decoder may be initialized. For example, by signaling the padded region size at sequence level, the decoder may be initialized (e.g., may be initialized faster) because LUT may build-up. LUT may build up based on the signaled information.

When the geometry padding technique is used for motion compensated prediction and when the temporal reference sample is outside the face that the current block belongs to, the motion vector of the current block and/or the motion vector of the current block's neighboring block may be different. For example, the motion vectors of the current block and/or the current block's neighboring block may be quite different when the current block and its neighboring block belong to different projection faces. The motion vector of the current block and/or the motion vector of the current block's neighboring block may be quite different because two neighboring faces in a frame-packed picture may not be adjacent (e.g., immediately adjacent) in 3D space. The motion vector of the current block and/or the motion vector of the current block's neighboring block may be quite different because there may be warping effects when two adjacent (e.g., immediately adjacent) faces in 3D space are placed into 2D frame-packed picture, which may cause the discontinuity of sample value and/or motion vector at face boundaries. Whether the motion vector of the neighboring block for motion vector predictor may be used for predicting a current block may be determined based whether the neighboring block belongs to a different face. An encoder and/or decoder may check if the one or more (e.g., two) adjacent face boundaries may be connected in 3D space. One face boundary may be the boundary of the face that the neighboring block may belong to. The other face boundary may be the boundary of the face that the current block may belong to. If the one or more (e.g., two) face boundaries are connected in 3D space, the motion vector of the neighboring block may be used as a motion vector predictor for the current block. If the one or more (e.g., two) face boundaries are not connected in 3D space, the motion vector of that neighboring block may not be used for the motion vector prediction of the current block. The one or more (e.g., two) motion vector prediction restrictions may be applicable to the inter merge mode. For example, if the neighboring block belongs to a different face, the neighboring block may not be used as the merge candidate for the inter merge mode.

Geometry padding for unicube, ACP, and EAC projections may be performed.

As described herein, Equations (11) and/or (12) may provide relationships between the coordinate (x', y') in unicube domain and the coordinate (x, y) in cube domain. The geometric relationship between the coordinate in the cube domain and the corresponding 3D point Ps on the sphere may be known. Using the cubemap as an intermediate stage, the cubemap geometry padding may be extended to derive the reference samples in the padded regions for the unicube projection format. For example, to derive a reference sample at a coordinate in the padded region of a unicube face, one or more of the following may be performed. The coordinate associated with an input projection of the frame-packed picture may be mapped into an intermediate coordinate. For example, the coordinate associated with the unicube projection may be mapped into the intermediate coordinate as defined in cube face, for example based on Equation (12). The intermediate cube coordinate may be projected onto one or more other cube coordinates in a neighboring face. For example, the intermediate cube coordinate may be projected onto one or more other cube coordinates in a neighboring face based on the geometry projection functions of the cubemap format. The cube coordinate may be mapped back to the reference coordinate defined in the unicube domain, for example based on Equation (11). The sample at the reference coordinate in the unicube face may be derived, for example using interpolation filtering.

A coordinate (u, v) in the padded region of a face may be provided. The geometry padding for the unicube format may be performed. One or more coordinates may be converted from the unicube format/geometry to the cube format/geometry. For example, the input coordinate (u, v) may be defined in the unicube face. The intermediate coordinate (uc, vc) defined in the cube face may be calculated according to Equation (12). The reference coordinate (uc', vc') may be derived by projecting (uc, vc) onto a neighboring cube face via one or more of the following. 2D-to-3D mapping from cube to 3D space may be performed. Depending on the face that (uc, vc) belongs to, the corresponding 3D position of (X, Y, Z) may be calculated. For example, if face is NZ, Equation(s) (6), (7), and/or (8) may be used to calculate the 3D position of (X, Y, Z). The new face that the reference sample belongs to may be determined, for example, based on the 3D coordinate (X, Y, Z).

If($|X|>=|Y|$ and $|X|>=|Z|$ and $X>0$),the new face may be PX;

If($|X|>=|Y|$ and $|X|>=|Z|$ and $X<0$),the new face may be NX;

If($|Y|>=|X|$ and $|Y|>=|Z|$ and $Y>0$),the new face may be PY;

If($|Y|>=|x|$ and $|Y|>=|Z|$ and $Y<0$),the new face may be NY;

If($|Z|>=|X|$ and $|Z|>=|Y|$ and $Z>0$),the new face may be PZ;

If($|Z|>=|X|$ and $|Z|>=|Y|$ and $Z<0$),the new face may be NZ 3D-to-2D mapping from 3D space to cube may be performed. The projected 2D coordinate (uc', vc') may be calculated in the new face using (X, Y, Z). For example, if the new face is NZ, Equation(s) (9) and/or (10) may be used to derive (uc', vc') with (X, Y, Z). One or more coordinates may be converted from the cube format/geometry to the unicube format/geometry. For example, given the reference coordinate (uc', vc') defined in the cube face, the corresponding reference coordinate (u', v') defined in the unicube face may be calculated. The sample at the reference coordinate (u', v') in the unicube face used for padding may be derived by applying the interpolation filter to the samples at the integer positions around (u', v') in the unicube face.

As shown in Equation (12), the transform function $\beta=g(\beta')$ may map a coordinate from a unicube face to a cube face. The transform function $\beta=g(\beta')$ in Equation 12 may be include a fraction that contains a square root at its denominator. The following may be performed to prevent the denominator from being zero:

$$\sin^2\left(\frac{\pi}{6}\beta'\right) < \frac{1}{2} \Rightarrow -1.5 < \beta' < 1.5 \qquad (20)$$

Figure 27:
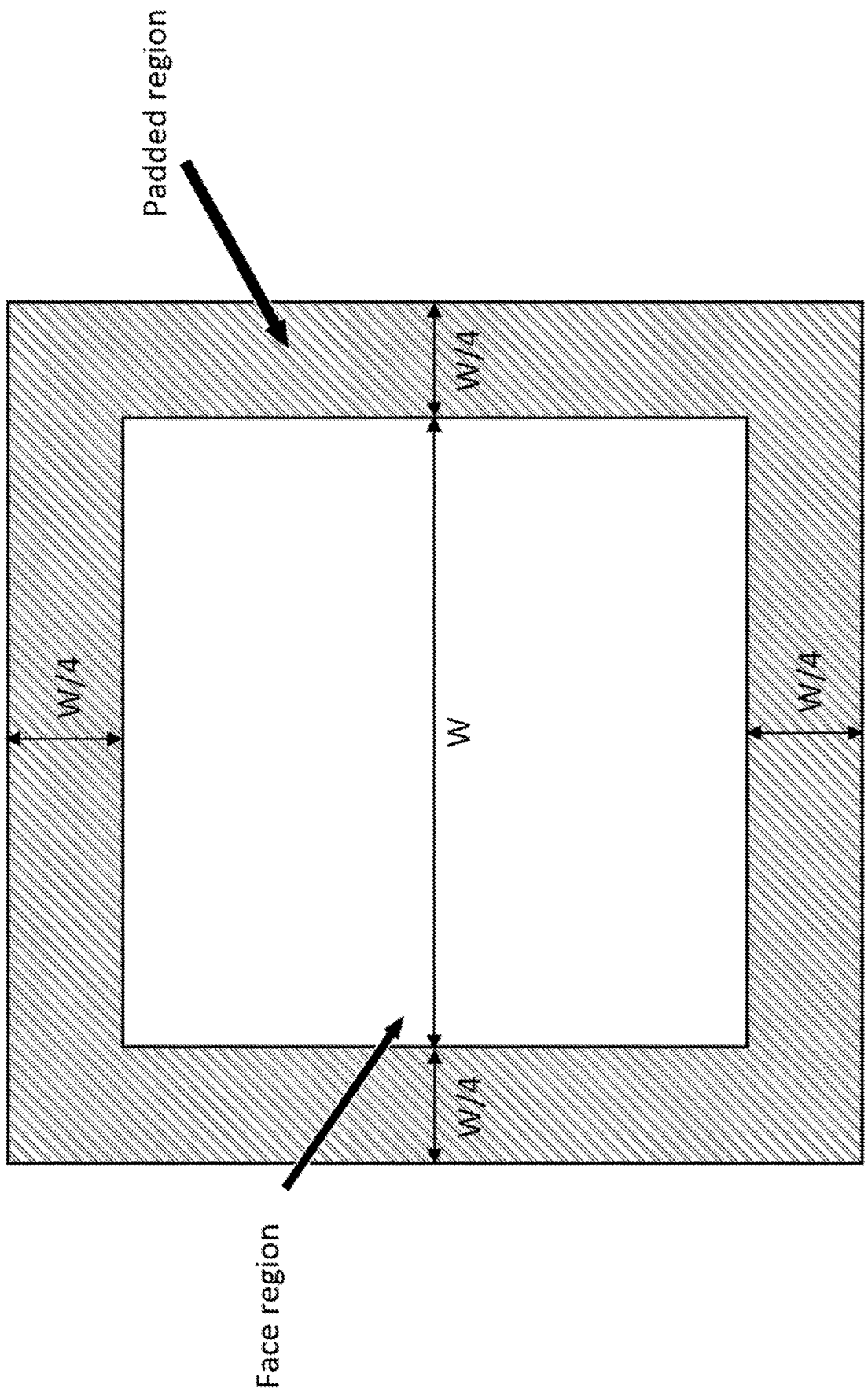
FIG. 27 shows an example illustration of the valid region of the padded samples for one unicube face.

$\beta' \in [-1, 1]$ may define the range of the coordinates of the samples inside a unicube face. If $\beta' \in [-1, 1]$ may define the range of the coordinates of the samples inside a unicube face, Equation (20) may provide that when an arbitrary 3D point is projected onto a unicube face, the projection on the face may be within the region which may be centered at the face center and/or may be 1.5 times as large as the face size in horizontal and/or vertical directions. When applying the geometry padding to the unicube format, there may be a limit on the maximum size of the padded region for a unicube face. For example, the maximum size of the padded region of a unicube face may not exceed 1.5 times the face size. FIG. 27 illustrates an example of the valid region of the padded samples in a face for the unicube projection format.

When motion compensated prediction refers to a sample that is outside picture boundaries and/or face boundaries, the geometry padding described herein may be applied to pad the corresponding reference sample with the consideration of the 3D geometry structure represented by the coding projection format. For example, the prediction block (or portion of the prediction block) may be outside the valid region of padded samples in the unicube face.

The geometry padding may be performed on 360-degree video coding based on unicube projection.

Figure 28:
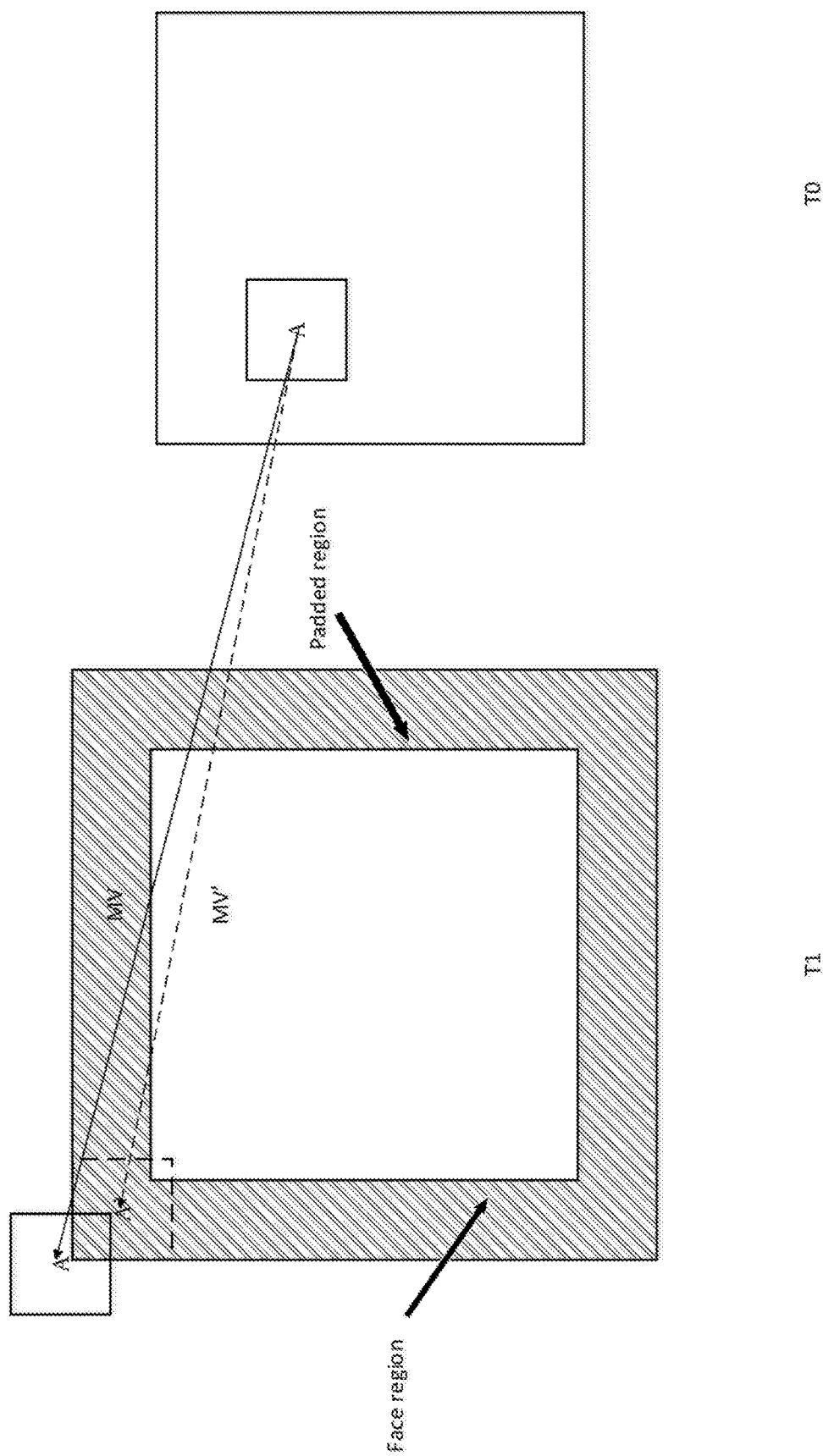
FIG. 28 shows an example illustration of clipping MV to the valid region of padded samples for the unicube format.

FIG. 28 illustrates an example MV clipping to the valid region of padded samples for the unicube format. As shown in FIG. 28, the MV clipping operation may be performed before the motion compensated prediction at encoder and/or decoder. For example, the temporal prediction may use the reference samples that are from the valid region of the padded samples in a unicube face. If a MV points to a reference block that may be outside or partially outside the valid padded region of a unicube face, the MV may be clipped to a nearest value such that the reference samples of the prediction block may be within the valid region for padding. As shown in FIG. 28, the reference block A is partially outside of the valid padded region. The MV associated with the reference block A may be clipped to generate MV', which points to the reference block A'. The reference block A' may be a neighboring block that is within the valid padded region.

A bitstream conformance may be provided to ensure that the coded MVs have the proper values. For example, a bitstream conformance may be provided to ensure that the coded MVs have the proper values that one or more (e.g., all) of the reference samples of the prediction block are from the valid padded region of a unicube face. Given the position and/or the size of a coding block, the range of the valid MVs may be determined. For example, the range of the valid MVs may correspond to a motion compensated prediction signal that does not use reference samples outside the valid padded region. The value of a MV in a conformed bitstream may be within the predetermined range.

Figure 29:
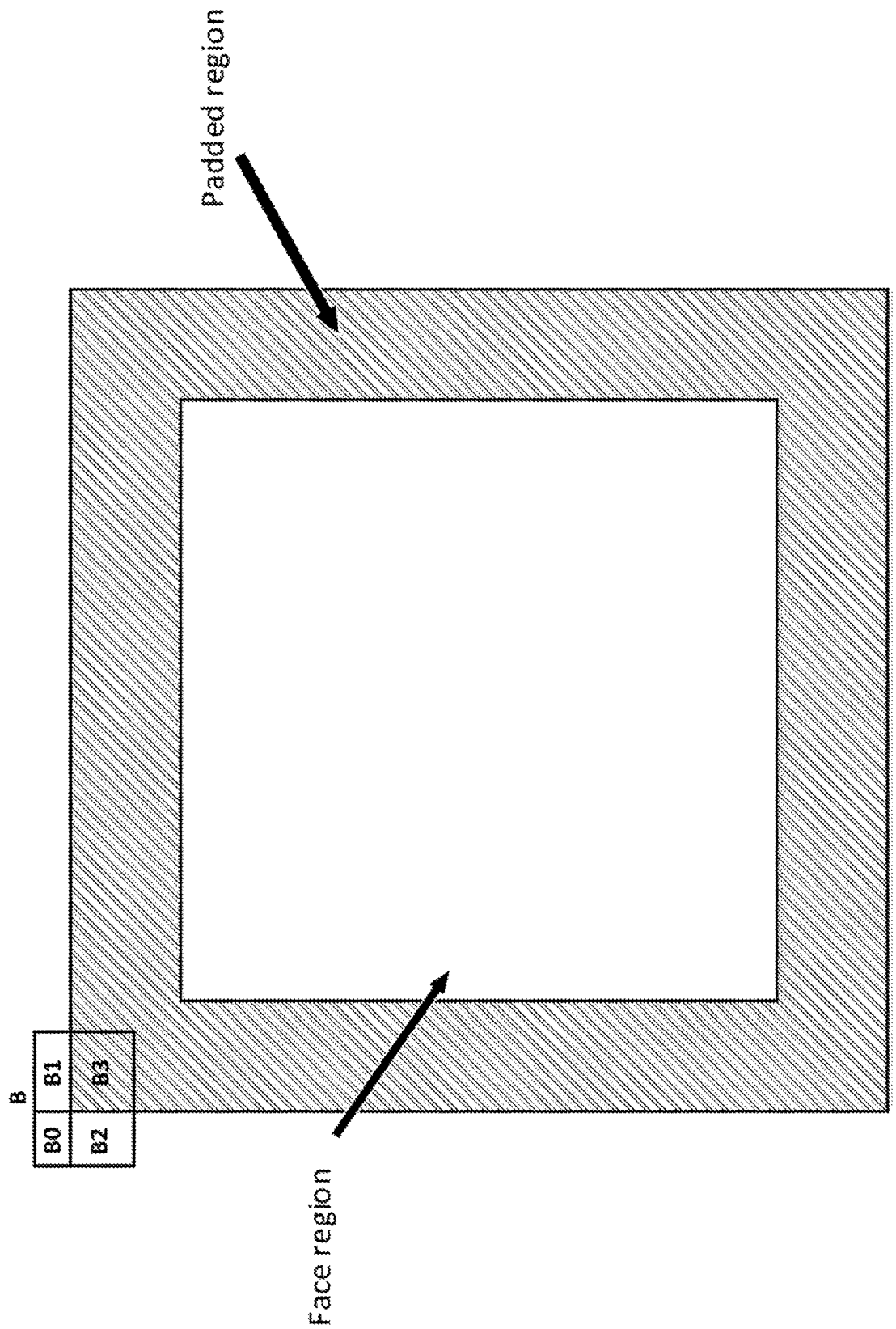
FIG. 29 shows an example illustration of a hybrid padding for the unicube projection.
Figure 30:
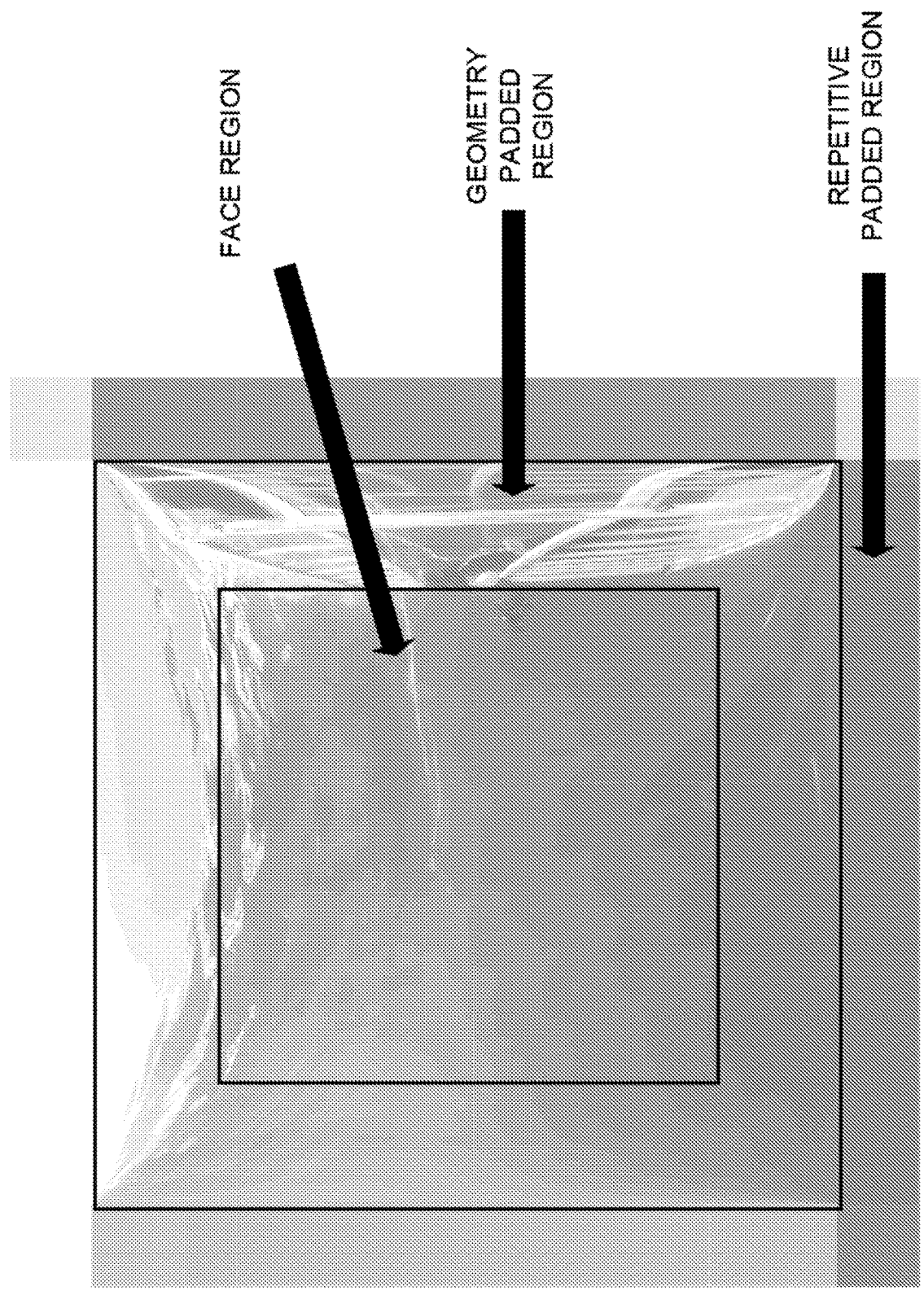
FIG. 30 illustrates an example picture of the hybrid padding for the unicube projection.

A hybrid padding may be performed to pad the reference samples for motion compensated prediction for the unicube. The hybrid padding may jointly apply geometry padding and repetitive padding. If the position of the reference sample is within the valid region of padded samples in a unicube face, the geometry padding may be applied to derive the corresponding sample value based on the 3D geometry structure represented in a 360-degree video. If the position of the reference sample is not within the valid region of padded samples in a unicube face (e.g., the position of the reference sample is outside the valid padded region of the unicube face), repetitive padding may be applied to pad the sample by clipping the sample position to the nearest position that is within the valid padded region horizontally and/or vertically. FIG. 29 illustrates an example hybrid padding for the unicube projection format. As shown in FIG. 29, the reference block B may be outside (e.g., partially outside) the valid padded region of the unicube face. The samples in sub-block B3 may be inside the valid padded region, and the sample values may be derived based on the geometry padding. For sub-blocks B0, B1, and B2, the corresponding samples may be padded by copying (e.g., repetitively copying) the sample values from the boundaries of the valid padded region. For example, B0 may be filled with the top-left sample of B3. B1 may be filled with the top line of B3. B2 may be filled with left column of B3. FIG. 30 illustrates an example of a padded picture using a hybrid padding. The repetitive padding may be employed as an example in the hybrid padding. One or more other padding methods (e.g., the face-based padding in FIG. 14, the perpendicular-extrapolation based and/or the diagonal-extrapolation based padding in FIG. 15, and/or the like) may be applied in the hybrid padding to pad the samples that may be outside the valid region of padded samples for the unicube projection format.

Figure 32:
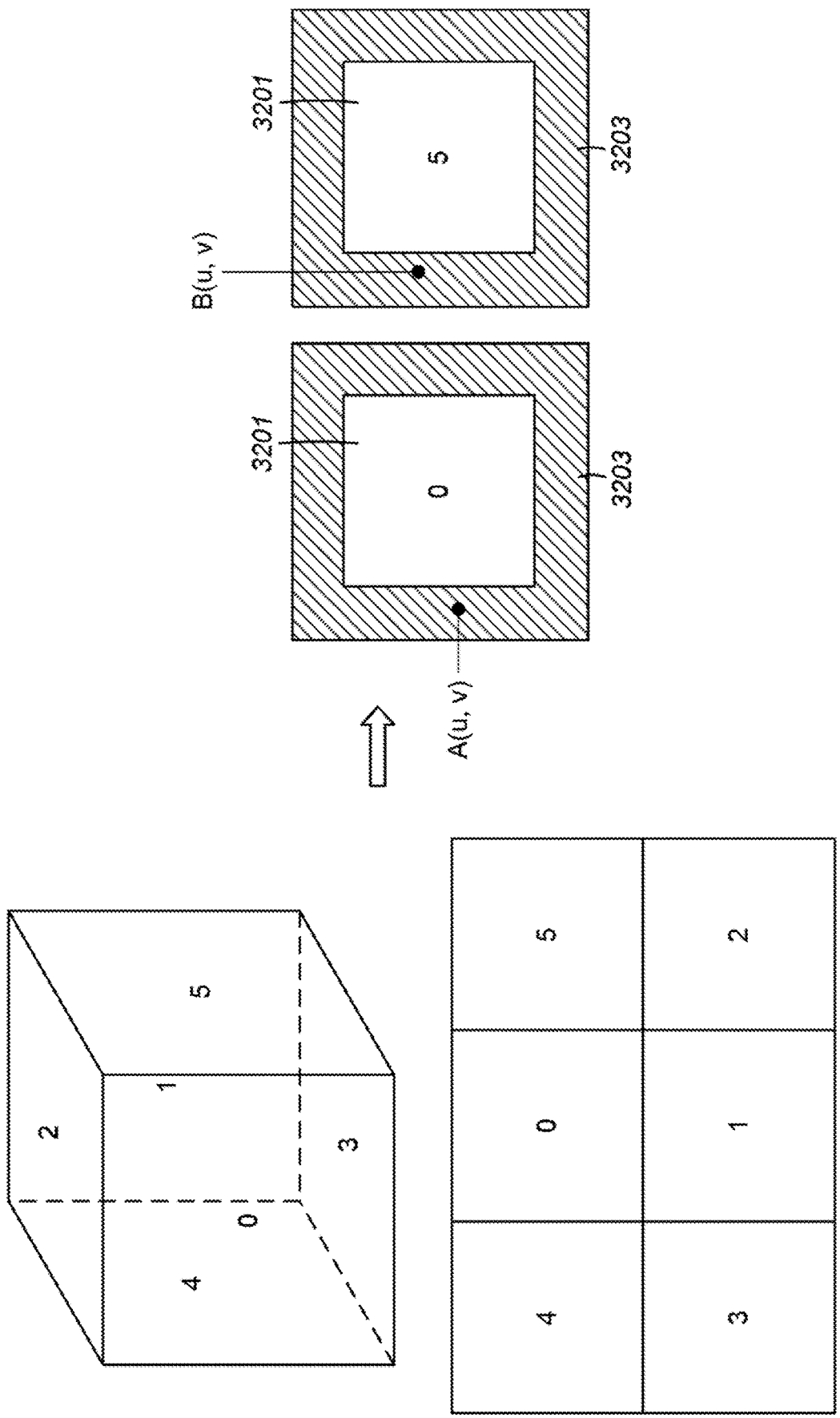
FIG. 32 shows an example illustration of using a look-up for the six faces for geometry padding for the unicube.

At a sequence level, when the unicube face size is known, one or more of the following may be pre-calculated and/or stored as a LUT. For example, a padding sample position LUT may indicate the correlation of calculated intermediate coordinate (uc, vc) defined in the cube face, derived reference coordinate (uc', vc'), and/or calculated reference coordinate (u', v') defined in the unicube face. The LUT may store the derived sample position(s) that may be used to pad the sample value at a padded sample position. Derived mapped samples at the reference coordinate (u', v') in the unicube face may be calculated (e.g., calculated dynamically) for a picture. The projection from 3D space onto six unicube faces may be symmetric. A reference LUT may be stored for a face which may be re-used by one or more of the other five faces. For example, a single reference LUT may be stored for a face that may be re-used by one or more of the other five faces. FIG. 32 shows an example illustration of using a LUT for six faces for geometry padding for the unicube. As shown in FIG. 32, a 3×2 frame-packing arrangement may be applied. In FIG. 32, the blank blocks 3201 may represent face regions. The patterned blocks 3203 may represent padded regions. As shown in FIG. 32, sample A and sample B may be two samples that may be located at the same position in the padded region of face #0 and face #5, respectively. The sample A may be projected onto a 2D coordinate (u, v) in face #4. Based on the symmetric 3D projection structure, as presented in FIG. 32, the sample B may be projected to the same coordinate (e.g., (u, v)) in the neighboring face of face #5, e.g., face #0. For example, for the same sample position in the padded regions of different faces, the corresponding coordinates in the projection faces may be identical. A LUT that contains the projected coordinates for the padded sample position may be stored for a face, which may be reused to calculate the projected coordinates of the padded samples in the other face. The coordinate of the mapped sample may be mapped in the projection face when the LUT is reused throughout one or more (e.g., all) of the faces. For example, the coordinate of the mapped sample may be mapped in the projection face when a LUT (e.g., the same LUT) is reused throughout one or more (e.g., all) of the faces based on the rotation(s) during the frame-packing process.

While the unicube projection may be used herein to describe the limited padded region when geometry padding is applied for 360-degree video coding, the limited padded region may apply to exist for other cube-like projection formats (e.g., ACP, EAC, and/or the like), which may achieve a different spherical sampling grid by modifying the coordinate of the samples on a 2D planar face before the actual cubemap face is generated. One or more of the geometry padding techniques described herein (e.g., MV clipping, bitstream conformance, and/or hybrid padding) may be applicable when the geometry padding is used together with one or more other projection formats. The mapping functions used by different projection formats may vary. The size of valid padded region may be adjusted based on the project format. For example, when the ACP is used as the coding projection format, to ensure the inside of the square root in Equation (14) is not smaller than zero, $-1.28 \leq \beta' \leq 1.28$ may be used. For example, the maximum size of the padded region for an ACP face may be 1.28 times the face size. When the EAC is used as the coding projection format, the maximum size of the padded region may be derived from Equation (16) as $-2 < \beta' < 2$.

Geometry padding for a reference picture with a conformance window may be provided. The coded picture size may be a multiple of minimal CU size in horizontal and/or vertical directions. For example, the coded picture size may be a multiple of minimal CU size in horizontal and/or vertical directions because the picture may be partitioned into coding units for coding. A conformance window may be used, and/or the window size may be signaled in the sequence parameter set to make the padded picture size a multiple of the minimal CU size. For example, if the source picture size is not a multiple of minimal CU size, the window size may be signaled in the sequence parameter set to make the padded picture size a multiple of the minimal CU size. Parameters W and H may indicate the width and height of the source picture. Parameters mCU_width and mCU_height may indicate the width and height of minimal CU. Parameters dW and dH may indicate the padded size in horizontal and vertical directions for the conformance window. Ceil(x) may be the ceiling function to calculate minimal integer value no less than variable X.

$$dW = \text{Ceil}(W/m\text{CU\_width}) * m\text{CU\_width} - W$$

$$dH = \text{Ceil}(H/m\text{CU\_height}) * m\text{CU\_height} - H$$

Figure 20A:
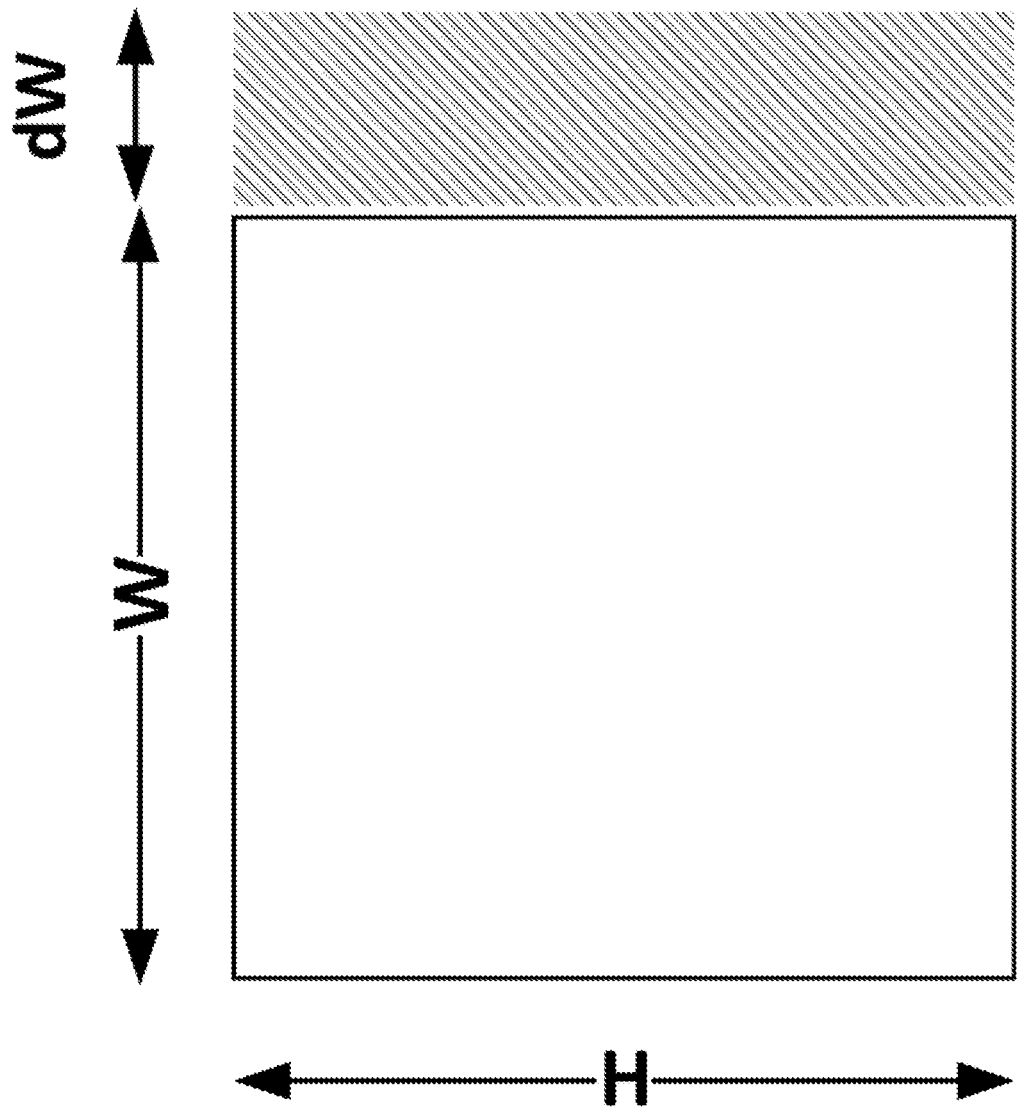
FIG. 20(a) illustrates padding in the horizontal direction when a source picture size is not a multiple of minimal coding unit (CU) size.
Figure 20B:
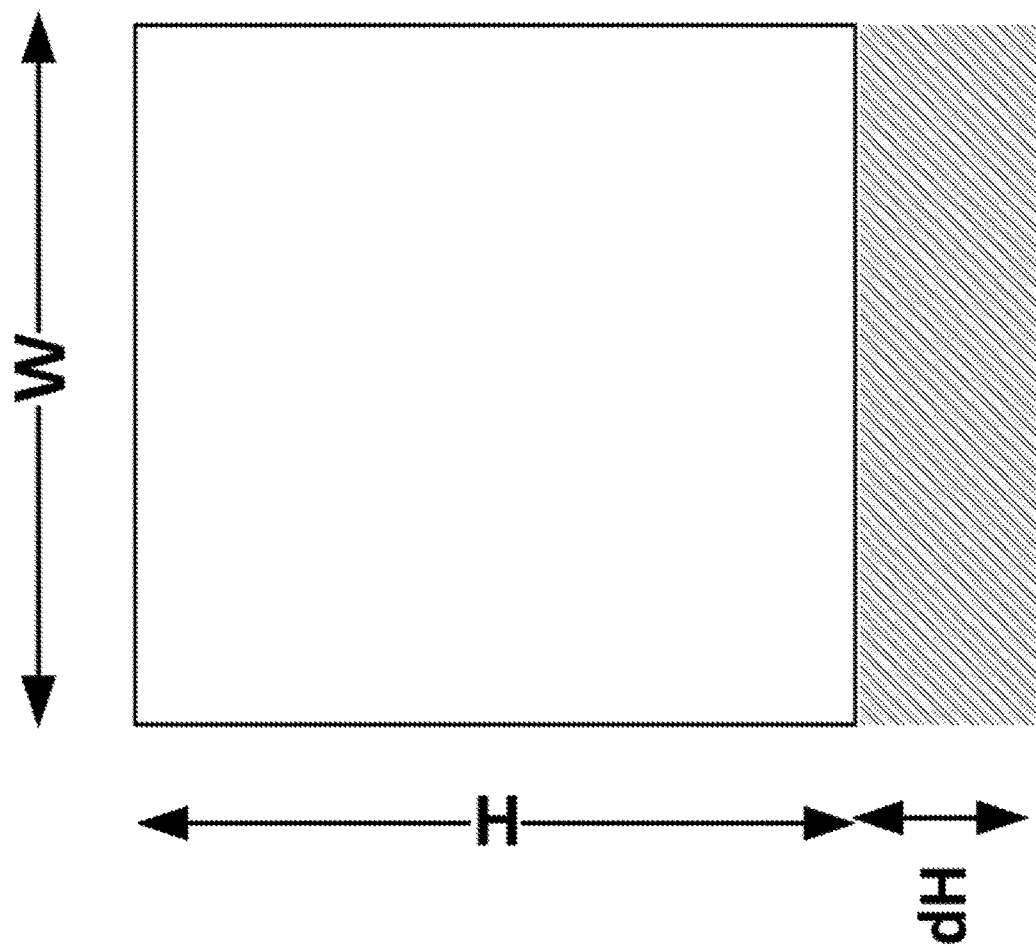
FIG. 20(b) illustrates padding in the vertical direction when a source picture size is not a multiple of minimal CU size.
Figure 20C:
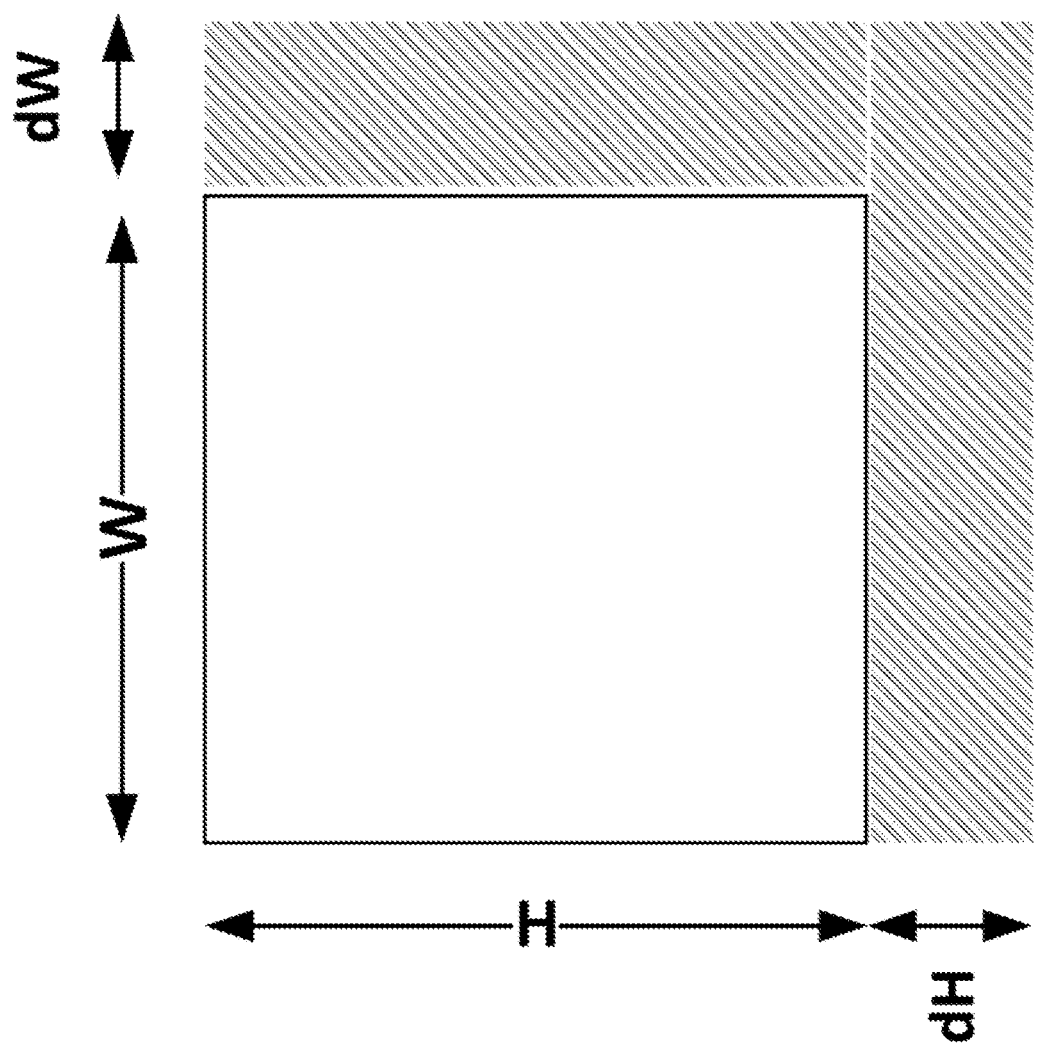
FIG. 20(c) illustrates padding in the horizontal direction and the vertical direction when a source picture size is not a multiple of minimal CU size.

FIGS. 20(*a*), 20(*b*), and 20(*c*) show three examples of padding when a source picture size is not a multiple of minimal CU size in horizontal and/or vertical direction. FIG. 20(*a*) illustrates an example padding in the horizontal direction when a source picture size is not a multiple of minimal CU size. FIG. 20(*b*) illustrates an example padding in the vertical direction when a source picture size is not a multiple of minimal CU size. FIG. 20(*c*) illustrates an example padding in the horizontal direction and the vertical direction when a source picture size is not a multiple of minimal CU size. When geometry padding is performed for a face of the reference picture, the padding may start from the face boundary and may move outward which may not include a conformance window to make the padded face continuous. For example, when geometry padding is performed for a face of the reference picture, the padding may start from the face boundary and may move outward because the padding in the conformance window may be indicated by the encoder. For example, the face of the reference picture may not include a conformance window to make the padded face continuous. For example, the face of the reference picture may contain a conformance window to make the padded face continuous. The conformance window may be kept unchanged, and/or padding may start from the conformance window when geometry padding is performed.

Figure 21:
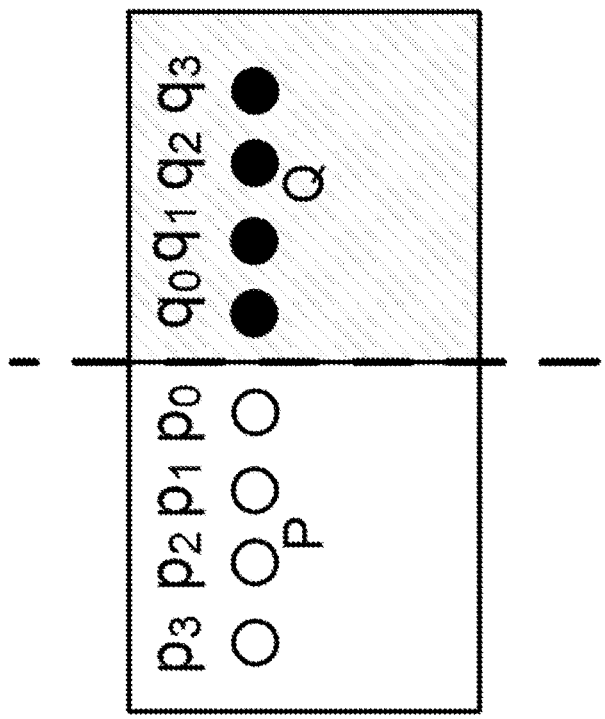
FIG. 21 illustrates neighboring blocks used when deblocking a current block.
Figure 21:
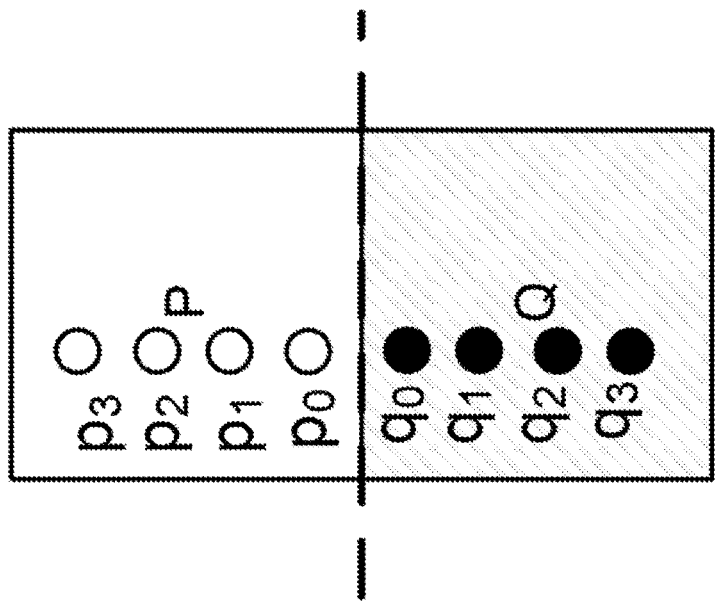

Deblocking with geometry padding may be performed. The deblocking filter may be applied to remove blocking artifacts. For example, the deblocking filter may be applied to remove the blocking artifacts introduced by the encoding process on the boundaries between one or more (e.g., two) neighboring prediction units and/or on the boundaries between one or more (e.g., two) transform units. For a boundary, one or more samples in the neighboring block may be used for the filtering of those samples in the current block. For example, in FIG. 21, block "p" may be a neighboring block of current block "q." One or more reference samples ($p_0$, $p_1$, $p_2$, and/or $p_3$) may be used to filter one or more reference samples ($q_0$, $q_1$, $q_2$, and/or $q_3$). If the boundary is the face boundary, block "p" and/or block "q" may be in one or more (e.g., two) different faces. If the boundary is the face boundary, there may be a discontinuity between reference samples $\{p_0, p_1, p_2, p_3\}$ and reference samples $\{q_0, q_1, q_2, q_3\}$. For example, if the boundary is the face boundary, there may be a discontinuity between samples $\{p_0, p_1, p_2, p_3\}$ and samples $\{q_0, q_1, q_2, q_3\}$ because of geometry warping. Applying a deblocking filter on the face boundary may not remove blocking artifacts. Applying a deblocking filter on the face boundary may decrease the subjective visual quality. The face boundary may be treated as a picture boundary. For example, the face boundary may be treated as a picture boundary, so that the deblocking filter may not be performed on that face boundary. The derived neighboring sample values may be used according to the geometry padding technique for the neighboring samples used as an input to the deblocking filter, rather than using those neighboring samples in another face directly. For example, derived reference samples $p_0$, $p_1$, $p_2$ and/or $p_3$ may be derived as needed using the geometry padding technique when filtering samples $q_0$, $q_1$, $q_2$, and/or $q_3$. The face boundary may be determined according to the frame packing information.

Figure 22:
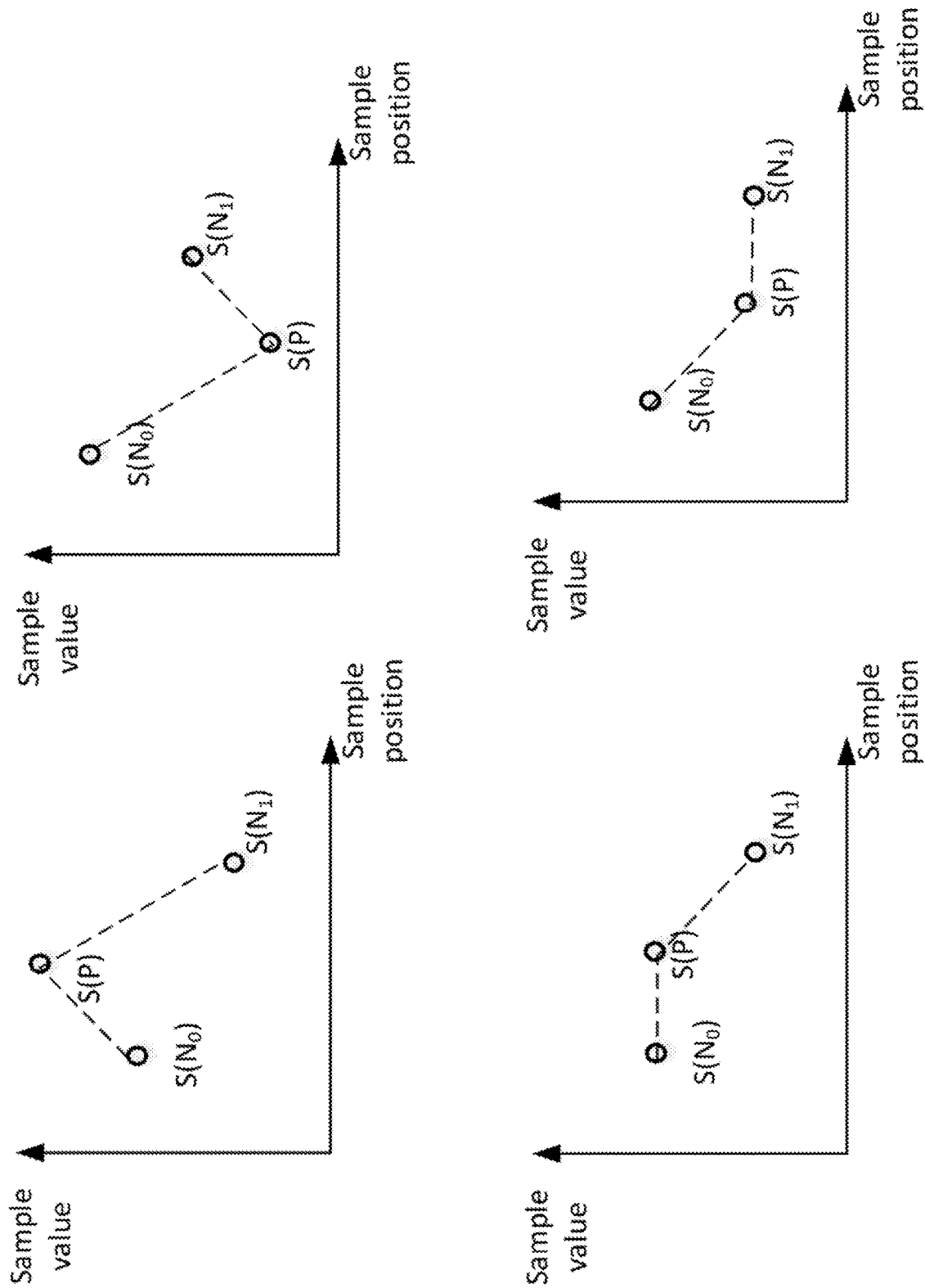
FIG. 22 illustrates a pixel that may be filtered by edge-offset sample adaptive offset (SAO).

Sample adaptive offset (SAO) with geometry padding may be used. SAO may be used to remove high frequency coding artifacts. For example, SAO may be used to remove high frequency coding artifacts in HEVC. SAO may include a band offset and/or an edge offset. SAO parameters may be signaled for a coding tree unit (CTU). For example, the CTU may have 64×64 block size. For edge offset, SAO process may determine whether a pixel is on the edge boundary or not along a given direction. FIG. 22 illustrates examples where the pixel may be processed by edge offset SAO. S(x) may be the sample value at position x. P may be a current sample location, $n_0$ may be its left/top neighbor position, and $n_1$ may be its right/bottom neighbor position. In the four examples shown in FIG. 22, a current sample may be at the edge boundary. The edge boundary may be processed by edge offset SAO. The edge offset SAO process may refer to its neighboring sample values. If the current sample is located at the face boundary, the current sample's neighboring samples may be located in different faces. An example may use derived samples. For example, the derived samples may replace one or more neighboring samples. One or more neighboring samples may be replaced if the current sample is on the face boundary. The face boundary may be treated as a picture boundary, and/or SAO filtering on those face boundary samples may be skipped.

Whether to signal SAO parameters may be determined based on location of the CTU. For example, for 360-degree video coding, if the CTU (e.g., the entire CTU) is inside the null faces (marked as "V" in FIG. 19(*a*)), the SAO parameters may not be signaled because the samples may be used for frame packing and may not be rendered to the user.

Different projection geometries may have different characteristics. For example, ERP and/or equal-area projection may have one face, and face boundary issue may be a lesser concern even when a picture is stretched. Cubemap may have six faces and many face boundaries in a frame-packed picture. As such, a picture may be coded in different projection geometries. Projection geometry indices (e.g., as listed in Table 1) may be signaled for a slice (e.g., for each slice). Table 1 provides an example projection geometry indices.

TABLE 1

| Projection geometry indices | |
|---|---|
| Index | Projection geometry |
| 0 | Equirectangular |
| 1 | Cubemap |
| 2 | Equal-area |
| 3 | Octahedron |
| 4 | Cylinder |

Projection format may be signaled at a slice level. Projection format signaling may be performed at a picture level. For example, projection format signaling may be performed at a picture level via indices of projection geometry. At a sequence level, the total number of projection formats used in the whole sequence and/or the formats themselves may be signaled. Table 2 provides an example projection format signaling at a sequence level.

TABLE 2

| Projection format signaling at a sequence level | |
|---|---|
| projection_format_table( ) { | Descriptor |
|   num_projection_format | ue(v) |
|   for( i=0; i < num_projection_format; i++ ) { | |
|     project_geometry_idx[i] | ue(v) |
|   } | |
| } | |

Parameter num_projection_format may specify the total number of projection formats used in the sequence. Parameter project_geometry_idx[i] may specify the mapping index (e.g., as shown in Table 1) indicated by the i-th index (e.g., as signaled at the picture/slice level). For example, if equirectangular and equal-area projections are used in the sequence, and if indices "0'" and "1" are used to represent equal-area and equirectangular respectively in the bitstream, project_geometry_idx may be customized as follows and signaled according to Table 2.

project_geometry_idx[0]=2 project_geometry_idx[1]=0

The projection format for a picture may be determined using rate-distortion optimization. An encoder may encode a current picture with one or more available projection formats. For example, an encoder may encode a current picture with one or more available projection formats. The encoder may measure the rate-distortion cost of the projected format. The projection format having a minimum rate-distortion cost may be selected. The distortion may be measured in an original format domain. For example, O may represent the original projection format, X may represent the projection format to be measured, I may represent the original picture, and I' may represent the reconstructed picture. The original picture I may be converted from the original projection format O to the coding projection format X. The picture may be coded and reconstructed. Projection (I, F) may represent the projection function used to convert picture I to format F. The distortion between I and the converted picture from I' may be determined as follows.$\|t\|$ may be the sum of square error (SSE) of variable t.

$$\text{Distortion} = \|I - \text{Projection}(I', O)\|$$

Figure 23A:
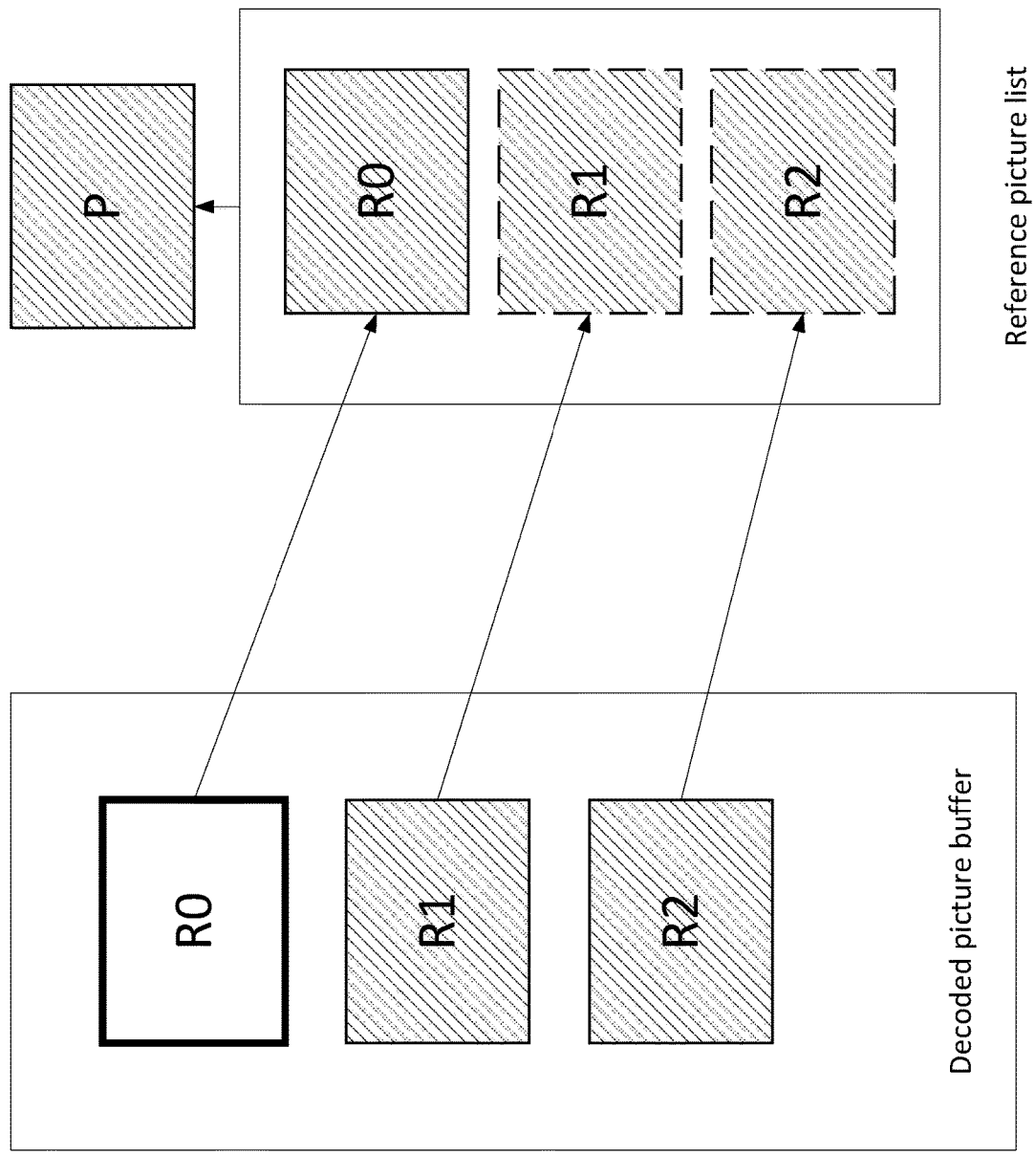
FIG. 23(a) shows an illustration of an example decoded picture buffer (DPB) management being performed.
Figure 23B:
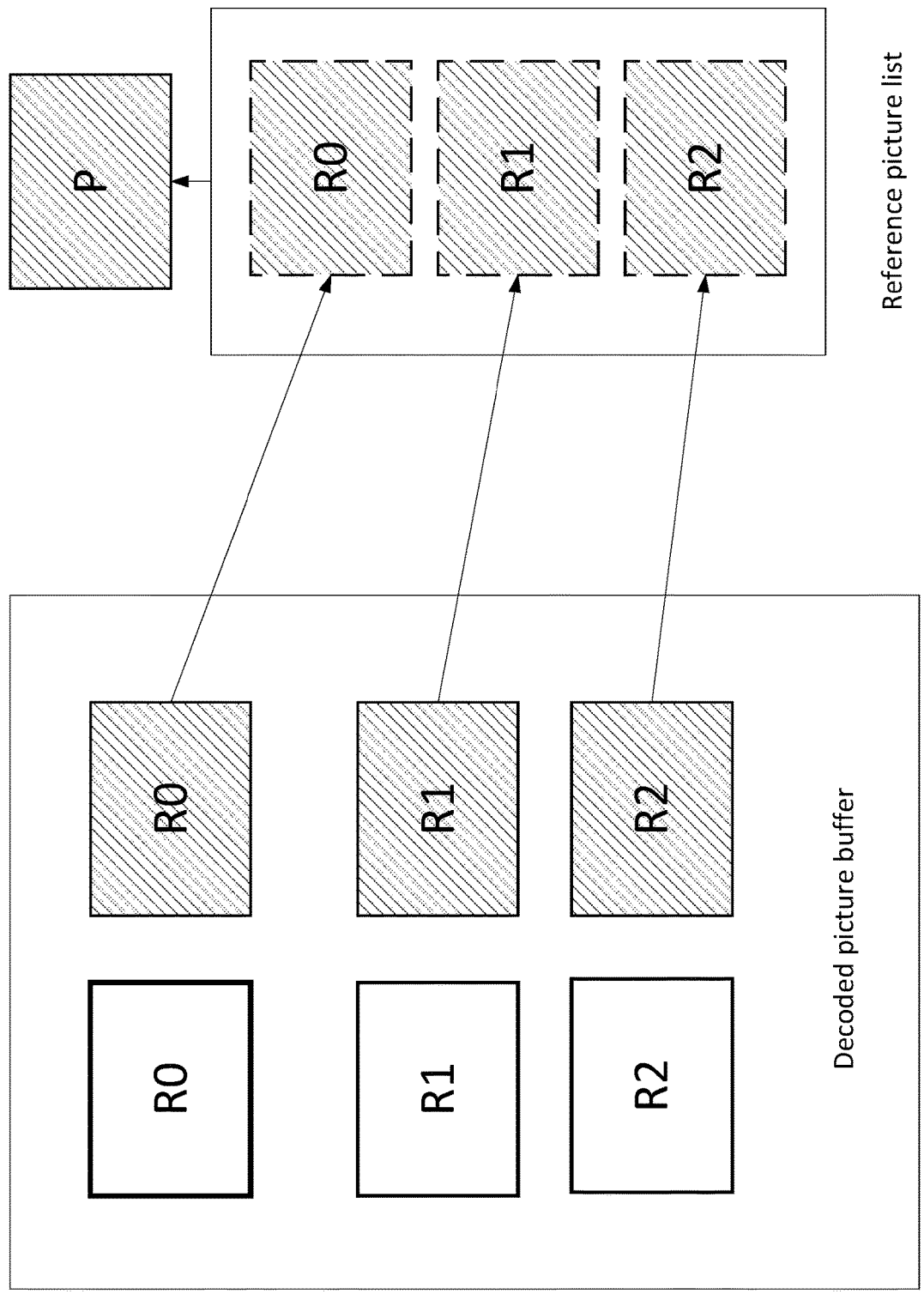
FIG. 23(b) shows another illustration of an example DPB management being performed.

Decoded picture buffer (DPB) management may be performed as follows. An on-the-fly conversion mode may be used. The reconstructed picture may be stored in the DPB. If the reference picture and current picture have different projection formats, the reference picture may be converted to the format of the current picture. FIGS. 23(a) and 23(b) illustrate examples of how DPB management may be performed. Shaded blocks and blank blocks may indicate two projection formats, respectively. The dashed block may indicate a virtual picture, and the solid block may indicate a physical picture. A reference picture R0 may be in one projection format. Reference pictures R1 and R2 may be in other projection format (e.g., different projection format than the projection format for R0). A current picture P may have the same projection format as pictures R1 and R2. Blocks pictures with dashed borders (e.g., R1 and R2 from the reference picture list shown in FIG. 23(a)) may represent virtual pictures. Blocks with solid borders (e.g., R0 from the reference picture list shown in FIG. 23(a)) may represent physical pictures stored in the buffer. As shown in FIG. 23(a), reference picture R0 may be converted to the projection format of picture P before it is decoded. The converted version may be placed on a reference picture list. Reference pictures R1 and R2 may be placed in the reference picture buffer. For example, reference pictures R1 and R2 may be placed in the reference picture buffer directly because they have the same projection format as picture P.

A reference picture may be converted to different projection formats while the reference picture is stored in the DPB. As shown in FIG. 23(b), a reference picture may be selected from the DPB based on the projection format of the current picture P. The reference picture may be used to construct the reference picture list.

One or more (e.g., all) intra slices and one or more (e.g., all) inter slices may use the same projection geometry coding. One or more (e.g., all) intra slices may use one projection geometry coding while one or more (e.g., all) inter slices may use other projection geometry (e.g., that differs from the projection geometry coding used in intra slices). Reconstructed intra pictures may be converted to the projection geometry that inter slices use. For example, reconstructed intra pictures, which may be in a decoded picture buffer, may be converted to the projection geometry that inter slices use so that motion compensation may be applied directly. For example, intra slices may use ERP for coding, while inter slices may use cubemap projection for coding. Resolution for the two projections may be different. For example, an intra slice may have a larger resolution than an inter slice. If the resolution is different, a reconstructed intra picture (e.g., one stored in the decoded picture buffer) may be converted to the geometry projection that the inter slice uses. The reconstructed intra picture may be re-sampled to the same resolution as the inter slice.

Figure 33A:
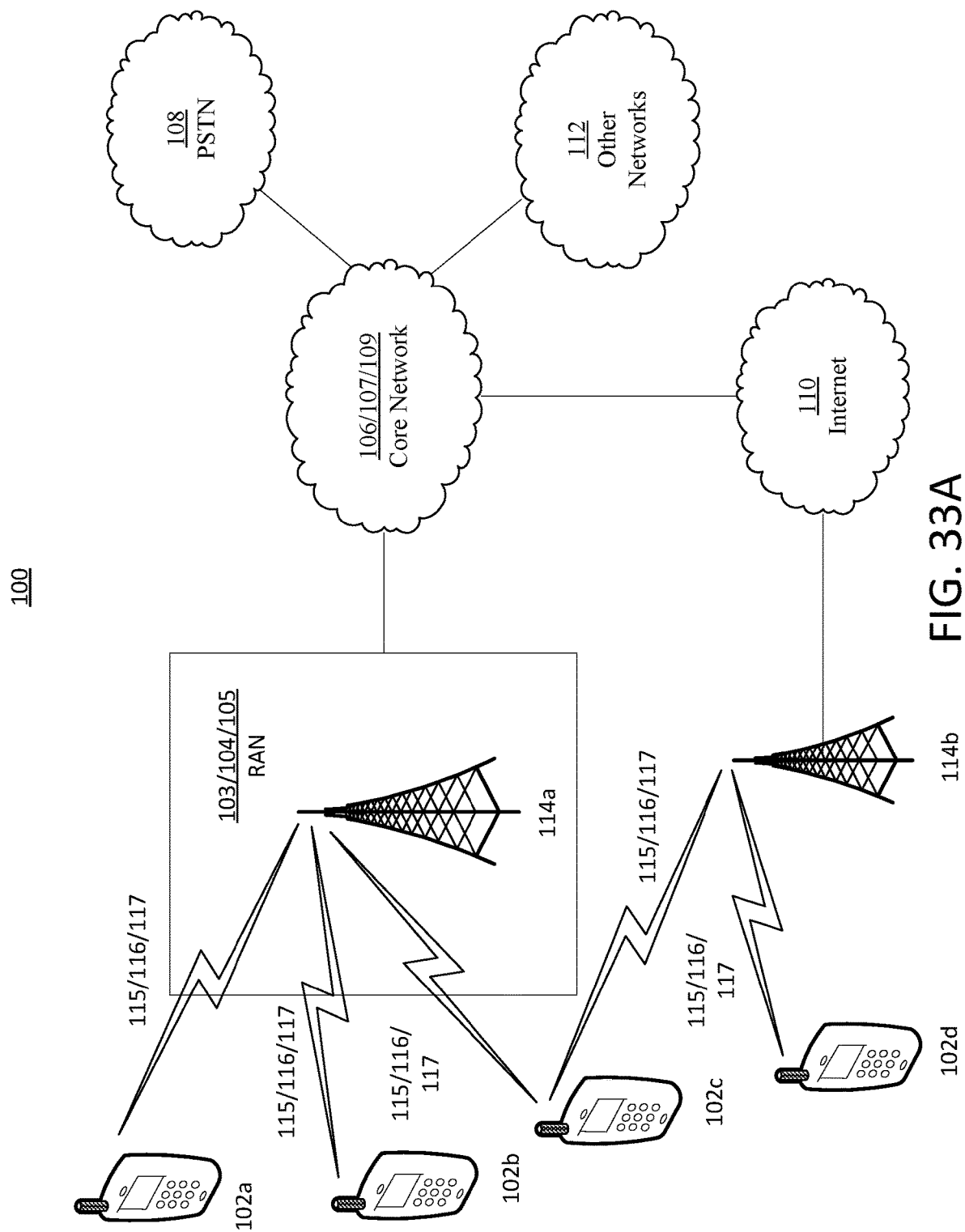
FIG. 33A depicts a diagram of an example communications system in which one or more disclosed embodiments may be implemented.

FIG. 33A depicts a diagram of an example communications system 100 in which one or more disclosed embodiments may be implemented and/or may be used. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 33A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, and/or 102d may be any type of device configured to operate and/or communicate in a wireless environment. By way of example, the WTRUs 102a, 102b, 102c, and/or 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, and/or 102d to facilitate access to one or more communication networks, such as the core network 106/107/109, the Internet 110, and/or the networks 112. By way of example, the base stations 114a and/or 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a and/or 114b may communicate with one or more of the WTRUs 102a, 102b, 102c, and/or 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, and/or 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, and/or 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, and/or 102c may implement radio technologies such as IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 33A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 33A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, and/or 102d. For example, the core network 106/107/109 may provide call control, billing services, mobile location-based services, pre-paid calling, Internet connectivity, video distribution, etc., and/or perform high-level security functions, such as user authentication. Although not shown in FIG. 33A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, and/or 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, and/or 102d in the communications system 100 may include multi-mode capabilities, i.e., the WTRUs 102a, 102b, 102c, and/or 102d may include multiple transceivers for communicating with different wireless networks over different wireless links. For example, the WTRU 102c shown in FIG. 33A may be configured to communicate with the base station 114a, which may employ a cellular-based radio technology, and with the base station 114b, which may employ an IEEE 802 radio technology.

Figure 33B:
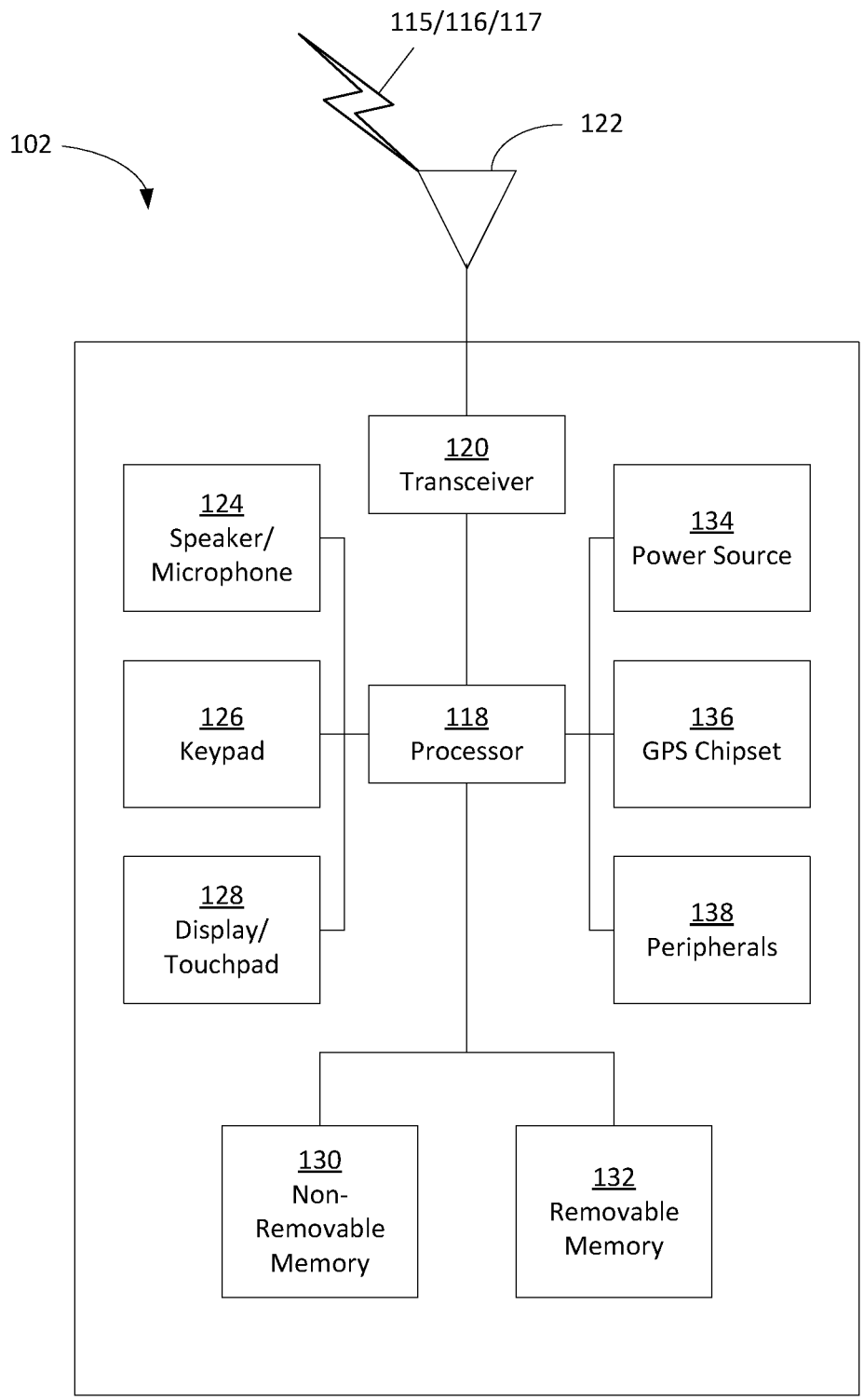
FIG. 33B depicts a system diagram of an example wireless transmit/receive unit (WTRU) that may be used within the communications system illustrated in FIG. 33A.

FIG. 33B depicts a system diagram of an example WTRU 102. As shown in FIG. 33B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 33B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 33B depicts the processor 118 and the transceiver 120 as separate components, it may be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 33B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 33C:
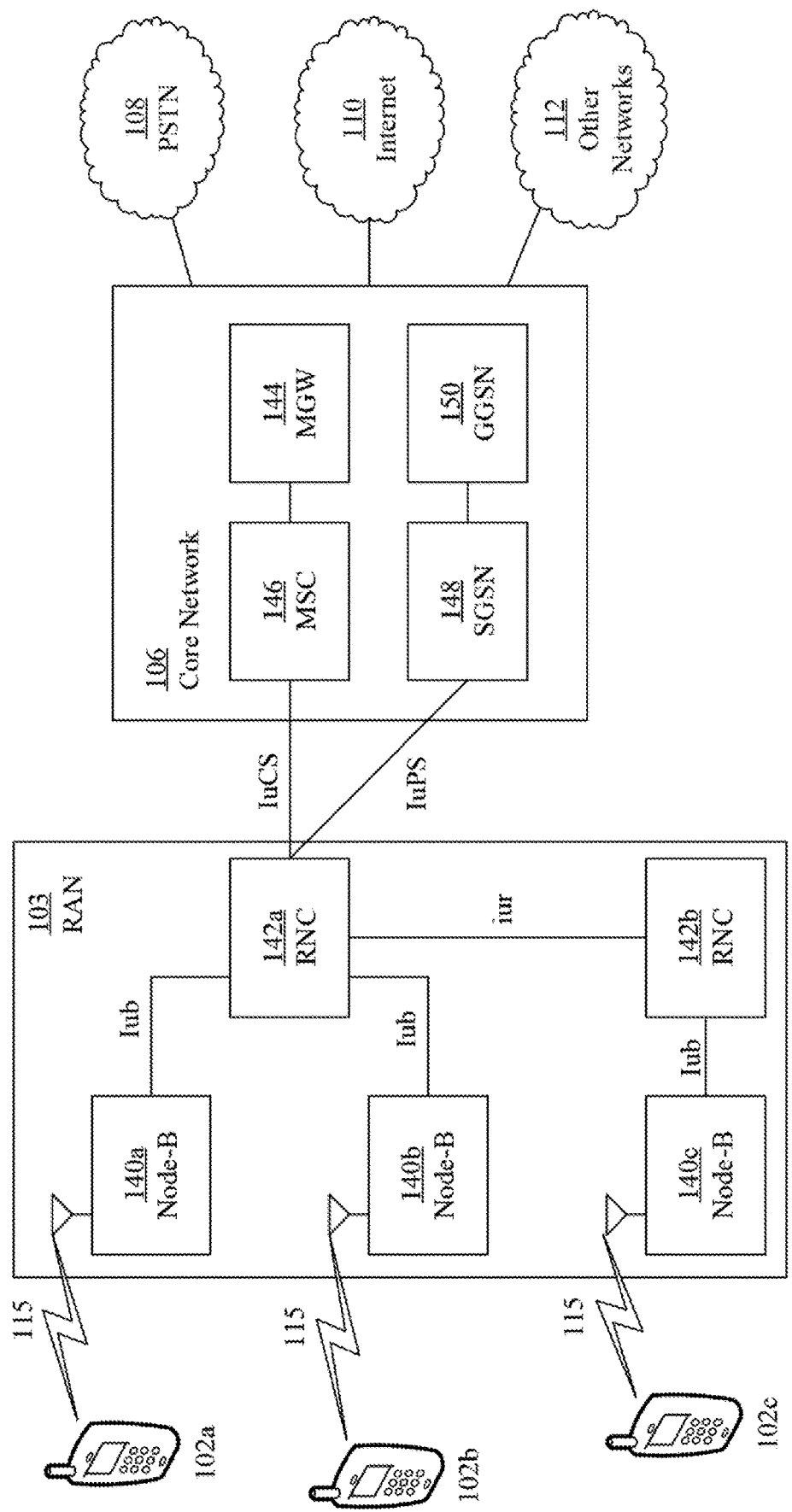
FIG. 33C depicts a system diagram of an example radio access network and an example core network that may be used within the communications system illustrated in FIG. 33A.

FIG. 33C depicts a system diagram of the RAN 103 and the core network 106 according to an embodiment. As noted above, the RAN 103 may employ a UTRA radio technology to communicate with the WTRUs 102a, 102b, and/or 102c over the air interface 115. The RAN 103 may also be in communication with the core network 106. As shown in FIG. 33C, the RAN 103 may include Node-Bs 140a, 140b, and/or 140c, which may each include one or more transceivers for communicating with the WTRUs 102a, 102b, and/or 102c over the air interface 115. The Node-Bs 140a, 140b, and/or 140c may each be associated with a particular cell (not shown) within the RAN 103. The RAN 103 may also include RNCs 142a and/or 142b. It will be appreciated that the RAN 103 may include any number of Node-Bs and RNCs while remaining consistent with an embodiment.

As shown in FIG. 33C, the Node-Bs 140a and/or 140b may be in communication with the RNC 142a. Additionally, the Node-B 140c may be in communication with the RNC 142b. The Node-Bs 140a, 140b, and/or 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, and/or 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 33C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, and/or 102c with access to circuit-switched networks, such as the PSTN 108, to facilitate communications between the WTRUs 102a, 102b, and/or 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, and/or 102c with access to packet-switched networks, such as the Internet 110, to facilitate communications between and the WTRUs 102a, 102b, and/or 102c and IP-enabled devices.

As noted above, the core network 106 may also be connected to the networks 112, which may include other wired or wireless networks that are owned and/or operated by other service providers.

Figure 33D:
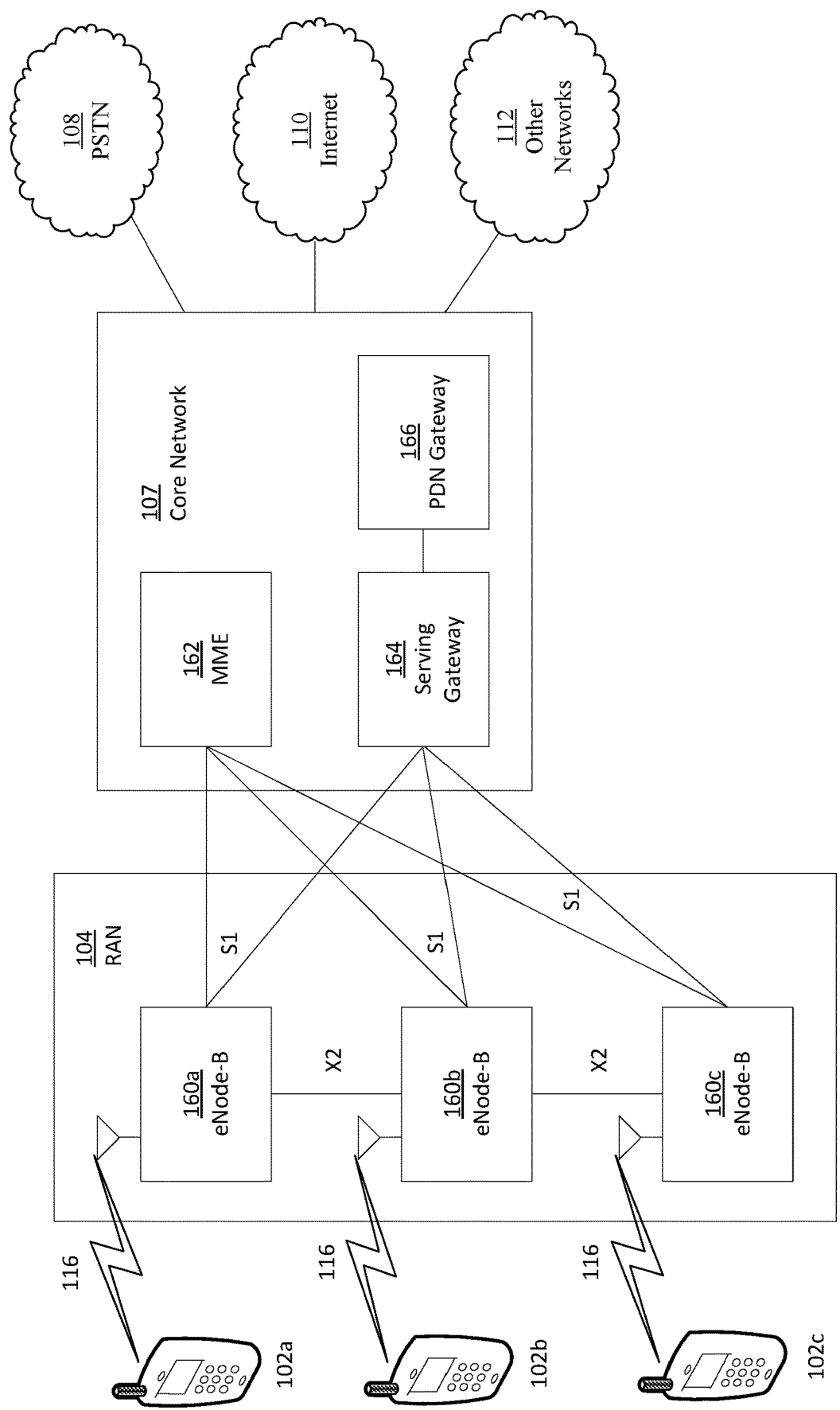
FIG. 33D depicts a system diagram of another example radio access network and an example core network that may be used within the communications system illustrated in FIG. 33A.

FIG. 33D depicts a system diagram of the RAN 104 and the core network 107 according to an embodiment. As noted above, the RAN 104 may employ an E-UTRA radio technology to communicate with the WTRUs 102a, 102b, and/or 102c over the air interface 116. The RAN 104 may also be in communication with the core network 107.

The RAN 104 may include eNode-Bs 160a, 160b, and/or 160c, though it will be appreciated that the RAN 104 may include any number of eNode-Bs while remaining consistent with an embodiment. The eNode-Bs 160a, 160b, and/or 160c may each include one or more transceivers for communicating with the WTRUs 102a, 102b, and/or 102c over the air interface 116. In one embodiment, the eNode-Bs 160a, 160b, and/or 160c may implement MIMO technology. Thus, the eNode-B 160a, for example, may use multiple antennas to transmit wireless signals to, and receive wireless signals from, the WTRU 102a.

Each of the eNode-Bs 160a, 160b, and/or 160c may be associated with a particular cell (not shown) and may be configured to handle radio resource management decisions, handover decisions, scheduling of users in the uplink and/or downlink, and the like. As shown in FIG. 33D, the eNode-Bs 160a, 160b, and/or 160c may communicate with one another over an X2 interface.

The core network 107 shown in FIG. 33D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and/or 160c in the RAN 104 via an S1 interface and may serve as a control node. For example, the MME 162 may be responsible for authenticating users of the WTRUs 102a, 102b, and/or 102c, bearer activation/deactivation, selecting a particular serving gateway during an initial attach of the WTRUs 102a, 102b, and/or 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and/or 160c in the RAN 104 via the S1 interface. The serving gateway 164 may generally route and forward user data packets to/from the WTRUs 102a, 102b, and/or 102c. The serving gateway 164 may also perform other functions, such as anchoring user planes during inter-eNode B handovers, triggering paging when downlink data is available for the WTRUs 102a, 102b, and/or 102c, managing and storing contexts of the WTRUs 102a, 102b, and/or 102c, and the like.

The serving gateway 164 may also be connected to the PDN gateway 166, which may provide the WTRUs 102a, 102b, and/or 102c with access to packet-switched networks, such as the Internet 110, to facilitate communications between the WTRUs 102a, 102b, and/or 102c and IP-enabled devices.

The core network 107 may facilitate communications with other networks. For example, the core network 107 may provide the WTRUs 102a, 102b, and/or 102c with access to circuit-switched networks, such as the PSTN 108, to facilitate communications between the WTRUs 102a, 102b, and/or 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, and/or 102c with access to the networks 112, which may include other wired or wireless networks that are owned and/or operated by other service providers.

Figure 33E:
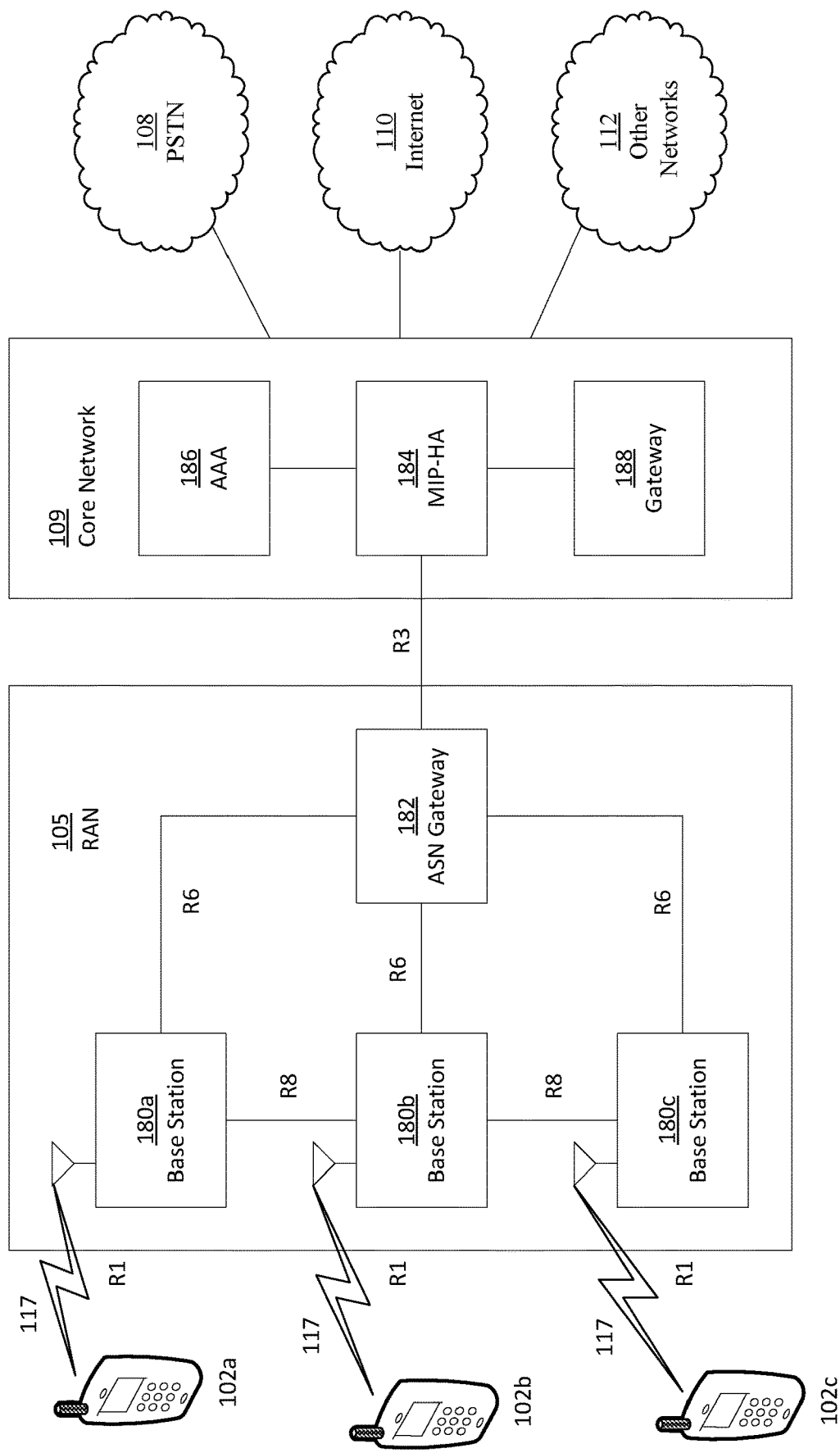
FIG. 33E depicts a system diagram of another example radio access network and an example core network that may be used within the communications system illustrated in FIG. 33A.

FIG. 33E depicts a system diagram of the RAN 105 and the core network 109 according to an embodiment. The RAN 105 may be an access service network (ASN) that employs IEEE 802.16 radio technology to communicate with the WTRUs 102a, 102b, and/or 102c over the air interface 117. As will be further discussed below, the communication links between the different functional entities of the WTRUs 102a, 102b, and/or 102c, the RAN 105, and the core network 109 may be defined as reference points.

As shown in FIG. 33E, the RAN 105 may include base stations 180a, 180b, and/or 180c, and an ASN gateway 182, though it will be appreciated that the RAN 105 may include any number of base stations and ASN gateways while remaining consistent with an embodiment. The base stations 180a, 180b, and/or 180c may each be associated with a particular cell (not shown) in the RAN 105 and may each include one or more transceivers for communicating with the WTRUs 102a, 102b, and/or 102c over the air interface 117. In one embodiment, the base stations 180a, 180b, and/or 180c may implement MIMO technology. Thus, the base station 180a, for example, may use multiple antennas to transmit wireless signals to, and receive wireless signals from, the WTRU 102a. The base stations 180a, 180b, and/or 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, and/or 102c and the RAN 105 may be defined as an R1 reference point that implements the IEEE 802.16 specification. In addition, each of the WTRUs 102a, 102b, and/or 102c may establish a logical interface (not shown) with the core network 109. The logical interface between the WTRUs 102a, 102b, and/or 102c and the core network 109 may be defined as an R2 reference point, which may be used for authentication, authorization, IP host configuration management, and/or mobility management.

The communication link between each of the base stations 180a, 180b, and/or 180c may be defined as an R8 reference point that includes protocols for facilitating WTRU handovers and the transfer of data between base stations. The communication link between the base stations 180a, 180b, and/or 180c and the ASN gateway 182 may be defined as an R6 reference point. The R6 reference point may include protocols for facilitating mobility management based on mobility events associated with each of the WTRUs 102a, 102b, and/or 102c.

As shown in FIG. 33E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and/or 102c to roam between different ASNs and/or different core networks. The MIP-HA 184 may provide the WTRUs 102a, 102b, and/or 102c with access to packet-switched networks, such as the Internet 110, to facilitate communications between the WTRUs 102a, 102b, and/or 102c and IP-enabled devices. The AAA server 186 may be responsible for user authentication and for supporting user services. The gateway 188 may facilitate interworking with other networks. For example, the gateway 188 may provide the WTRUs 102a, 102b, and/or 102c with access to circuit-switched networks, such as the PSTN 108, to facilitate communications between the WTRUs 102a, 102b, and/or 102c and traditional land-line communications devices. In addition, the gateway 188 may provide the WTRUs 102a, 102b, and/or 102c with access to the networks 112, which may include other wired or wireless networks that are owned and/or operated by other service providers.

Although not shown in FIG. 33E, it should, may, and/or will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, and/or 102c between the RAN 105 and the other ASNs. The communication link between the core network 109 and the other core networks may be defined as an R5 reference, which may include protocols for facilitating interworking between home core networks and visited core networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
    identifying a current sample location in a frame-packed picture associated with a first projection geometry, the current sample location being associated with a current sample of a 360-degree video content, wherein the current sample is to be predicted using a reference sample;
    determining that a reference sample location associated with the reference sample for predicting the current sample is located outside of a content boundary of the frame-packed picture;
    based on the determination that the reference sample location associated with the reference sample for predicting the current sample is located outside of the content boundary of the frame-packed picture, deriving a padding sample location for predicting the current sample based on at least one circular characteristic of the 360-degree video content and the first projection geometry, the padding sample location being associated with a padding sample; and
    predicting the current sample associated with the 360-degree video content based on the padding sample.

2. The method of claim 1, wherein determining that the reference sample location is located outside of the content boundary of the frame-packed picture comprises:
    on a condition that the current sample is intra predicted, identifying the reference sample location based on an intra prediction mode associated with the current sample.

3. The method of claim 1, wherein determining that the reference sample location is located outside of the content boundary of the frame-packed picture comprises:
    on a condition that the current sample is inter predicted, identifying the reference sample location by applying a motion vector associated with the current sample to the current sample.

4. The method of claim 1, wherein the content boundary comprises at least one of a frame packed picture boundary or a face boundary.

5. The method of claim 1, wherein the first projection geometry comprises at least one of an equirectangular projection, an equal-area projection, a cubemap projection, an octahedron projection, or a cylinder projection.

6. The method of claim 1, wherein the frame-packed picture comprises a plurality of faces associated with the first projection geometry, wherein the content boundary defines a boundary between faces, and deriving the padding sample location comprises:
    identifying a first face that includes the current sample location;
    calculating a 3D position of the reference sample location associated with the first face;
    identifying a second face that includes the padding sample location based on the 3D position of the reference sample location; and
    applying a geometry projection with the 3D position of the reference sample location to derive a 2D planar position of the reference sample location in the second face as the padding sample location.

7. The method of claim 6, wherein deriving the padding sample location further comprises:
    converting a coordinate in the first projection geometry into an intermediate coordinate associated with a second projection geometry, wherein the 3D position of the reference sample location is calculated in the intermediate coordinate, and the 2D planar position of the reference sample location in the second face is identified in the intermediate coordinate; and
    converting the derived 2D planar position of the reference sample location associated with the second projection geometry back to the coordinate associated with the first projection geometry.

8. The method of claim 1, wherein:
    when the current sample location is located near a rightmost content boundary of the frame-packed picture and the determined reference sample location is located outside of the frame-packed picture beyond the right content boundary, the padding sample location is located near a leftmost content boundary of the frame-packed picture that is circularly connected to the rightmost content boundary of the frame-packed picture;

when the current sample location is located near the leftmost content boundary of the frame-packed picture and the determined reference sample location is located outside of the frame-packed picture beyond the left content boundary, the padding sample location is located near the rightmost content boundary of the frame-packed picture that is circularly connected to the leftmost content boundary of the frame-packed picture;

when the current sample location is located near a first area of a topmost content boundary of the frame-packed picture and the determined reference sample location is located outside of the frame-packed picture beyond the first area of the topmost content boundary, the padding sample location is located near a second area of the topmost content boundary that is located in a circularly opposite side of the first area of the topmost content boundary; and when the current sample location is located near a first area of a bottommost content boundary of the frame-packed picture and the determined reference sample location is located outside of the frame-packed picture beyond the first area of the bottommost content boundary, the padding sample location is located near a second area of the bottommost content boundary that is located in a circularly opposite side of the first area of the bottommost content boundary.

9. A device comprising:
a processor configured to:
identify a current sample location in a frame-packed picture associated with a first projection geometry, the current sample location being associated with a current sample of a 360-degree video content, wherein the current sample is to be predicted using a reference sample;
determine that a reference sample location associated with the reference sample for predicting the current sample is located outside of a content boundary of the frame-packed picture;
based on the determination that the reference sample location associated with the reference sample for predicting the current sample is outside of the content boundary of the frame-packed picture, derive a padding sample location for predicting the current sample based on at least one circular characteristic of the 360-degree video content and the first projection geometry, the padding sample location being associated with a padding sample; and
predict the current sample associated with the 360-degree video content based on the padding sample.

10. The device of claim 9, wherein the processor configured to determine that the reference sample location is located outside of the content boundary of the frame-packed picture comprises:
on a condition that the current sample is intra predicted, identify the reference sample location based on an intra prediction mode associated with the current sample.

11. The device of claim 9, wherein the processor configured to determine that the reference sample location is located outside of the content boundary of the frame-packed picture comprises:
on a condition that the current sample is inter predicted, identify the reference sample location by applying a motion vector associated with the current sample to the current sample.

12. The device of claim 9, wherein the content boundary comprises at least one of a frame packed picture boundary or a face boundary, and wherein the first projection geometry comprises at least one of an equirectangular projection, an equal-area projection, a cubemap projection, an octahedron projection, or a cylinder projection.

13. The device of claim 9, wherein the frame-packed picture comprises a plurality of faces associated with the first projection geometry, and wherein the content boundary defines a boundary between faces, and the processor configured to derive the padding sample location comprises:
identify a first face that includes the current sample location;
calculate a 3D position of the reference sample location associated with the first face;
identify a second face that includes the padding sample location based on the 3D position of the reference sample location; and
apply a geometry projection with the 3D position of the reference sample location to derive a 2D planar position of the reference sample location in the second face as the padding sample location.

14. The device of claim 13, wherein the processor is further configured to derive the padding sample location comprises:
convert a coordinate in the first projection geometry into an intermediate coordinate associated with a second projection geometry, wherein the 3D position of the reference sample location is calculated in the intermediate coordinate, and the 2D planar position of the reference sample location in a second face is identified in the intermediate coordinate; and
convert the derived 2D planar position of the reference sample location associated with the second projection geometry back to the coordinate associated with the first projection geometry.

15. The device of claim 9, wherein:
when the current sample location is located near a rightmost content boundary of the frame-packed picture and the determined reference sample location is located outside of the frame-packed picture beyond the right content boundary, the padding sample location is located near a leftmost content boundary of the frame-packed picture that is circularly connected to the rightmost content boundary of the frame-packed picture;

when the current sample location is located near the leftmost content boundary of the frame-packed picture and the determined reference sample location is located outside of the frame-packed picture beyond the left content boundary, the padding sample location is located near the rightmost content boundary of the frame-packed picture that is circularly connected to the leftmost content boundary of the frame-packed picture;

when the current sample location is located near a first area of a topmost content boundary of the frame-packed picture and the determined reference sample location is located outside of the frame-packed picture beyond the first area of the topmost content boundary, the padding sample location is located near a second area of the topmost content boundary that is located in a circularly opposite side of the first area of the topmost content boundary; and when the current sample location is located near a first area of a bottommost content boundary of the frame-packed picture and the determined reference sample location is located outside of the frame-packed picture beyond the first area of the bottommost content boundary, the padding sample location is located near a second area of the bottommost content boundary that is located in a circularly opposite side of the first area of the bottommost content boundary.

16. A method comprising:
   obtaining a video signal comprising a frame-packed picture;
   identifying a current sample of a 360-degree video content in the frame-packed picture that is associated with a projection geometry;
   identifying a padding sample for predicting the current sample based on at least one circular characteristic of the 360-degree video content and the projection geometry;
   deriving a reference sample location associated with the padding sample, the reference sample location being located outside of a content boundary of the frame-packed picture; and
   including a reference sample location indication for the reference sample location in a bitstream for predicting the current sample associated with the 360-degree video content.

17. The method of claim 16, wherein the content boundary comprises at least one of a frame packed picture boundary or a face boundary, and wherein the projection geometry comprises at least one of an equirectangular projection, an equal-area projection, a cubemap projection, an octahedron projection, or a cylinder projection.

18. The method of claim 16, comprising:
   on a condition that the current sample is inter predicted, identifying the reference sample location by applying a motion vector associated with the current sample to the current sample.

19. A device comprising:
   a processor configured to:
      obtain a video signal comprising a frame-packed picture;
      identify a current sample a 360-degree video content in the frame-packed picture that is associated with a projection geometry;
      identify a padding sample for predicting the current sample based on at least one circular characteristic of the 360-degree video content and the projection geometry;
      derive a reference sample location associated with the padding sample, the reference sample location being outside of a content boundary of the frame-packed picture; and
      include a reference sample location indication for the reference sample location in a bitstream for predicting the current sample associated with the 360-degree video content.

20. The device of claim 19, wherein the frame-packed picture comprises a plurality of faces associated with the projection geometry, and wherein the content boundary defines a boundary between faces.

* * * * *